US007966569B2

(12) United States Patent
Pandey

(10) Patent No.: US 7,966,569 B2
(45) Date of Patent: Jun. 21, 2011

(54) METHOD AND SYSTEM AND PROGRAM STORAGE DEVICE FOR STORING OILFIELD RELATED DATA IN A COMPUTER DATABASE AND DISPLAYING A FIELD DATA HANDBOOK ON A COMPUTER DISPLAY SCREEN

(75) Inventor: Vibhas Pandey, Stafford, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 2119 days.

(21) Appl. No.: 10/624,836

(22) Filed: Jul. 22, 2003

(65) Prior Publication Data

US 2004/0103376 A1 May 27, 2004

Related U.S. Application Data

(60) Provisional application No. 60/404,015, filed on Aug. 16, 2002.

(51) Int. Cl.
*G06F 3/048* (2006.01)
(52) U.S. Cl. .............. 715/776; 715/273; 702/9
(58) Field of Classification Search .............. 715/776, 715/273; 702/9
See application file for complete search history.

(56) References Cited

U.S. PATENT DOCUMENTS

| | | | | |
|---|---|---|---|---|
| 5,237,651 A | * | 8/1993 | Randall | 715/776 |
| 5,283,864 A | * | 2/1994 | Knowlton | 715/776 |
| 5,392,387 A | * | 2/1995 | Fitzpatrick et al. | 715/776 |
| 5,515,497 A | * | 5/1996 | Itri et al. | 715/776 |
| 5,663,748 A | * | 9/1997 | Huffman et al. | 345/173 |
| 5,909,687 A | * | 6/1999 | Tapper | 707/104.1 |
| 5,953,000 A | * | 9/1999 | Weirich | 345/173 |
| 5,960,448 A | * | 9/1999 | Reichek et al. | 715/236 |

(Continued)

OTHER PUBLICATIONS

AmericanTurbine, captured images from americanturbine web pages, published 2001, pp. 1-6.*

(Continued)

*Primary Examiner* — Tuyetlien T Tran
(74) *Attorney, Agent, or Firm* — Rachel Greene; David Cate; Jeff Griffin

(57) ABSTRACT

A computerized handbook known as an 'i-Handbook' is adapted to be stored in a memory of a computer system and displayed on a display screen of the computer system for assisting field personnel in the performance of their respective job related responsibilities. The 'i-Handbook', when displayed, has the appearance of a real handbook and it includes a database and a plurality of calculators for calculating a plurality of oilfield or wellbore related data in response to a first plurality of data in the database and a second plurality of data input by a user. The plurality of calculators are adapted for calculating: unit conversions, triplex pump volumes, tank volumes, tubular stretch and free point, annulus volumes, slurry density, gate percentage, screen out, cement slurry, casing lift, HCL density, oil gravity and API, and salt requirements. The 'i-Handbook' has a wellbore diagram feature which will allow a user to draw and create differing types of downhole tubular, packers and perforations in the tubular adapted to be disposed in a wellbore. In addition, the 'i-Handbook' can display: tubular capacities and displacement volumes, and tubular data based on suppliers which will enable a user to search through a database of the tubular data to locate the suppliers. This abstract is provided for the sole purpose of aiding a patent searcher; it is provided with the understanding that this abstract shall not be used to interpret or limit the scope or meaning of the claims.

48 Claims, 28 Drawing Sheets

Computing Tank volumes and generating tank straps

U.S. PATENT DOCUMENTS

| | | | |
|---|---|---|---|
| 6,301,586 B1* | 10/2001 | Yang et al. | 707/104.1 |
| 6,310,630 B1* | 10/2001 | Kulkarni et al. | 715/776 |
| 6,331,867 B1* | 12/2001 | Eberhard et al. | 715/864 |
| 6,407,757 B1* | 6/2002 | Ho | 715/776 |
| 7,062,420 B2* | 6/2006 | Poe, Jr. | 703/10 |
| 2002/0008690 A1* | 1/2002 | Cooper | 345/156 |
| 2003/0074284 A1* | 4/2003 | Bowden | 705/28 |
| 2003/0139916 A1* | 7/2003 | Choe et al. | 703/10 |
| 2004/0039750 A1* | 2/2004 | Anderson et al. | 707/103 R |
| 2004/0145603 A1* | 7/2004 | Soares | 345/730 |
| 2004/0212835 A1* | 10/2004 | Neff et al. | 358/1.18 |

OTHER PUBLICATIONS

AquaDyn, captured images from aquadyntech website, published Feb. 2002, pp. 1-4.* efunda, pipe pressure loss calculator, screen captured pp. 1-4, published Feb. 2002.*

* cited by examiner

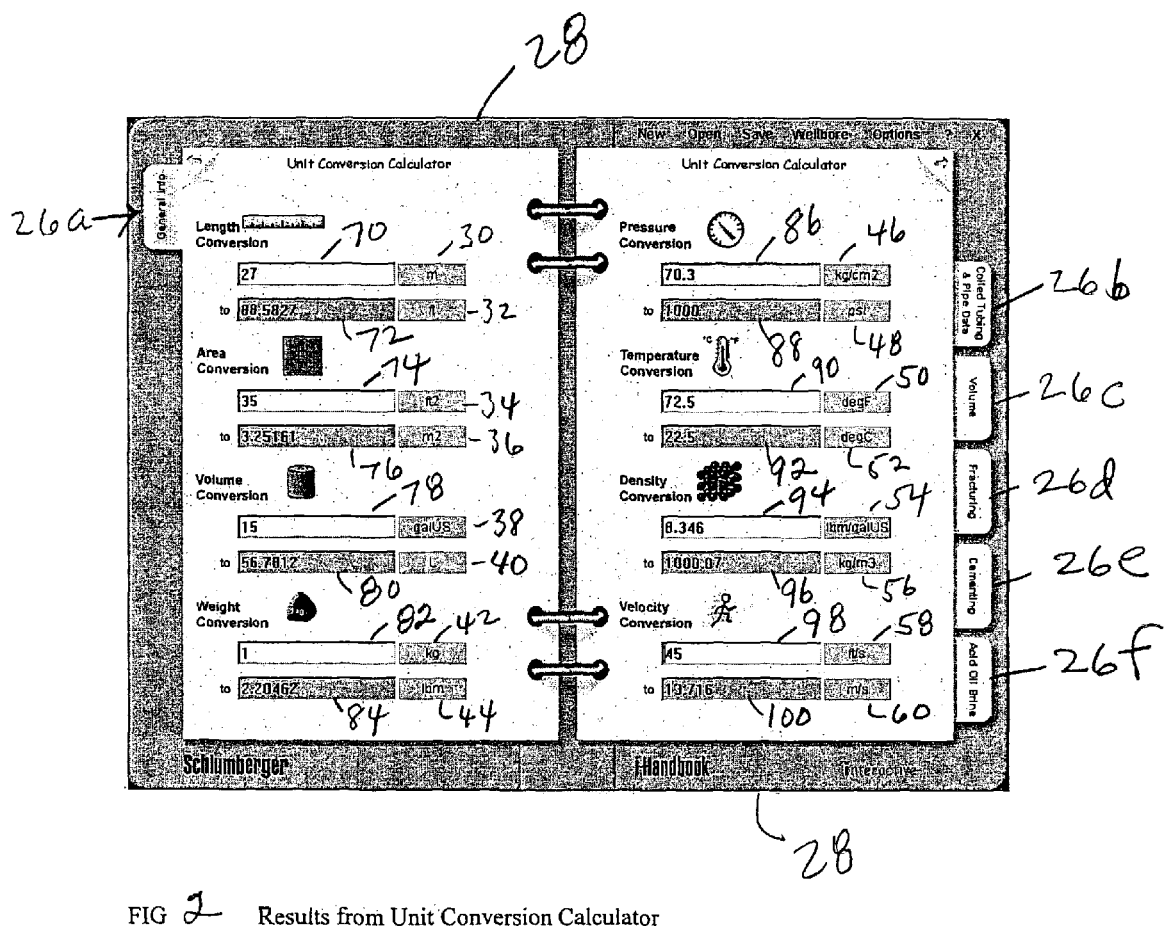
FIG 2   Results from Unit Conversion Calculator

| meter | 3.281 | feet |
| meter | 39.3701 | inches |
| meter | 1.094 | yards |
$1 \text{ m} = 3.281 \text{ ft}$
$\therefore 27 \text{ m} = 27 \times 3.281 \dfrac{\text{ft}}{\text{m}} = 88.5827 \text{ ft}$
FIG __3__    Conversion Factors
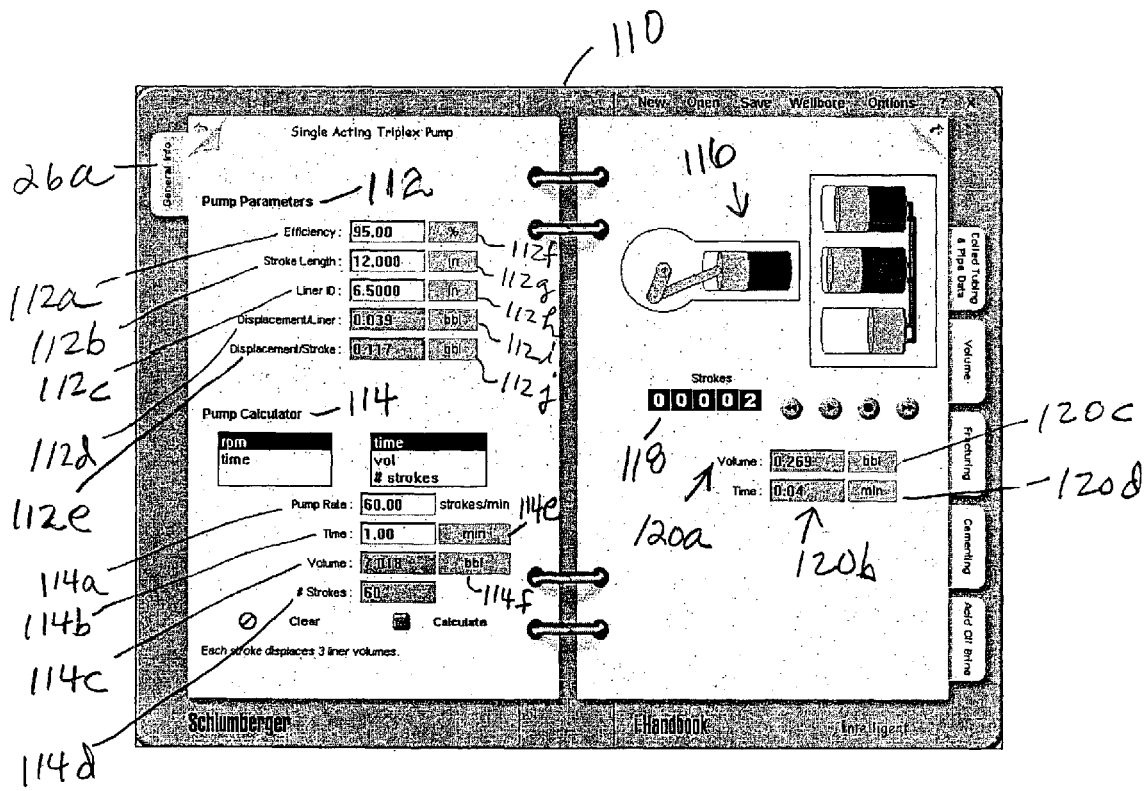
FIG __4__    Computing volumes for Single Acting Triplex Pumps

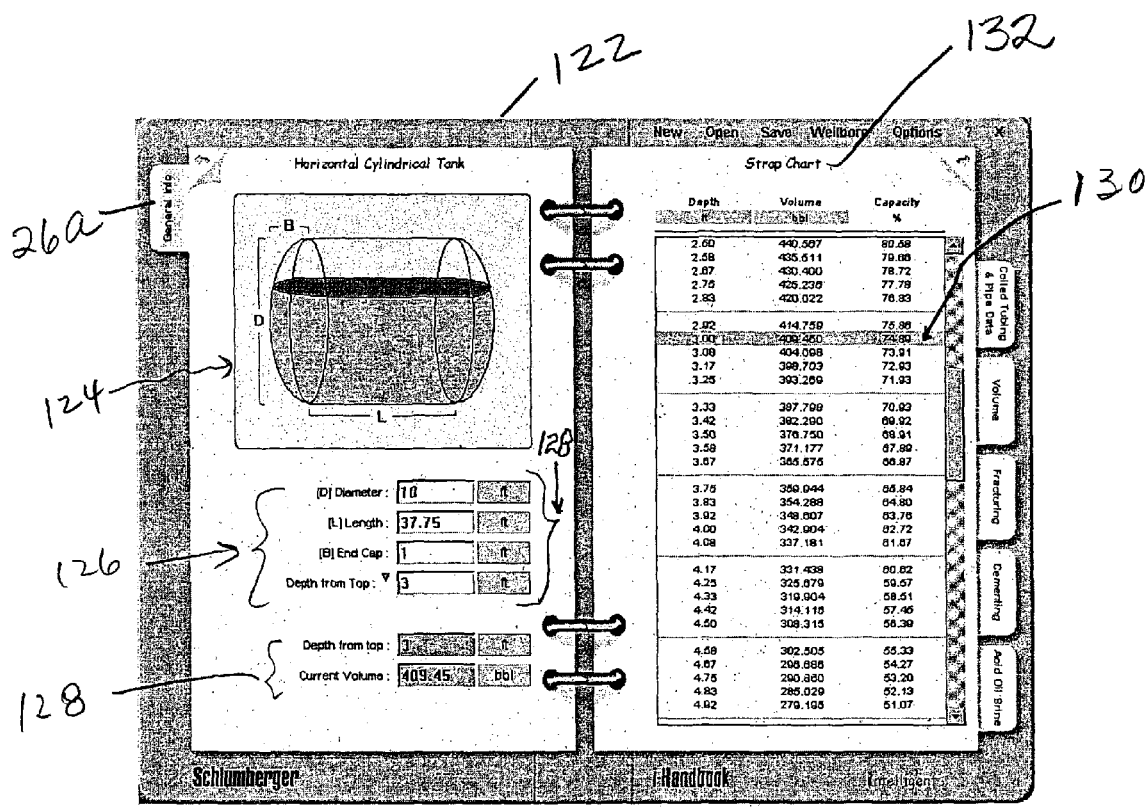
FIG 5   Computing Tank volumes and generating tank straps

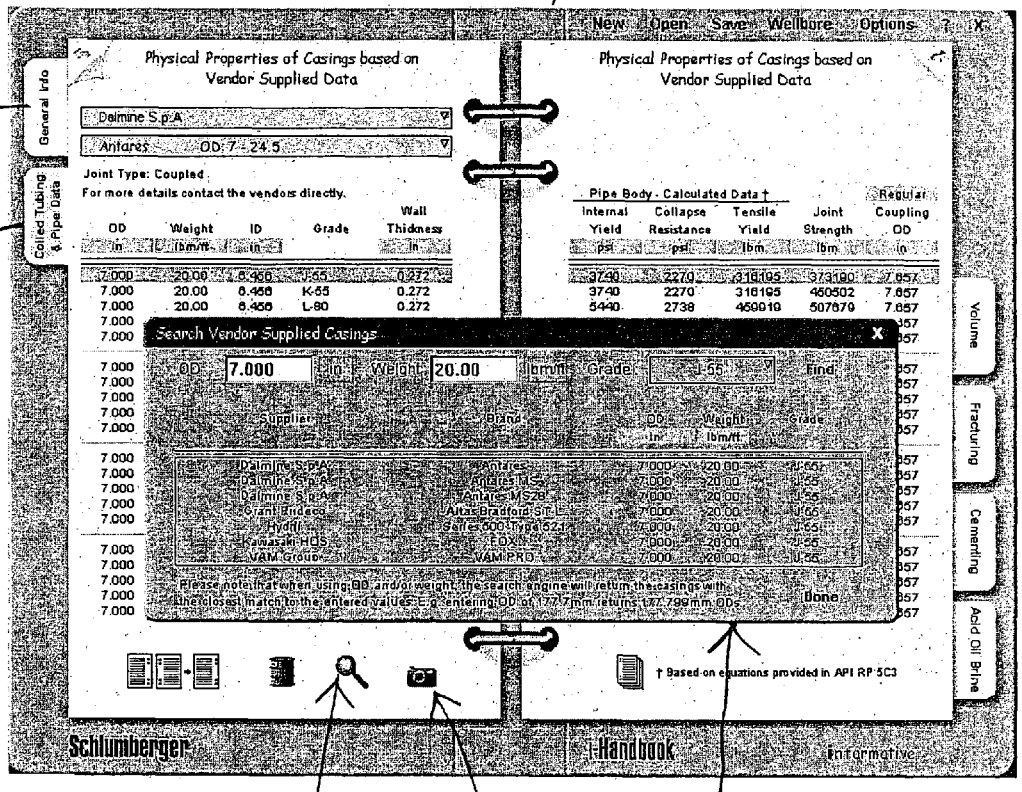
FIG 6    Displaying Tubular Data based on supplier and ability to search through the database.

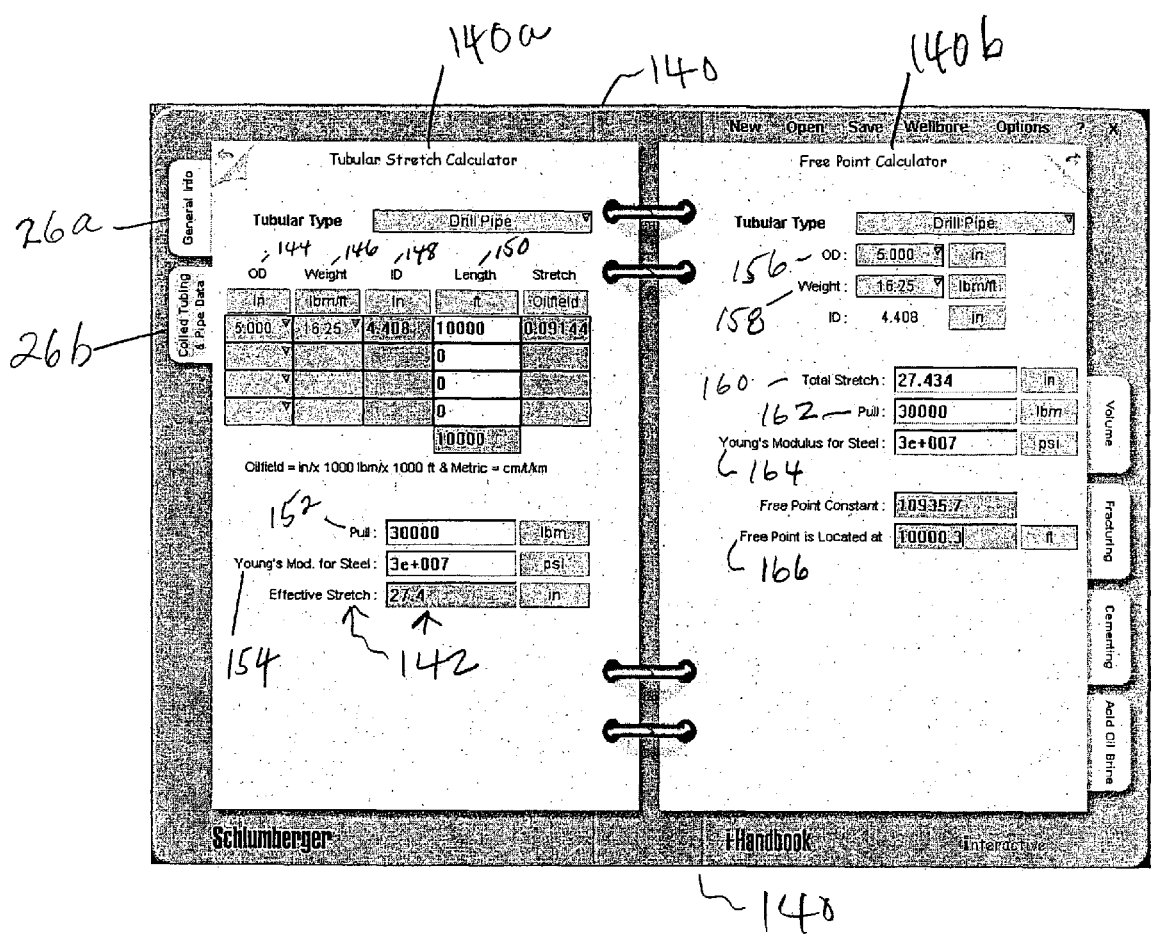
FIG 7   Calculation of Tubular stretch and free point.

FIG 8    Tubular Capacities and Displacement Volumes

| OD (in) | | Weight (lbm/ft) | ID (in) | Capacity (bbl/ft) | Displacement Open (bbl/ft) | Plugged (bbl/ft) |
|---|---|---|---|---|---|---|
| 1.050 | NU | 1.14 | 0.824 | 0.00066 | 0.00041 | 0.00107 |
| 1.050 | U | 1.20 | 0.824 | 0.00066 | 0.00041 | 0.00107 |
| 1.050 | U | 1.54 | 0.742 | 0.00053 | 0.00053 | 0.00107 |
| 1.315 | NU | 1.70 | 1.049 | 0.00106 | 0.00061 | 0.00168 |
| 1.315 | I | 1.72 | 1.049 | 0.00106 | 0.00061 | 0.00168 |
| 1.315 | U | 1.80 | 1.049 | 0.00106 | 0.00061 | 0.00168 |
| 1.315 | U | 2.24 | 0.957 | 0.00089 | 0.00079 | 0.00168 |
| 1.660 | I | 2.10 | 1.410 | 0.00193 | 0.00074 | 0.00267 |
| 1.660 | NU | 2.30 | 1.380 | 0.00185 | 0.00082 | 0.00267 |
| 1.660 | I | 2.33 | 1.380 | 0.00185 | 0.00082 | 0.00267 |
| 1.660 | U | 2.40 | 1.380 | 0.00185 | 0.00082 | 0.00267 |
| 1.660 | U | 3.07 | 1.278 | 0.00158 | 0.00109 | 0.00267 |
| 1.900 | I | 2.40 | 1.650 | 0.00264 | 0.00086 | 0.00350 |
| 1.900 | NU | 2.75 | 1.610 | 0.00251 | 0.00098 | 0.00350 |
| 1.900 | I | 2.76 | 1.610 | 0.00251 | 0.00098 | 0.00350 |
| 1.900 | U | 2.90 | 1.610 | 0.00251 | 0.00098 | 0.00350 |
| 1.900 | U | 3.73 | 1.500 | 0.00218 | 0.00132 | 0.00350 |
| 1.900 | NU | 4.42 | 1.400 | 0.00190 | 0.00160 | 0.00350 |
| 1.900 | NU | 5.15 | 1.300 | 0.00164 | 0.00186 | 0.00350 |
| 2.063 | I | 3.25 | 1.751 | 0.00297 | 0.00115 | 0.00413 |
| 2.063 | NU | 4.50 | 1.813 | 0.00252 | 0.00160 | 0.00413 |
| 2.375 | NU | 4.00 | 2.041 | 0.00404 | 0.00143 | 0.00547 |
| 2.375 | NU | 4.60 | 1.995 | 0.00386 | 0.00161 | 0.00547 |
| 2.375 | U | 4.70 | 1.995 | 0.00386 | 0.00161 | 0.00547 |
| 2.375 | NU | 5.80 | 1.867 | 0.00338 | 0.00209 | 0.00547 |
| 2.375 | U | 5.95 | 1.867 | 0.00338 | 0.00209 | 0.00547 |
| 2.375 | NU | 6.60 | 1.785 | 0.00309 | 0.00238 | 0.00547 |
| 2.375 | NU | 7.35 | 1.703 | 0.00281 | 0.00266 | 0.00547 |
| 2.375 | U | 7.46 | 1.703 | 0.00281 | 0.00266 | 0.00547 |
| 2.875 | NU | 6.40 | 2.441 | 0.00578 | 0.00224 | 0.00802 |
| 2.875 | U | 6.50 | 2.441 | 0.00578 | 0.00224 | 0.00802 |
| 2.875 | NU | 7.80 | 2.323 | 0.00524 | 0.00278 | 0.00802 |
| 2.875 | U | 7.90 | 2.323 | 0.00524 | 0.00278 | 0.00802 |
| 2.875 | NU | 8.60 | 2.259 | 0.00495 | 0.00307 | 0.00802 |
| 2.875 | U | 8.70 | 2.259 | 0.00495 | 0.00307 | 0.00802 |
| 2.875 | NU | 9.35 | 2.195 | 0.00468 | 0.00334 | 0.00802 |
| 2.875 | U | 9.45 | 2.195 | 0.00468 | 0.00334 | 0.00802 |
| 2.875 | NU | 10.50 | 2.091 | 0.00424 | 0.00378 | 0.00802 |
| 2.875 | NU | 11.50 | 1.995 | 0.00386 | 0.00416 | 0.00802 |
| 3.500 | NU | 7.70 | 3.068 | 0.00914 | 0.00275 | 0.01190 |
| 3.500 | NU | 9.20 | 2.992 | 0.00869 | 0.00320 | 0.01190 |
| 3.500 | U | 9.30 | 2.992 | 0.00869 | 0.00320 | 0.01190 |
| 3.500 | NU | 10.20 | 2.922 | 0.00829 | 0.00360 | 0.01190 |
| 3.500 | NU | 12.70 | 2.750 | 0.00734 | 0.00455 | 0.01190 |
| 3.500 | U | 12.95 | 2.750 | 0.00734 | 0.00455 | 0.01190 |
| 3.500 | NU | 14.30 | 2.640 | 0.00677 | 0.00513 | 0.01190 |
| 3.500 | NU | 15.50 | 2.548 | 0.00630 | 0.00559 | 0.01190 |
| 3.500 | NU | 17.00 | 2.440 | 0.00578 | 0.00611 | 0.01190 |
| 4.000 | NU | 9.50 | 3.548 | 0.01222 | 0.00331 | 0.01554 |
| 4.000 | U | 11.00 | 3.476 | 0.01173 | 0.00380 | 0.01554 |

NU = non-Upset, U = Upset, I = Integral

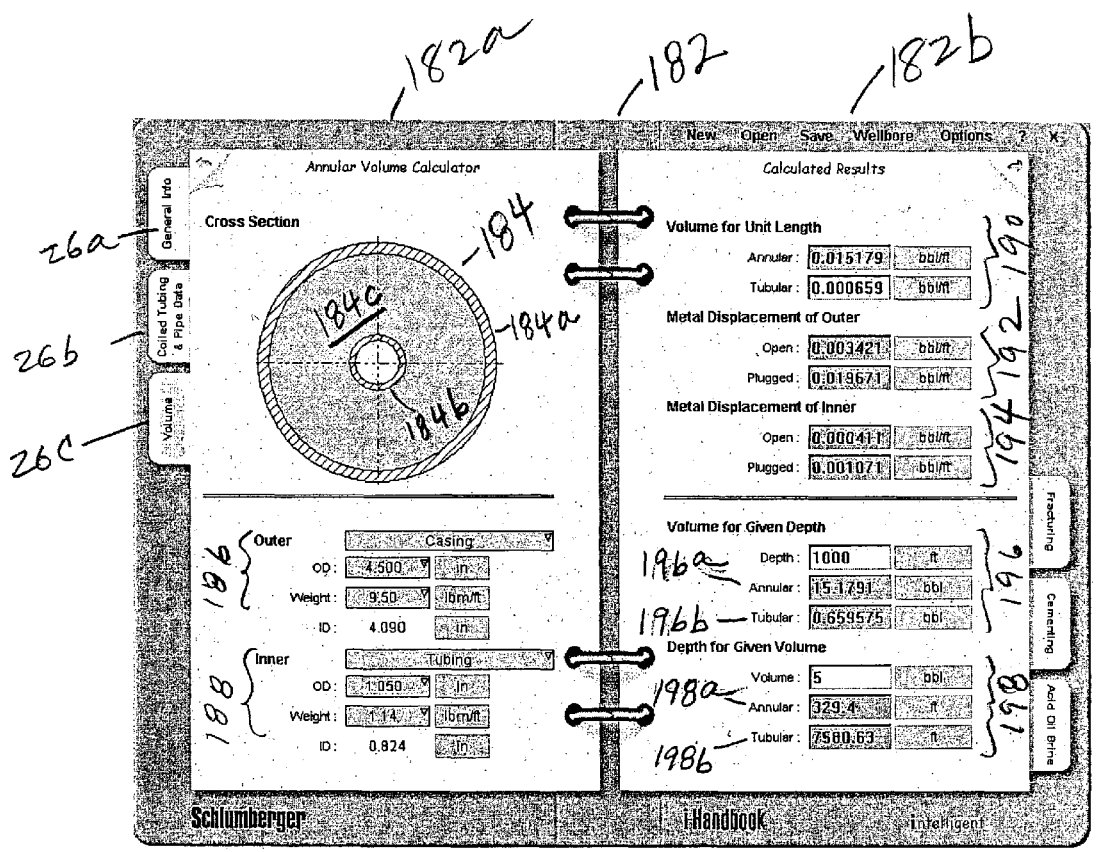
FIG 9   Annulus Volume Calculations

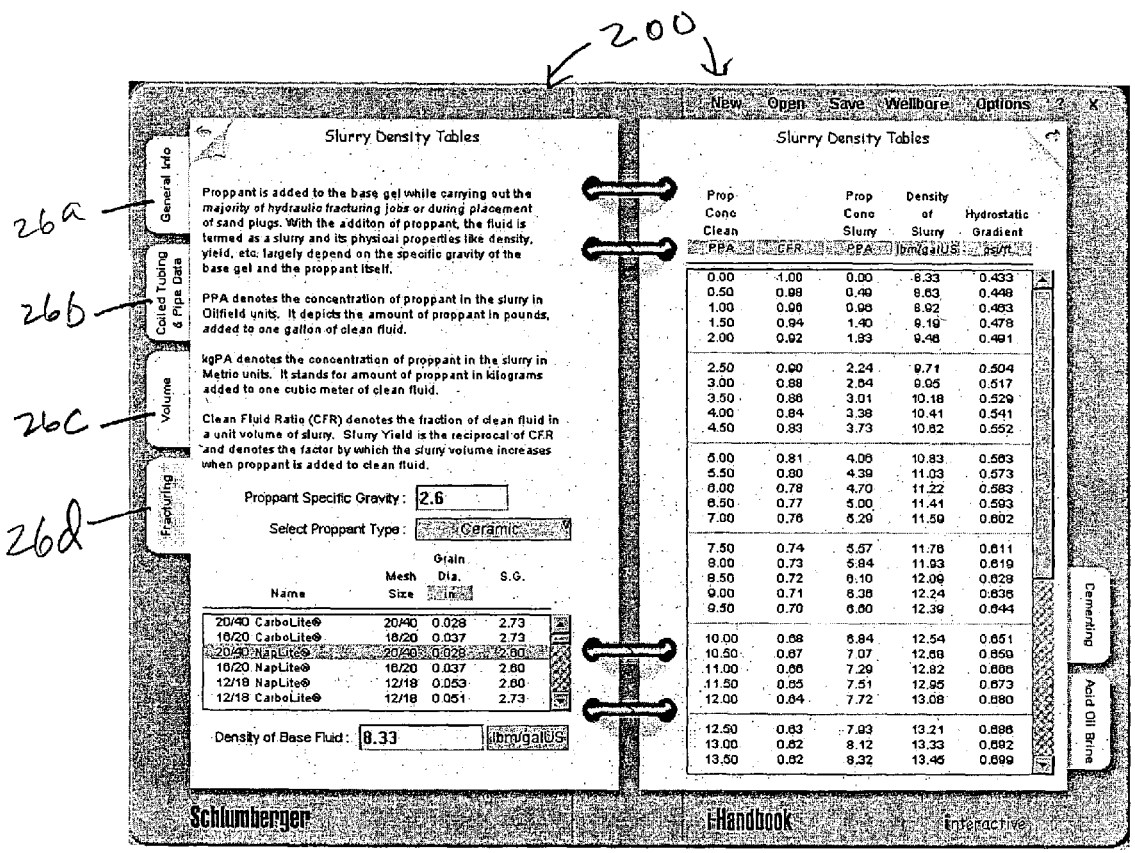
FIG 10   Slurry Density Calculations

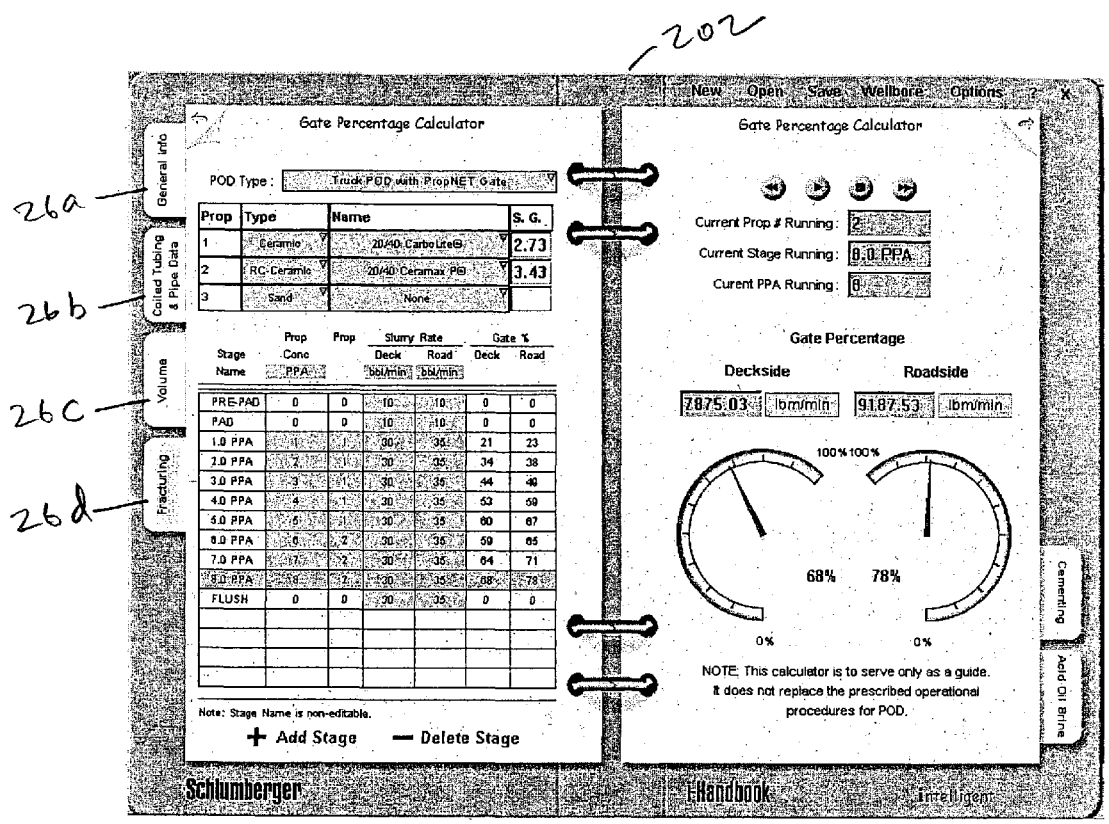
FIG 11  Generating Gate% Charts for a given pump schedule

FIG 12 Screen out calculations

FIG 13    Cement Slurry Calculations showing the property of blended cement

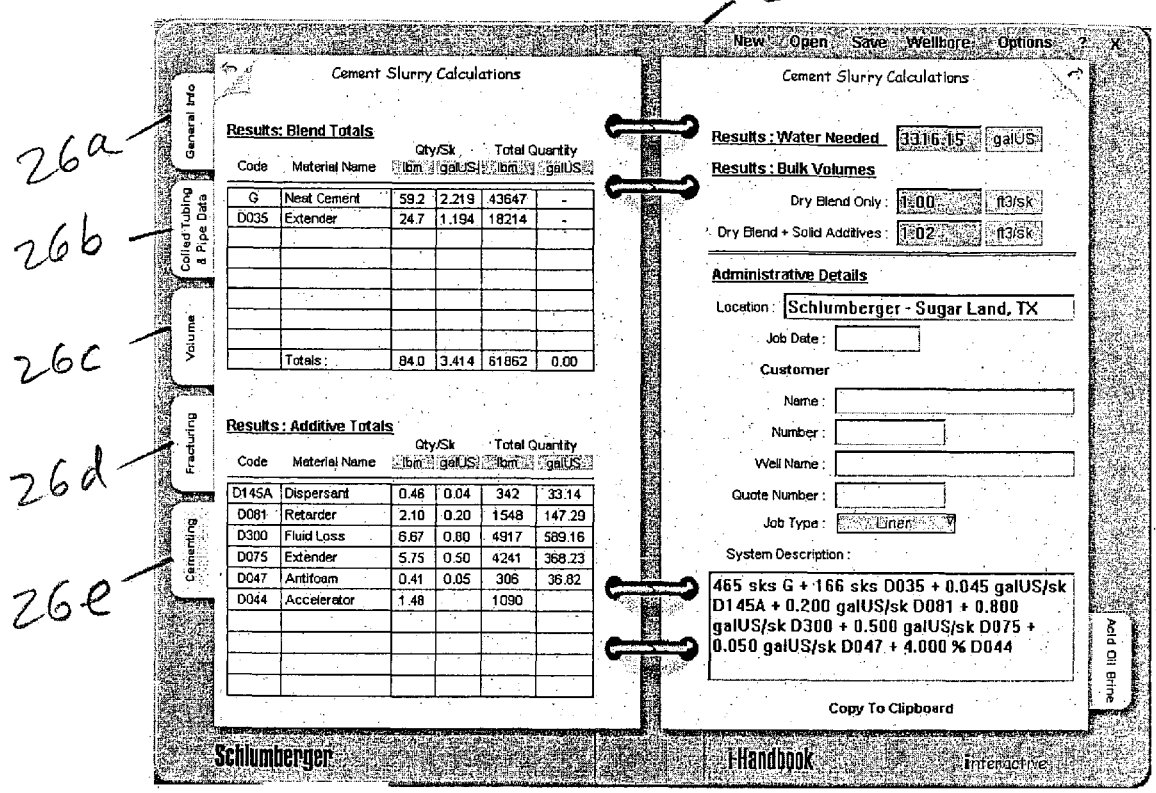
FIG. 14  Bulk Plant loading guide is generated based on the user inputs FIG 15  Casing Lift calculations

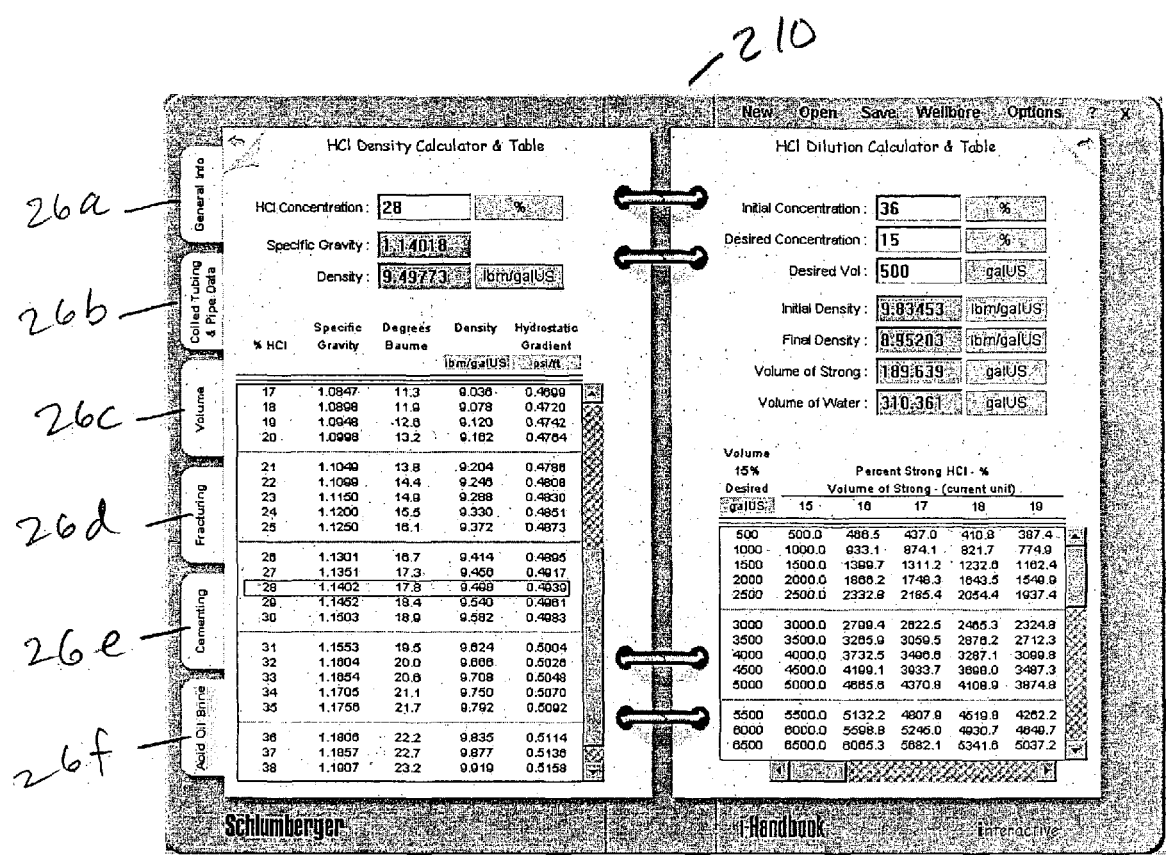
FIG 16  Calculations showing density and dilution for Hydrochloric acid

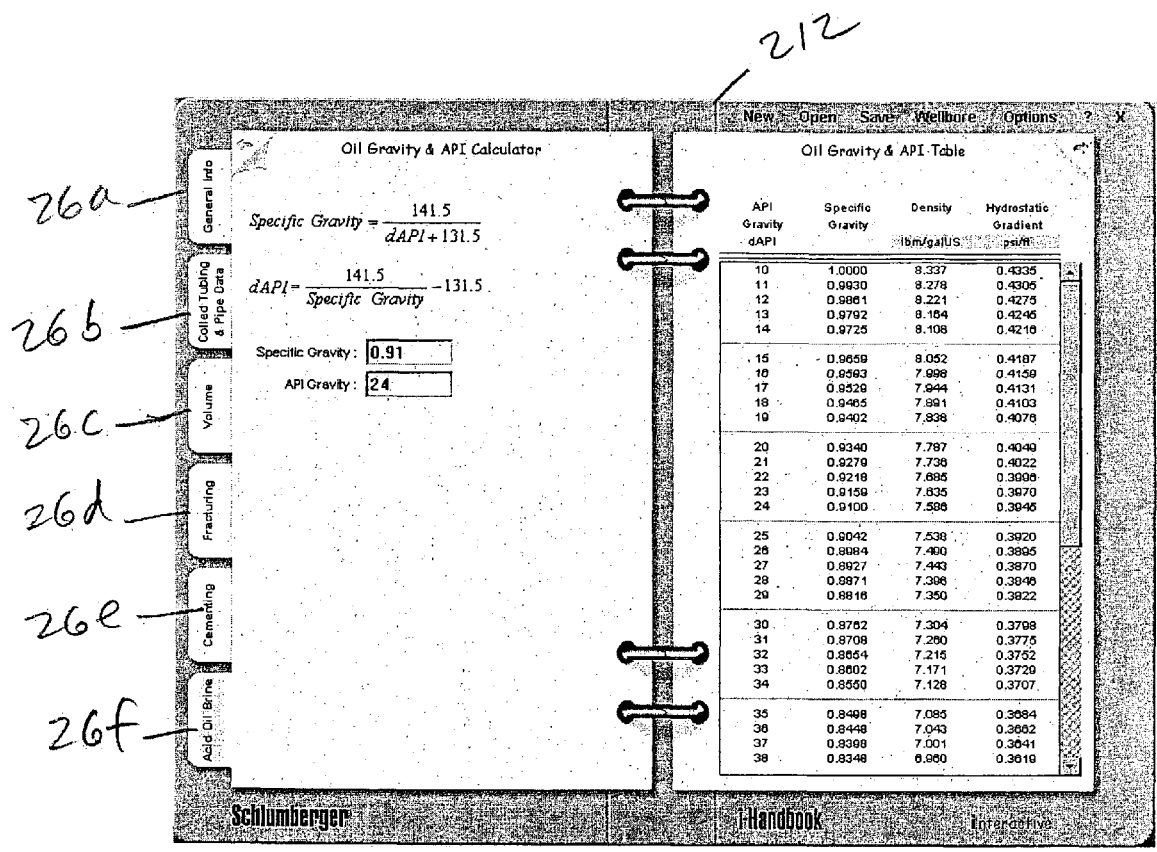
FIG 17  Computing API gravity from Specific gravity of oil and vice versa

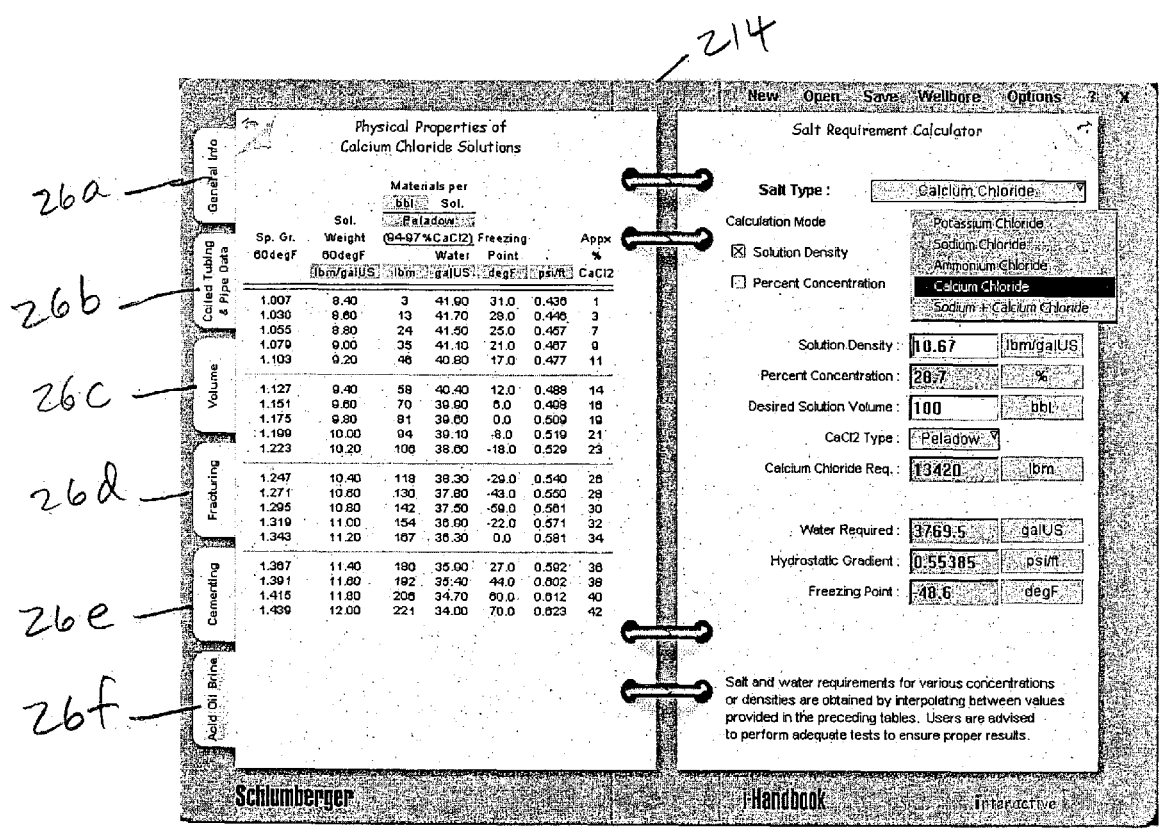
FIG 18   Salt interpolating table

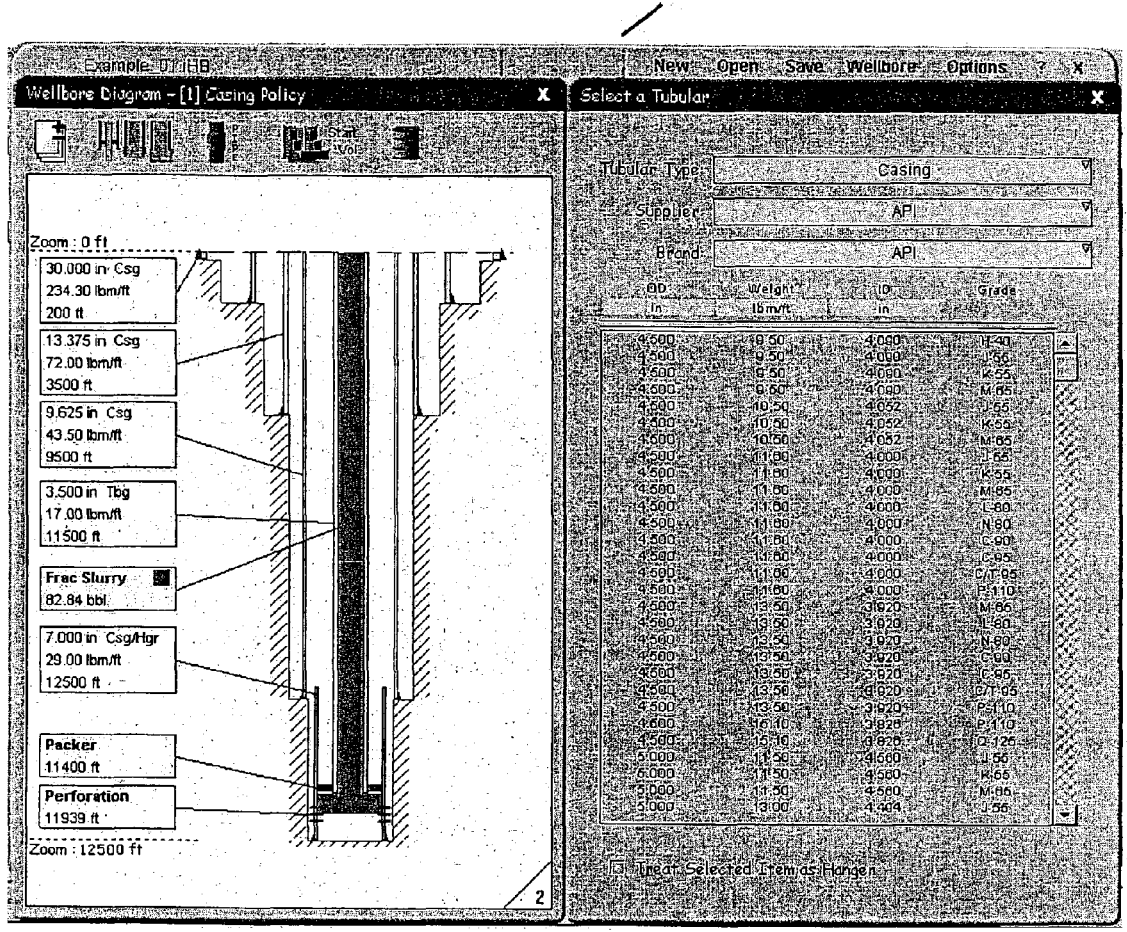
FIG 19    Wellbore Diagram feature

FIG 21 Various features of i-Handbook that pertain to "page control" module.

FIG 22  Table Control feature allows proper display of output results and also ability to copy the data and paste it in any cell-based software such that the value in individual cells remains editable.

FIG 23 . i-Handbook Application on Windows Desktop.

FIG. 24 Extended functionality over physical Field Data Handbook

FIG 25 Primary areas of i-Handbook

FIG 26  Layers in i-Handbook

FIG 27  Functional Flow Diagram

METHOD AND SYSTEM AND PROGRAM STORAGE DEVICE FOR STORING OILFIELD RELATED DATA IN A COMPUTER DATABASE AND DISPLAYING A FIELD DATA HANDBOOK ON A COMPUTER DISPLAY SCREEN

CROSS-REFERENCE TO RELATED APPLICATIONS

This Application Claims the benefit of U.S. Provisional Patent Application No. 60/404,015, filed on Aug. 16, 2002.

BACKGROUND OF THE INVENTION

The subject matter of the present invention relates to the art of wellbore services, and, more particularly, to a method and system and program storage device adapted for displaying a user-friendly 'i-handbook' which can be displayed on a personal computer adapted for retrieving and/or calculating and displaying a set of field data for the user that can used for constructing and stimulating subterranean wellbores utilized for water or hydrocarbon production.

Hand held handbooks containing relevant field data are currently being used in the water and gas industry. Industry personnel would rather flip through the pages of a convenient sized hand-held handbook than browse endlessly through word/pdf files to find an answer to a particular technical question. Technical handbooks typically contain a collection of reference data (such as values of certain constants). The reference data are often conveniently classified using commercial names. The collection of reference data also typically comprises lists of equations, such as formulae for converting from one set of units to another set of units. Specific utilities based, for instance, on spreadsheets have been developed to help field engineers in designing and managing operations.

Although the above mentioned hand-held handbooks have long been recognized as being extremely useful and convenient tools, they have several limitations. First, a compromise must be found between the amount of information provided by the hand-held handbook and the size of the handbook. In the oilfield industry, the compromise could mean that most data in the hand-held handbook is provided in the form of imperial units and a conversion table is provided for converting from the imperial units to other types units. However, this practice of converting from one set of units to another set of units may increase the number of errors generated during the conversion. Second, it is almost impossible to provide all users with updated versions of the hand-held handbook and ensure that they all use the correct version of the handbook, especially when the users are physically located throughout the world.

Therefore, it would be desirable to provide a computerized handbook (otherwise known as an 'i-handbook') which is adapted to be stored in a memory of a personal computer or other computer system and displayed on a display screen of the personal computer for assisting field personnel, such as design engineers or field engineers or treatment supervisors, in the performance of their respective job related duties and responsibilities.

SUMMARY OF THE INVENTION

One aspect of the present invention involves a method of determining data, comprising the steps of: (a) displaying a handbook on a computer display screen, the handbook including a left page, a right page, and at least one binder ring interconnecting the left page to the right page; (b) locating a page in the handbook being displayed on the computer display screen; and (c) determining the data from the page in the handbook being displayed on the computer display screen, the data determined during the determining step (c) being displayed on the computer display screen.

A further aspect of the present invention involves a method of constructing a wellbore diagram, comprising the steps of: (a) displaying a handbook on a computer display screen; and (b) drawing the wellbore diagram on the handbook being displayed on the computer display screen, the wellbore diagram being constructed in response to the drawing step (b).

A further aspect of the present invention involves a program storage device readable by a machine tangibly embodying a program of instructions executable by the machine to perform method steps for determining data, the method steps comprising: (a) displaying a handbook on a display screen of the machine, the handbook including a left page, a right page, and at least one binder ring interconnecting the left page to the right page; (b) displaying a page in the handbook on the display screen of the machine in response to an input instruction; and (c) determining the data from the page in the handbook being displayed on the display screen of the machine in response to a set of input data and a further set of data stored in a database, the data determined during the determining step (c) being displayed on the display screen of the machine.

A further aspect of the present invention involves a program storage device readable by a machine tangibly embodying a program of instructions executable by the machine to perform method steps for constructing a wellbore diagram, the method steps comprising: (a) displaying a handbook on a view screen of the machine; and (b) in response to one or more input instructions, displaying the wellbore diagram on the handbook that is being displayed on the view screen of the machine, the wellbore diagram being constructed in response to the displaying step (b).

A further aspect of the present invention involves a system adapted for determining data, comprising: apparatus adapted for displaying a handbook on a computer display screen, the handbook including a left page, a right page, and at least one binder ring interconnecting the left page to the right page; apparatus adapted for locating a page in the handbook being displayed on the computer display screen; and apparatus adapted for determining the data from the page in the handbook being displayed on the computer display screen, the data being displayed on the computer display screen.

A further aspect of the present invention involves a system adapted for constructing a wellbore diagram, comprising: apparatus adapted for displaying a handbook on a computer display screen; and apparatus adapted for drawing and constructing the wellbore diagram on the handbook being displayed on the computer display screen.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein:

FIGS. 2 through 19 illustrate a plurality of pages in the 'i-Handbook' which are displayed on a display screen of the personal computer of FIG. 1 when the processor of the personal computer of FIG. 1 executes the 'i-Handbook software' of the present invention using the data in a database stored in the memory of the personal computer, and wherein some of the pages in the 'i-Handbook' of FIG. 1 are illustrated in the following figures of drawing, as follows:

FIGS. 2 and 2A illustrate a set of results from a Unit Conversion Calculator,

FIG. 3 illustrates a set of standard conversion factors stored in the 'i-Handbook'.

FIG. 4 illustrates computing volumes for a single acting triplex pump,

FIG. 5 illustrates computing tank volumes and generating tank straps,

FIG. 6 illustrates a display of supplier tubular data and the ability to search a database, FIG. 7 illustrates calculation of tubular stretch and free point, FIG. 8 illustrates tubular capacities and displacement volumes, FIG. 9 illustrates annulus volume calculations, FIG. 10 illustrates slurry density calculations, FIG. 11 illustrates generating gate % charts for a given pump schedule, FIG. 12 illustrates screen out calculations, FIG. 13 cement slurry calculations showing the property of blended cement, FIG. 14 illustrates how a bulk plant loading guide is generated based on user inputs, FIG. 15 illustrates casing lift calculations, FIG. 16 illustrates calculations showing density and dilution for Hydrochloric acid, FIG. 17 illustrates computing API gravity from Specific gravity of oil and vice versa, FIG. 18 illustrates a salt interpolating table, FIG. 19 illustrates the wellbore diagram feature;

DESCRIPTION OF THE INVENTION

Figure 1:
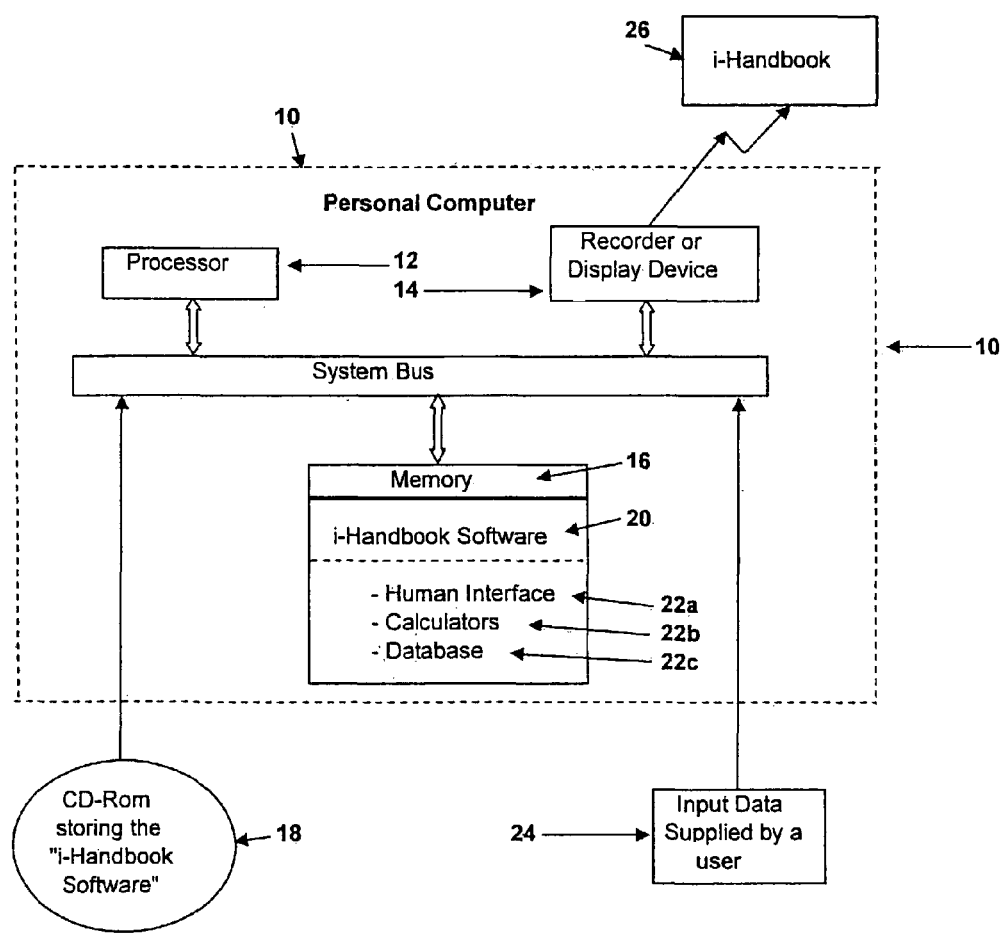
FIG. 1 illustrates a personal computer, or other computer system, which stores a software package, hereinafter known as the 'i-Handbook software' of the present invention, and a database, and which displays an 'i-Handbook' on a display screen of a display device of the personal computer when a processor of the personal computer executes the 'i-Handbook software' of the present invention stored in a memory.

Referring to FIG. 1, a personal computer 10 is illustrated. The personal computer 10 can be a desk, top computer or a laptop computer or a palm-pilot computer. The personal computer 10 includes a processor 12 connected to a system bus, a recorder or display device 14 connected to the system bus for displaying or recording images, and a memory 16 connected to the system bus. A CD-Rom 18 stores a software known as the 'i-Handbook software'. When the CD-Rom 18 is inserted into the personal computer 10, the 'i-Handbook software' is loaded from the CD-Rom 18 into the memory 16 of the personal computer 10. At this point, the memory 16 stores the 'i-Handbook' software 20, the 'i-Handbook' 'software' 20 including a human interface 22a, calculators 22b, and a database 22c which stores a multitude of data used for performing calculations by the calculators 22b, to be discussed later in this specification with reference to FIG. 20. In addition, input data 24 supplied by a user is also provided to the personal computer 10, the system bus receiving that input data 24. In operation, when the processor 12 of the personal computer 10 executes the 'i-Handbook software' 20 utilizing the data in, the database 22c and the input data 24 supplied by the user, the recorder or display device 13 of the personal computer 10 will generate an output hereinafter known as the 'i-Handbook' 26. The 'i-Handbook' 26 will be discussed in greater detail later in this specification. The personal computer 10 may be a desk top computer, a laptop computer, a palm pilot computer, a workstation, or a mainframe. Examples of possible workstations include a Silicon Graphics Indigo 2 workstation or a Sun SPARC workstation or a Sun ULTRA workstation or a Sun BLADE workstation. The memory 16 is a computer readable medium or a program storage device which is readable by a machine, such as the processor 12. The processor 12 may be, for example, a microprocessor, microcontroller, or a mainframe or workstation processor. The memory 16, which stores the 'i-Handbook software' 20 of the present invention, may be, for example, a hard disk, ROM, CD-ROM, DRAM, or other RAM, flash memory, magnetic storage, optical storage, registers, or other volatile and/or non-volatile memory.

In FIG. 1, the 'i-Handbook' 26 in accordance with the present invention can be stored in a personal computer and it can be launched and displayed on a display screen of the recorder or display device 14 of the personal computer 10 by using a mouse to click an icon that is located at the bottom: of the display screen. The 'i-Handbook' 26 will enable the user to refer to relevant data (such as, wellbore data) at any location or time. The personal computer 10 can be a personal desk-top computer, or a laptop computer, or a palm pilot-type computer, or any other type of computer or data processing system. The 'i-Handbook' 26 according to the present invention includes "tabs" or "eye-catchers" to demarcate various sections of the handbook and a "contents" page to display the contents of each section of the handbook. When certain 'desired data' can be calculated mathematically using 'other data' and 'equations or formulas or algorithms' already stored in the computer system memory, instead of storing the 'desired data' in the memory, the 'desired data': is calculated. As a result, the size of the database 22c stored in the computer system memory 16 will be maintained at a minimum. Options are preferably provided when the user wishes to view one data set or the entire series. Apart from its user-friendly interfaces, additional features of the 'i-Handbook' 26 (which are designed to aid in the easy use of the handbook) may include: providing help files for all major topics, displaying results in detail or selectively, printing any useful information, and quickly accessing any desired information. The 'i-Handbook' 26 preferably stores capacity/volume data for various tubular goods which generally comprise a portion of the construction of a wellbore. For example, wellbore data related to tubing or 'casing or drill pipe generally' include 'tubular diameter' and 'weight' and 'capacity per unit length'. The 'i-Handbook' 26 also stores volumetric data associated with various annulus areas located between an outer wall of a cased or open hole and a tubing that is located inside the annulus areas. Other important types of data that are stored in the 'i-Handbook' 26 include information regarding the physical properties of cement slurries, fracturing related proppant (usually Ottawa sand), tables to calculate sand fill in casings, and sometimes Nitrogen and $CO_2$ volume factors to calculate their volumes for specified temperature and pressure. The 'i-Handbook' 26 should preferably store and include the following sections, the contents of which are explained in the next section of this specification:

Tubular—OD,ID, Drift Diameter, burst, collapse, tensile yields,
Coil Tubing Data—sizes, grades, types and properties,
Tubular thread identifier+thread interchangeability guide,
Cement slurry Yield and Additive Calculations; update tables,
Units Conversion Compatibility,
Sand Fill Charts for all types of sands,
Brine Calculator, Density Calculator,
CO2 and N2 hydrostatic calculator along with PVT properties tables,
Inclusion of perforation friction and number of holes open, and The 'i-Handbook' 26 of FIG. 1

Referring to FIGS. 2 through 19, a detailed description of the contents of the 'i-Handbook' 26 of FIG. 1 is illustrated.

The 'i-Handbook' 26 is an electronic form of a 'hand-held version of a Field Data Handbook' that is often used by field personnel in the oil & gas industry to assist in routine jobs. However, the electronic form of the 'i-Handbook' 26 not only displays a 'set of desired data' but it also helps in computing and calculating a 'further set of desired results' with the help of the 'set of desired data'. This eliminates the time-consuming and error-prone procedure of using the 'hand-held version of the Field Data Handbook' to first assimilate the data and then using a separate calculator to obtain the set of results.

In FIGS. 2-19, the 'i-Handbook' 26 includes at least six (6) tabs, a first tab 26a labeled "General Info', a second tab 26b labeled 'coiled tubing and pipe data', a third tab 26c labeled 'volume', a fourth tab 26d labeled 'fracturing', a fifth tab 26e labeled 'cementing', and a sixth tab 26f labeled 'Acid Oil Brine'. The contents associated with each tabbed section of the 'i-Handbook' 26 will be discussed in detail below.

Figure 2A:
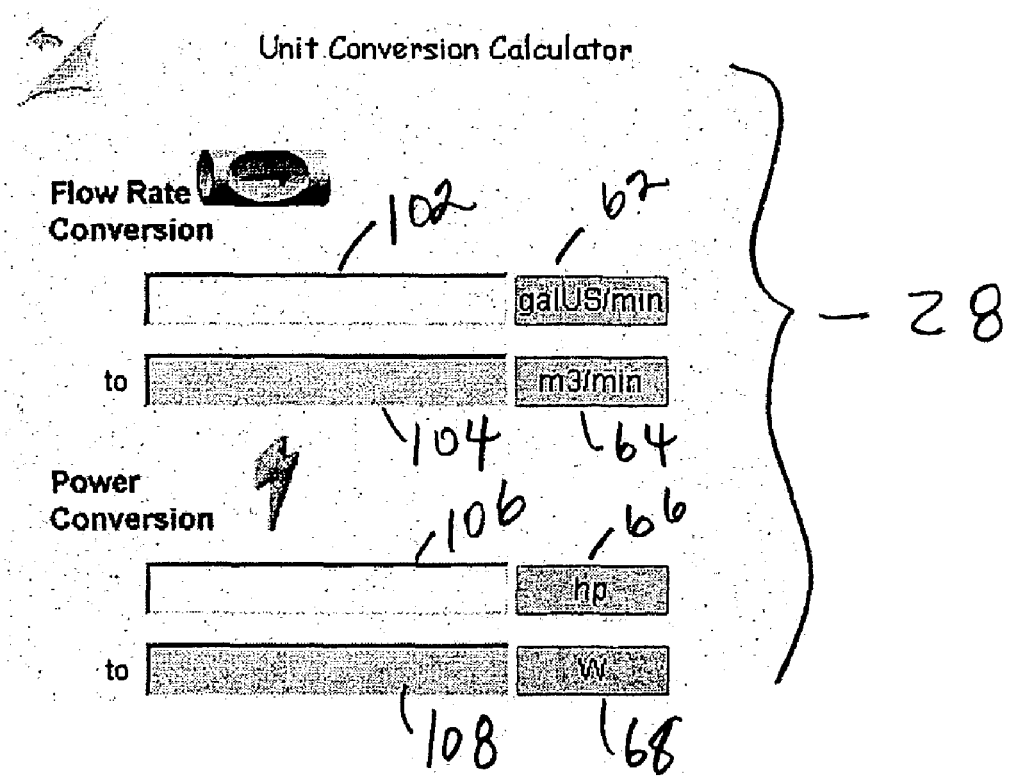

In FIGS. 2, 2A, and 3, a first page ('conversion factors' and 'Unit Conversion Calculator') associated with a first tab 26a (labeled 'General Info') in the 'i-Handbook' 26 of FIG. 1 is illustrated. In FIGS. 2 and 2A and 3, the results using the Unit Conversion Calculator will be discussed.

In FIG. 3, a group of pages associated with the first tab 26a includes a 'table showing a plurality of conversion factors'. A small example of the 'table showing a plurality of conversion factors' in the 'i-Handbook' 26 is shown in FIG. 3, although the table in the 'i-Handbook' 26 is actually several pages in length. For example, in FIG. 3, the conversion factors for converting 'meter' to either 'feet' or 'inches' or 'yards' is illustrated. As an example, the conversion factor for converting 'meters' into 'feet' is '1 m=3.281 feet'. Therefore, for 27 meters, the number of feet is determined as noted in FIG. 3 and duplicated as follows: 27×3.281 ft/m=88.5827 ft. The 'table showing a plurality of conversion factors' associated with the first tab 26a displays useful formulas related to field work. Non-limitative examples of the formulas associated with the 'table showing a plurality of conversion factors' of FIG. 3 are given below, as follows:

| Multiply | by | Obtain |
|---|---|---|
| acre | 43560 | square feet |
| acre | 4046.846 | square meters |
| acre | 160 | square ro.d.s |
| acre | 5645.4 | square varas (texas) |
| acre | 0.4046846 | hectares |
| acre-foot | 7758 | barrels |
| acre-foot | 1233.489 | cubic meters |
| atmosphere | 33.94 | feet of water |
| atmosphere | 29.92 | inches of mercury |
| atmosphere | 760 | millimeters of mercury |
| atmosphere | 14.7 | pounds per square inch |
| barrel | 5.6146 | cubic feet |
| barrel | 0.1589873 | cubic meters |
| barrel | 42 | gallons (US) |
| barrel | 158.9873 | liters |
| barrel per hour | 0.0936 | cubic feet per |
| barrel per hour | 0.7 | gallons (US) per minute |
| barrel per hour | 2.695 | cubic inches per second |
| barrel per day | 0.02917 | gallons per minute |
| British thermal unit | 1055.056 | joule |
| British thermal unit | 0.2928 | watt hour |
| Btu per minute | 0.02356 | horsepower |
| centimeter | 0.0328084 | feet |
| centimeter | 0.393701 | inches |
| centimeters of mercury | 0.1934 | pounds per square inch |
| chains | 66 | feet |
| chains | 4 | ro.d.s |
| cubic centimeter | 0.061024 | cubic inches |
| cubic foot | 0.1781 | barrels |
| cubic foot | 7.4805 | gallons (US) |
| cubic foot | 28.32 | liters |
| cubic foot of steel | 489.6 | pounds of steel |
| cubic foot | 1728 | cubic inches |
| cubic foot | 0.0283169 | cubic meters |
| cubic foot | 0.03704 | cubic yards |
| cubic foot per minute | 10.686 | barrels per hour |
| cubic foot per minute | 28.8 | cubic inches per second |
| cubic foot per minute | 7.481 | gallons (US) per minute |
| cubic inch | 16.38706 | cubic centimeters |
| cubic inch | 0.00058 | cubic feet |
| cubic inch | 0.00433 | gallons (US) |
| cubic inch | 0.0163871 | liters |
| cubic meter | 6.289811 | barrels |
| cubic meter | 35.31466 | cubic feet |
| cubic meter | 1.30795 | cubic yards |
| cubic yard | 4.8089 | barrels |
| cubic yard | 27 | cubic feet |
| cubic yard | 46656 | cubic inches |
| cubic yard | 0.7645549 | cubic meters |
| foot | 30.48 | centimeters |
| foot | 0.3048 | meters |
| foot | 0.36 | varas (Texas) |
| foot of water @ 60 deg F. | 0.4331 | pounds per square inch |
| foot per second | 0.68182 | miles per hour |
| foot-pound per second | 0.001818 | horsepower |
| gallon (US) | 0.02381 | barrels |
| gallon (US) | 3785412 | cubic centimeters |
| gallon (US) | 0.1337 | cubic feet |
| gallon (US) | 231 | cubic inches |
| gallon (US) | 3.785412 | liters |
| gallon (UK) | 4.546092 | liters |
| gallon (US) | 0.8327 | gallons (UK) |
| gallon (US) per minute | 1.429 | barrels per hour |
| gallon (US) per minute | 0.1337 | cubic feet per minute |
| gallon (US) per minute | 0.002228 | cubic feet per second |
| gallon (US) per minute | 34.286 | barrels per day |
| grain (avoirdupois) | 0.0648 | grams |
| grain per gallon (US) | 17.118 | parts per million |
| grain per gallon (US) | 142.86 | pounds per million gallons |
| grain per gallon (US) | 0.01714 | grams per liter |
| gram | 15.432 | grains |
| gram | 0.001 | kilograms |
| gram | 1000 | milligrams |
| gram | 0.03527 | ounces |
| gram | 0.002205 | pounds |
| gram per liter | 58.418 | grains per gallon (US) |
| hectare | 2.47106 | acres |

-continued

| Multiply | by | Obtain |
|---|---|---|
| hectare | 0.01 | square kilometers |
| horsepower | 33000 | foot pounds per minute |
| horsepower | 550 | foot pounds per second |
| horsepower | 1.014 | horsepower (metric) |
| horsepower | 0.7456999 | kilowatts |
| inch | 2.54 | centimeters |
| inch | 0.08333 | feet |
| inch of mercury | 1.134 | feet of water |
| inch of mercury | 0.4912 | pounds per square inch |
| inch of water @ 60 deg F. | 0.0361 | pounds per square inch |
| kilogram | 1000 | grams |
| kilogram | 2.20462 | pounds |
| kilogram per square cm | 14.223 | pounds per square inch |
| kilometer | 3280.84 | feet |
| kilometer | 0.6214 | miles |
| kilowatt | 1.34102 | horsepower |
| liter | 1000 | cubic centimeters |
| liter | 61.02 | cubic inches |
| liter | 0.2642 | gallons |
| liter | 1.0567 | quarts |
| meter | 100 | centimeters |
| meter | 3.281 | feet |
| meter | 39.3701 | inches |
| meter | 1.094 | yards |
| mile | 5280 | feet |
| mile | 1.609 | kilometers |
| mile | 1900.8 | varas (Texas) |
| mile per hour | 1.4667 | feet per second |
| ounce (avoirdupois) | 437.5 | grains |
| ounce (avoirdupois) | 28.34952 | grams |
| part per million | 0.05835 | grains per gallons (US) |
| part per million | 8.34 | pounds per million gallons |
| pound (mass) | 7000 | grains |
| pound (mass) | 453.5924 | grams |
| pound (mass) per gallon | 0.1198264 | grams per cubic centimeter |
| pound per gallon (US) | 0.052 | pounds/sq. in/ft. of depth |
| pound per square inch | 2.309 | feet of water at 60 deg F. |
| pound per square inch | 2.0353 | inches of mercury |
| pound per square inch | 51.697 | millimeters of mercury |
| pound per square inch | 0.0703 | kilograms per sq. cm |
| pound per square inch | 6.894757 | kilopascals |
| pound per million gallon | 0.11982 | parts per million |
| quart | 0.9463529 | liters |
| quart | 946.3529 | milliliters |
| quintal (Mexican) | 101.467 | pounds |
| ro.d. | 16.5 | feet |
| square centimeter | 0.155 | square inches |
| square foot | 929.0304 | square centimeters |
| square foot | 0.09290304 | square meters |
| square inch | 6.4516 | square centimeters |
| square kilometer | 0.3861 | square miles |
| square meter | 10.76391 | square feet |
| square meter | 1.19588541 | square yards |
| square mile | 640 | acres |
| square mile | 2.59 | square kilometers |
| square mile | 0.8361 | square meters |
| long ton (UK) | 2240 | pounds |
| metric ton | 2205 | pounds |
| short ton (US) | 2000 | pounds |
| metric ton | 1.102 | short ton (US) |
| metric ton | 1000 | kilograms |
| metric ton | 6.297 | barrels of water @ 60 deg F. |
| short ton (US) | 907.1847 | kilograms |
| short ton (US) | 0.9071847 | tons (metric) |
| vara (Texas) | 2.7778 | feet |
| yard | 0.91444 | meters |

In FIGS. 2 and 2A, another group of pages associated with the first tab 26a of the 'i-Handbook' includes a 'conversion calculator' 28. The 'conversion calculator' 28 includes a plurality of 'buttons' 30 through 68, each of, the 'buttons' adapted to be 'pressed' by using a mouse to click on each of the 'buttons' 30-68. The 'conversion calculator' 28 also includes a plurality of 'data boxes' 70 through 108 in which a number or other data will appear. If a user clicks a 'button' 30, for example, a first plurality of units will appear in a 'drop down menu'. Similarly, if the user clicks any one of 'buttons' 32 through 68 shown in FIGS. 2 and 2A, another plurality of units will also appear in a 'drop down menu' associated with each 'button' 32-68. In operation, the 'conversion calculator' 28 of FIGS. 2 and 2A will function as follows. Referring to the 'input data supplied by a user' 24 in FIG. 1, assume that a user will enter the number '27' (representing meters) in 'data box' 70 of FIG. 2 when 'meters' is associated with 'button' 30 and 'feet' is associated with 'button' 32. When the user then presses the 'enter' key on his keyboard, the number '88.5827' (representing 'feet') will appear in 'databox' 72. Similarly, if a user enters a number in any one of 'data boxes' 74, 78, 82, 86, 90, 94, 98, 102, and 106 (representing a first unit) of the 'conversion calculator' 28 of FIGS. 2 and 2A, and when the user depresses the 'enter' key on his keyboard, another number will appear automatically in any one of 'data boxes' 76, 80, 84, 88, 92, 96, 100, 104, and 108 (representing a second unit).

In FIGS. 2 and 2A, in order to provide an intuitive access at first glance, symbols are preferably used to differentiate each type of conversion. This can be done for instance by using a thermometer for temperature conversion, a ruler for length units, etc. The use of color is used to indicate to the user that other units can be selected. For instance a click on 'degr F.' will trigger a popup selection listing 'degr C., degr K., degr R.'. The last selection is preferably kept in memory to minimize input by users. The 'conversion calculator' 28 also uses fractions, such as $\frac{1}{64}^{th}$ of an inch.

In FIG. 4, a second page (computing volumes for a 'Single Acting Triplex Pump') associated with a first tab 26a (labeled 'General Info') in the 'i-Handbook' 26 of FIG. 1 is illustrated. In FIG. 4, the computation of volumes for a Single Acting Triplex Pump will be discussed.

In FIG. 4, reciprocating pumps, like mud-pumps, are a major part of the oil industry and are used for pumping and circulation of drilling mud while the well bore is being drilled. In routine drilling jobs, the driller may be required to compute displacement volumes, volume displaced for a particular number of pump strokes, total time required to pump a particular volume at a given rate, etc. This calculator shown in FIG. 4 helps in carrying out these multiple operations, with a click of a mouse, by efficiently utilizing the 'input data supplied by a user' 24 in FIG. 1.

In FIG. 4, the 'Single Acting Triplex Pump' calculator 110 shown in FIG. 4 includes a first section entitled 'Pump Parameters' 112, a second section entitled 'Pump Calculator' 114, a third section which is an animated picture showing the pump in operation 116, a fourth section including a data box 118 showing the number of strokes of the pump, and a fifth section including a pair of data boxes 120a and 120b and an associated pair of 'buttons' 120c and 120d, the first data box 120a being indicative of 'volume' in barrels ('bbl') and the second data box 120b being indicative of 'time' in minutes ('min'). When the 'buttons' 120c and 120d of the fifth section of the calculator 110 of FIG. 4 are 'clicked-on' using a mouse, a drop down menu will appear allowing the user to select another set of units, other than 'bbl' and 'min'.

The first section entitled 'Pump Parameters' 112 includes the following plurality of 'data boxes' and their associated 'buttons', as follows:
data box 'Efficiency' 112a and button '%' 112f,
data box 'Stroke length' 112b and button 'in' 112g,
data box 'Liner ID' 112c and button 'in' 112h, data box 'Displacement/Liner' 112d and button 'bbl' 112i, and data box 'Displacement/Stroke' 112e and button 'bbl' 112j.

When the buttons 112f, 112g, 112h, 112i, and 112j are depressed, a drop down menu will appear enabling a user to select a different set of units.

The second section entitled 'Pump Calculator' 114 includes the following data boxes and associated buttons, as follows:

data box 'pump rate' 114a in strokes/min,
data box 'time' 114b and button 'min' 114e,
data box 'volume' 114c and button 'bbl' 114f, and
data box '# strokes' 114d.

When the buttons 114e and 114f are depressed, a drop down menu will appear enabling a user to select a different set of units.

When the Efficiency 112a and Stroke Length 112b and Liner ID 112c and 'pump rate' 114a and 'time' 114b are entered by the user via a keyboard (i.e., via the 'input data' block 24 in FIG. 1) and when the 'enter' key on the keyboard is depressed, the Displacement per Liner 112d, the Displacement per Stroke 112e, the 'volume' 114c, and the '# strokes' 114d are automatically calculated by the calculator 110 shown in FIG. 4. At that time, when the 'volume' 114c and '# strokes' 114d are calculated, the animated picture of the pump 116 in the third section of the calculator 110 will begin to move thereby illustrating a pump that is alternately moving in one direction and then in an opposite direction during a pumping operation. Assuming that the '# strokes' 114d shows a value of 60, as illustrated in FIG. 4, the animated picture of the moving pump 116 will continue its pumping operation until the 'strokes' 118 reaches 60, at which time, the animated picture of the pump 116 will stop its pumping operation. When the pump 116 stops its pumping operation, the 'volume' 120a and the 'time' 120b can be read from their respective data boxes 120a and 120b. The 'time' in data box 120b should be equal to the 'time' in data box 114b.

In the example shown in FIG. 4, 'stroke length' 112b and 'liner ID' 112c are used to calculate the 'displacement/liner' 112d and that value is multiplied by the 'efficiency' 112a to provide 'actual displacement'. Given the fact that the pump is a triplex, the 'actual displacement' is multiplied by 3 to compute the 'displacement/stroke' 112e. For example, review the following equations and calculations associated with the 'Pump Parameters' 112 section of the calculator 110 shown in FIG. 4; these equations are stored as part of the 'i-Handbook' software 20 of FIG. 1, as follows:

$$\text{Displacement/Liner} = \frac{\pi}{4} \times ID^2 \times Stk\ Lgth \times Eff$$
$$= \frac{\pi}{4} \times 6.5^2\ in^2 \times 12\ in \times 0.95 \times \frac{bbl}{9702\ in^3}$$
$$= 0.039\ bbl$$

$$\text{Displacement/Stroke} = 0.039 \times 3 = 0.117\ bbl/Stroke$$

$$\text{Volume} = \text{Pump Rate} \times \text{Time to pump} \times \text{Displacement/Stroke}$$

$$\text{Volume} = 60\ \frac{Strokes}{min} \times 1\ min \times 0.117\ \frac{bbl}{Stroke} = 7.018\ bbl$$

Although the values being shown on the display screen of the display device 14 of FIG. 1 are rounded off for a better visual effect, the accuracy in the calculation is maintained. The stroke counter, along with the volume and the time indicator in the right animation screen, is a useful tool for the driller because it indicates the volume pumped thus far, and the time elapsed for a particular value of total strokes. The calculator shown in FIG. 4 is provided for the four (4) most common types of pumps used in the industry, namely, a single acting triplex, a single acting duplex, a double acting triplex, and a double acting duplex type of pump. Double acting pumps add some complexity to the problem because of additional rod volume that should be deducted from the liner volume.

In FIG. 5, a third page ('Horizontal Cylindrical Tank—Strap Chart') associated with a first tab 26a (labeled 'General Info') in the 'i-Handbook' 26 of FIG. 1 is illustrated. In FIG. 5, the computation of tank volumes and generating tank straps will be discussed.

In FIG. 5, the third page ('computing tank volumes and generating tank straps') includes a picture of a tank 124 having dimensions D for 'Diameter', L for 'Length', and B for 'End Cap' as shown. Data boxes 126 requiring data entry by a user, and their associated buttons 128, are illustrated in FIG. 5. For example, the data boxes 126 which require data entry by a user include: [D] 'Diameter', [L] 'Length', [B] 'End Cap', and 'Depth from Top'. Data boxes 128, which contain data that is calculated in accordance with the data entries in the data boxes 126, include: 'Depth from Top' and 'Current Volume'. In operation, when the user types the required data associated with the tank 124 in FIG. 5 in the 'Diameter', 'Length', 'End Cap', and 'Depth from Top' data boxes 126 in FIG. 5 (see 'input data supplied by user' 24 block in FIG. 1), and when the user depresses the 'enter' key on the keyboard, the 'Depth from Top' and the 'Current Volume' data in the data boxes 128 of FIG. 5 will be calculated. At this time, when the 'Depth from Top' and 'Current Volume' data set forth in data boxes 128 of FIG. 5 are calculated a corresponding entry 130 will be made in the 'Strap Chart' table 132 shown in FIG. 5.

In FIG. 5, this interactive feature, known as 'computing tank volumes and generating tank straps', allows the user to compute the volume for tanks having differing geometries, such as a horizontal and vertical flat head tank, and a horizontal and vertical cylindrical tank, which are among the four most common types of storage tanks found in the industry. In the example shown in FIG. 5, the user can define the tank dimensions 126 and 128 on the left page, and, as a result, a respective strap chart table 132 is generated on the right page. The strap chart table 132 is generated using a local "Table Control" module developed in the software that: enables the margin, displays formats in the cells, displays row highlight, performs table, scroll, and enables the ability to copy and paste the data in other applications, such as Microsoft Word and Excel.

In FIG. 5, referring to data boxes 126, the example simulates a tank that is 10 feet in diameter, 37¾ feet in length with end caps that are 1 foot wide in the middle. Referring to data boxes 128, volume at the depth of interest (3 feet in this case) is computed and also highlighted on line 130 in the adjoining strap chart table 132 that is generated based on the table control feature. The tank level displayed in the picture is of dynamic nature and changes with any change in the user's inputs. This provides additional visualization of tank level to the user.

In FIG. 6, a first page ('Physical Properties of Casings based on Vendor Supplied Data') associated with a second tab 26b (labeled 'Coiled Tubing and Pipe Data') in the 'i-Handbook' 26 of FIG. 1 is illustrated. In FIG. 6, the display of tubular data based on supplier data and the ability to search through a database will be discussed.

This section the i-Handbook pertains to data pertaining to mechanical properties of the various tubular types that are used in construction of a well bore. These include casing, tubing, coiled tubing, drill pipes and hangers. These tubular are usually defined on the basis of their diameters, weight and yield strengths, and given the fact that a large type of them are commercially available, a database was created to store the information. Using the "table control" feature, the data is currently being displayed in a tabular format with row separation every $5^{th}$ row. This makes it easy for the user to view.

The 'i-Handbook' 26 provides tubular information in a quick and easy to use manner, with a unique "search" feature, which makes it easier for the user to locate the proper data in the shortest possible time. Also, the database manager in the program allows the data to be displayed on the basis of supplier and brand name. In example below in FIG. 6, these are shown as "Dalmine S.p.A" and "Antares". It must also be noted that some of the data presented in the display is calculated "on-the-fly" rather than hard-coding it in the database. This helps in limiting the size of the application, thus making it faster in operation. As an example, in FIG. 6 above, Casing OD, Weight, Grade, Wall Thickness, and coupling OD are stored in the database; remaining values like ID, Internal Yield, Collapse Resistance, Tensile Yield and Joint Strengths are all computed based on equations. Apart from search, the "page control" module allows the usage of "2-page" mode for more information on the same tubular type, and the "graphics" control provides the display of scanned joint images.

In FIG. 6, the first page associated with the second tab 26*b* of the 'i-Handbook' 26 of FIG. 1 includes a page 134 labeled 'Physical Properties of Casing based on Vendor Supplied Data' 134. On this page in FIG. 6 and as noted earlier, the 'stored data' (where the 'stored data' is supplied by a vendor) includes the 'Casing OD', 'Weight', 'Grade', 'Wall Thickness', and 'coupling OD', the 'stored data' being stored in the database 22*c*; however, the remaining values like 'ID', 'Internal Yield', 'Collapse Resistance', 'Tensile Yield' and 'Joint Strengths' are all instantly calculated in response to the 'stored data' which is supplied by a user (via the 'input data' block 24 in FIG. 1) using a set of equations which are stored in the database 22*c*.

In FIG. 6, let us now assume that a user has a value of 'OD=7 inch' and 'weight=20.00 lbm/ft' for a casing and that the user wants to search for all the vendors that have or can install casings having that 'OD' and 'weight. In that case, in FIG. 6, click on the 'search icon' 136 shown in FIG. 6, the 'search icon' 136 appearing at the bottom of the screen shown in FIG. 6. When the 'search icon' 136 is 'clicked on' by the user, a 'particular window display' 138 in FIG. 6 will appear on the user's display screen associated with the 'recorder or display device' 14 in FIG. 1. In the 'particular window display' 138, all of the vendors which carry or install casing having an 'OD=7 inch' and a 'weight=20.00 lbm/ft' will be listed in the window 138 of FIG. 6. For example, in FIG. 6, vendor 'Dalmine s.p.A' having a brand name of 'Antares' is listed in the window 138. If the user wants to see a drawing of the 'particular casing' which is sold by the vendors shown in the 'particular window display', 138 of FIG. 6, the user can merely click on the 'display icon' 140 shown in FIG. 6, at which point, another window will appear on the user's display screen 14 showing a drawing of the 'particular casing'.

In FIG. 7, a second page ('Tubular Stretch Calculator—Free Point Calculator') associated with a second tab 26*b* (labeled 'Coiled Tubing and Pipe Data') in the 'i-Handbook' 26 of FIG. 1 is illustrated. In FIG. 7, the calculation of tubular stretch and free point will be discussed.

In FIG. 7, drilling strings or other tubular that are run into a wellbore may be subjected to temporary sticking or stretch and, as a result, field personnel may be required to compute the amount of stretch or, in some cases, the point in the wellbore where the tubular is stuck. These are very important calculations and must yield results with good accuracy. The tubular stretch calculator in FIG. 7 in the 'i-Handbook' 26 of FIG. 1 works on the mechanical property of the tubular under consideration and computes the results based on user's inputs, supplied via the 'input data' block 24 in FIG. 1. FIG. 7 illustrates one such example. The tubular stretch calculator of FIG. 7 associated with the second tab 26*b* of the 'i-Handbook' 26 of FIG. 1 uses the following 'inbuilt equations' in response to the user's 'input data' 24 of FIG. 1 to calculate a 'set of computed results' as follows:

$$\text{Stretch} = \frac{F \text{ (lb)} \times 12 \text{ (in)} L}{A_{cs} \text{ (in}^2) \times (30 \times 10^6) \left(\frac{\text{lb}}{\text{in}^2}\right)}$$

$$= \frac{0.4 \times L \times F}{10^6 A_{cs}} \text{ in} = \frac{(0.4 \times 1000) L \times (1000) F}{10^6 A_{cs}}$$

$$= \frac{0.4 \times L \times F}{A_{cs}}$$

$$A_{cs} = \frac{\pi}{4}(D_o^2 - d_i^2) \text{ in}^2 = \frac{\pi}{4}(5^2 - 4.408^2) \text{ in}^2$$

$$= 4.374 \text{ in}^2$$

$$\therefore \text{Stretch} = \frac{0.4 \times 10 \times 30}{4.374} = 27.433 \text{ in}$$

Converse of this is, using a stretch set at 27.434 inches (see right page of FIG. 7) for the same drill pipe, the 'set of computed results' yields a depth of 10,000 feet, which is the input depth of above example indicating a consistency in results.

In FIG. 7, the Tubular Stretch Calculator 140 is associated with the second tab 26*b* and includes a left page for calculating 'effective stretch' 142 given 'input data' 24 of FIG. 1 which includes the 'OD of a pipe' 144, the 'weight of the pipe' 146, the 'ID of the pipe' 148, and a 'length' 150 of the pipe, the 'length' 150 being the length of the pipe from a point at the surface of the wellbore to a point downhole where the pipe is stuck in a wellbore. For example, assuming that the pipe is stuck downhole at a point (x), the 'length of the pipe from a point at the surface of the wellbore to the point (x) downhole' is the 'length' 150 of the pipe, as shown on the left page of the calculator 140 in FIG. 7. Whereas the left page of the calculator 140 in FIG. 7 will calculate the 'effective stretch' given the 'length of the pipe from a point at the surface of the wellbore to the point (x) downhole', the right page of the calculator 140 in FIG. 7 will calculate the 'length of the pipe from a point at the surface of the wellbore to the point (x) downhole' given the 'effective stretch'.

In FIG. 7, referring to the left page 140*a* of the 'tubular stretch calculator—free point calculator' 140 in FIG. 7, the left page 140*a* of the calculator 140 will calculate the 'effective stretch' given the 'length of the pipe from a point at the surface of the wellbore to the point (x) downhole'. The 'input data' 24 includes the 'OD of a pipe' 144, the 'weight of the pipe' 146, the 'ID of the pipe' 148, a 'length' 150 of the pipe, an upward pulling force or 'Pull' 152, and a 'Young's Modulus for Steel' 154. When the user-depresses the 'enter' key on the keyboard, the 'Effective Stretch' 142 will automatically be calculated. As a result, when the length of the pipe is 10,000 feet (as illustrated in FIG. 7) and when the upward pulling force is 30,000 lbm, using a Young's modulus of 3e+007, an 'Effective Stretch' of 27.4 inches is calculated. Therefore, the pipe will stretch 27.4 inches when the pipe is stuck 10000 feet downhole and an upward pulling force of 30000 lbm is applied to the pipe at the surface of the wellbore when the pipe has a Young's modulus of 3e=007.

In FIG. 7, referring to the right page 140b of the 'tubular stretch calculator—free point calculator' 140 in FIG. 7, the right page 140b of the calculator 140 in FIG. 7 will calculate the 'length of the pipe from a point at the surface of the wellbore to the point (x) downhole' given the 'effective stretch'. The 'input data' 24 includes 'OD of the pipe' 156, the 'weight of the pipe' 158, the 'total stretch' 160, and the 'Young's modulus of the pipe'. Given the 'input data' 24, when a user depresses the 'enter' key on a keyboard, a numerical entry in the 'free point is located at' data box 166 on the right page 140b will be automatically calculated. For example, when the 'OD' 156 and the 'weight' 158 on the right page 140b are the same as the 'OD' 144 and the 'weight' 146 on the left page 140a, and when a 'total stretch' of 27.4 inches on the right page 140b is the same as the 'stretch' 142 on the left page 140a, and when the 'pull' is 30000 lbm and the Young's modulus is 3e=007 psi, and when the user depresses the 'enter' key on the keyboard, a value of 10,000 feet is automatically calculated as the numerical entry in the 'free point is located at' data box 166 on the right page 140b in FIG. 7. As a result, given a stretch of 27.4 inches when an upward pulling force of 30000 lbm is applied to the pipe when the pipe is stuck downhole, the 'length of the pipe from a point at the surface of the wellbore to the point (x) downhole', where the pipe is stuck downhole, is 10000 feet.

In FIG. 8, a first page ('Dimensions and Capacities of Tubing') associated with a third tab 26c (labeled 'Volume') in the 'i-Handbook' 26 of FIG. 1 is illustrated. In FIG. 8, tubular capacities and displacement volumes will be discussed.

In FIG. 8, this section primarily pertains to displaying the capacity of tubular and open holes in various volume gradient units like bbl/ft, ft3/ft, m3/m etc. An Annular capacity calculator is also provided in this section to help the user in determining the capacity of annular spaces between two concentric pipes. This section shown in FIG. 8 utilizes the tubular dimensions that are available in the tubular database mentioned under Section 3.2 and calculates the capacity and displacement by using simple equations. Tubular under consideration are tubing, coiled tubing, casing and drill pipes.

Following is an example calculation for '1.05' in OD with '1.14 lbm/ft' and '0.824 inch' ID tubing:

$$\text{Capacity} = \frac{\pi}{4} ID^2 \ (\text{in}^2) \times \frac{\text{ft}^2}{144 \ \text{in}^2} \times 1 \ \text{ft} \times \frac{\text{bbl}}{5.6146 \ \text{ft}^3}$$

$$\text{Capacity} = \frac{\pi}{4} 0.824^2 \ (\text{in}^2) \times \frac{\text{ft}^2}{144 \ \text{in}^2} \times 1 \ \text{ft} \times \frac{\text{bbl}}{5.6146 \ \text{ft}^3} = 0.000659 \ \frac{\text{bbl}}{\text{ft}}$$

Displacement of a tubular is the amount of fluid it will displace when it is submerged, either open ended or plugged in the well bore filled with some fluid. Calculations are as follows:

$$\text{Disp.(Open)} = \frac{\pi}{4}(OD^2 - ID^2) \ \text{in}^2 \times \frac{\text{ft}^2}{144 \ \text{in}^2} \times 1 \ \text{ft} \times \frac{\text{bbl}}{5.6146 \ \text{ft}^3}$$

$$= \frac{\pi}{4}(1.05^2 - 0.824^2)\frac{1}{144 \times 5.6146}$$

$$= 4.11 \times 10^{-4} \ \frac{\text{bbl}}{\text{ft}}$$

-continued $$\text{Disp.(Plug)} = \frac{\pi}{4}(OD^2) \ \text{in}^2 \times \frac{\text{ft}^2}{144 \ \text{in}^2} \times 1 \ \text{ft} \times \frac{\text{bbl}}{5.6146 \ \text{ft}^3}$$

$$= \frac{\pi}{4}(1.05^2)\frac{1}{144 \times 5.6146}$$

$$= 1.0709 \times 10^{-3} \ \frac{\text{bbl}}{\text{ft}}$$

In FIG. 8, a table entitled 'Dimensions and Capacities of Tubing' 168 is illustrated, the table on the left page and the table on the right page being the same, the table on the right and left pages each having six (6) columns. The six columns comprise the following: given or stored data including the 'OD of the tubing' 170, the 'weight of the tubing' 172, and the 'ID of the tubing' 174, and calculated data including the 'capacity' 176, the 'displacement open' 178, and the 'displacement—plugged' 180. As a result, in FIG. 8, the following columns of data are stored in the database 22c of FIG. 1: the 'OD of the tubing' 170, the 'weight of the tubing' 172, and the 'ID of the tubing' 174. However, in response to certain 'input data' 24 supplied by a user which would include the 'OD of the tubing' 170, the 'weight of the tubing' 172, and the 'ID of the tubing' 174, the following data in FIG. 8 are automatically calculated: the 'capacity' 176, the 'displacement—open' 178, and the 'displacement—plugged' 180.

In FIG. 9, a second page ('Annular Volume Calculator') associated with a third tab 26c (labeled 'Volume') in the 'i-Handbook' 26 of FIG. 1 is illustrated. In FIG. 9, annulus volume calculations will be discussed.

In FIG. 9, the Annular Volume Calculator 182 includes a left page 182a and a right page 182b. On the left page 182a, a tubular and casing configuration 184 is illustrated including an outer casing 184a and an inner tubing 184b and an annular space 184c disposed between the inner tubing 184b and the outer casing 184a. The annular space 184c has a certain volume of fluid contained therein. On the left page 182a, at the bottom, the dimensions of the 'outer casing' 184a are shown (see numeral 186); in addition, the dimensions of the 'inner tubing' 184b are also shown (see numeral 188). The dimensions for the 'outer casing' 184a include: 'casing', 'outer diameter (OD)', 'weight', and 'inner diameter (ID)'; and the dimensions for the 'inner tubing' 184b include: 'tubing', 'outer diameter (OD)', 'weight', and 'inner diameter (ID)'. The 'casing', 'outer diameter (OD)', 'weight', and 'tubing' dimensions are all drop down boxes of the type previously described. On the right page 182b, the following sets of data boxes are illustrated: 'volume for unit length' 190, 'metal displacement of outer' 192, 'metal displacement of inner' 194, 'volume for given depth' 196, and 'depth for given volume' 198. In the 'volume for given depth' 196, an annular and tubular volume is calculated for a given depth; and, in 'depth for given volume' 198, the annular and tubular depth is calculated for a given volume. In FIG. 9, right page 182b at the bottom, numerals 196a and 196b refer to annular and tubular volumes, and numerals 198a and 198b refer to annular and tubular depths.

In FIG. 9, the word 'annulus' 184c is defined as the space 184c that exists between the inner diameter of the outside pipe 184a and outer diameter of inside pipe 184b, if they are arranged in concentric manner as shown in FIG. 9. Calculation of annulus volumes (196a and 196b) is important in well services applications if the user wants to determine how much fluid will be contained in the given annular space 184c or how much height will a given fluid volume occupy in a given annular configuration. These calculations are commonplace in field operations. In FIG. 9, the screen on the left page 182a (see numerals 186 and 188) is user input which allows the user to select any possible configuration by using the available database (22 in FIG. 1) on casing, tubing, drill pipe and coiled tubing (where the available database is shown in FIG. 8) thus providing the inner and outer diameters required for calculations. The user can also choose custom sizes (not in the database 22c) to define annular configurations.

In FIG. 9, the output shown on the 'right side-bottom section' 196 and 198 of the calculator 182 in FIG. 9 helps in computing 'volumes' when the total 'depth' (i.e., annular and tubular depth) is given by the user (see numeral 198), in accordance with the 'outer' and 'inner' configurations input by the user as 'input data' 24 on the left screen of FIG. 9; or in computing total 'height' or 'depth' when the total 'volume' (i.e., annular and tubular volume) is given by the user (see numeral 196), the total volume being the volume that a fluid will occupy in the given tubular configuration.

The following are calculations for capacities:

$$\text{Annular Capacity} = \frac{\pi}{4}(ID_{outside}^2 - ID_{inside}^2) \, in^2 \times \frac{ft^2}{144 \, in^2} \times$$

$$1 \, ft \times \frac{bbl}{5.6146 \, ft^3}$$

$$= \frac{\pi}{4} \times \frac{(4.09^2 - 1.05^2)}{144 \times 5.6146}$$

$$= 0.015179 \, \frac{bbl}{ft}$$

$$\text{Tubular Capacity} = \frac{\pi}{4}(OD^2) \, in^2 \times \frac{ft^2}{144 \, in^2} \times 1 \, ft \times \frac{bbl}{5.6146 \, ft^3}$$

$$= \frac{\pi}{4}(0.824^2)\frac{1}{144 \times 5.6146}$$

$$= 0.000659 \, \frac{bbl}{ft}$$

The following are calculations for Annulus volumes and depths:

$$\text{Annular Volume} = \text{Annular Capacity} \times \text{Depth}$$

$$= 0.015179 \, \frac{bbl}{ft} \times 1000 \, ft$$

$$= 15.1791 \, bbl$$

$$\text{Annular Depth} = \text{Annular Volume} \div \text{Annular Capacity}$$

$$= 5 \, bbl \div 0.015179 \, \frac{bbl}{ft} = 329.4 \, ft$$

Following are the calculations for Tubular volumes and depths:

$$\text{Tubular Volume} = \text{Tubular Capacity} \times \text{Depth}$$

$$= 0.000659 \, \frac{bbl}{ft} \times 1000 \, ft$$

$$= 0.659575 \, bbl$$

$$\text{Tubular Depth} = \text{Tubular Volume} \div \text{Tubular Capacity}$$

$$= 5 \, bbl \div 0.000659 \, \frac{bbl}{ft} = 7580.63 \, ft$$

In FIG. 10, a first page ('Slurry Density Tables') associated with a fourth tab 26d (labeled 'Fracturing') in the 'i-Handbook' 26 of FIG. 1 is illustrated. In FIG. 10, slurry density calculations will be discussed.

In FIG. 10, hydraulic fracturing is performed on oil and gas wells in order to bypass the damage that may have been caused during the well drilling phase thus greatly enhancing the total production from the reservoir. Usually, polymer based gels are injected into the formation at rates and pressures high enough to fracture the formation, and solid particles (known as proppants) are placed inside the cracks in the formation in order to create artificial channels that ideally offer little or no resistance to the flow of hydrocarbons. This helps to increase the production of the wellbore. This section of the 'i-Handbook' 26 provides data and several calculators that are of immense help to field personnel.

In FIG. 10, a Slurry Density Table 200 is illustrated. When 'proppants' are added to clean fluid, the resultant fluid is often known as 'slurry' and the weight of the 'slurry' is described by a dimensionless number known as 'specific gravity'. The 'specific gravity' increases with an increase in the 'proppants'. 'Specific gravity' is the ratio of the density of the material to the density of water. In other words, as the density increases, specific gravity also increases. This calculator utilizes the 'proppant specific gravity' data available from the proppant database to compute the 'density of the resultant slurry' after the user enters the desired 'proppant concentration and water density'. A table is also generated on the right page for the same proppant type, which also provides the hydrostatic pressure gradient along with other useful data. The following equations are used in calculations:

$$CFR = \frac{1}{1 + \frac{PPA}{\rho_{prop}}} \therefore \text{For 2 } PPA \text{ Slurry Conc of Ceramic Prop of 2.6 } S.G.,$$

$$CFR = \frac{1}{1 + \frac{2 \, lbm/gal \, US}{2.6 \times 8.33 \, lbm/gal \, US}} = 0.92$$

$$\text{Slurry Density} = CFR(PPA + \rho_{fluid})$$

$$= 0.92\left(2 \, \frac{lbm}{gal \, US} + 8.33 \, \frac{lbm}{gal \, US}\right)$$

$$= 9.46 \, \frac{lbm}{gal \, US}$$

$$\text{Hydrostatic Head Gradient} = \frac{ft^2}{144 \, in^2} \times \frac{7.4804 \, gal \, US}{ft^3} \times$$

$$\text{Slurry Density} \, \frac{lbm}{gal \, US}$$

$$= 0.052 \times 9.46 \, \frac{lbm}{gal \, US}$$

$$= 0.491 \, \frac{psi}{ft}$$

FIG. 10 shows the computer display screen (recorder or display device 14 of FIG. 1) associated with the slurry density calculations and the user input data boxes.

In FIG. 11, a second page ('Gate Percentage Calculator') associated with a fourth tab 26d (labeled 'Fracturing') in the 'i-Handbook' 26 of FIG. 1 is illustrated. In FIG. 11, generating gate percent charts for a given pump schedule will be discussed.

In FIG. 11, correct amount of proppants must be added to the fluid in order to obtain the desired concentration. This task is more important when the mixing is carried out during the job. There exists a heavy-duty blender called the 'Programmable Optimal Density (POD)' that facilitates this operation by allowing dry proppant to fall into cones that are placed above the fluid that is being pumped. This action causes the sand to mix with the fluid and the opening of a gate controls the amount of proppant. For more concentration of proppant, the gates open wider and vice versa. Although the gate opening is controlled by the continuous feedback of density, for purposes of quality control, a close watch is maintained on the amount or degree to which a gate should open for a particular type of proppant and proppant rate. Theoretical expressions linking gate % to proppant rates have been established by extensive lab work. In FIG. 11, the current module in the 'i-Handbook' 26, hereinafter called a 'Gate Percentage Calculator' 202, can simulate the gate openings for six (6) different types of PODs. The 'Gate Percentage Calculator' 202 application of FIG. 11 takes the properties of the proppant from the database and uses a user's input to compute the gate openings based on equations that are provided in the 'Gate Percentage Calculator' 202 module. An example calculation associated with one very basic type of POD is shown below.

Consider 7 PPA of 3.25 S.G proppant being pumped at 35 bbl/min, how much would the gate of a traditional POD open? First we calculate the clean fluid ratio, CFR as follows.

$$CFR = \frac{1}{1 + \frac{PPA}{\rho_{prop}}} \therefore \text{For 7 } PPA \text{ Slurry Conc of Ceramic Prop of 3.25 } S.G.,$$

$$CFR = \frac{1}{1 + \frac{7 \text{ lbm/gal } US}{3.25 \times 8.33 \text{ lbm/gal } US}} = 0.7945$$

Then we compute the rate at which the proppant is being moved, $$\text{Prop Rate} = q \frac{bbl}{min} \times CFR \times 42 \frac{gal\ US}{bbl} \times PPA \frac{lbm}{gal\ US}$$

$$= 35 \frac{bbl}{min} \times 0.7945 \times 42 \frac{gal\ US}{bbl} \times 7 \frac{lbm}{gal\ US}$$

$$= 8175.97 \frac{lbm}{min}$$

Now, we convert this to "adjusted rate" as a ratio with common sand rate, $$\text{Adjusted Rate} = \text{Original Rate} \times \frac{S.G.Sand}{S.G.Prop}$$

$$= 8175.97 \frac{lbm}{min} \times \frac{2.65}{3.25}$$

$$= 6666.56 \frac{lbm}{min}$$

Now we compute the gate % opening based on one of the many empirical relations developed in labs:

Gate % Opening=99.5−
$\sqrt{9900-[(20196+Adj.Rate)\div 2.95]}$=71%

FIG. 11 illustrates the concept of Generating Gate Percentage (%) Charts for a given pump schedule. Fonts in blue on the left page of FIG. 11 are 'input data'. The right page of FIG. 11 is 'output page'. The 'play' button on the right screen of FIG. 11 can animate the gate percentage openings for the pump schedule provided by the user.

Figure 12:
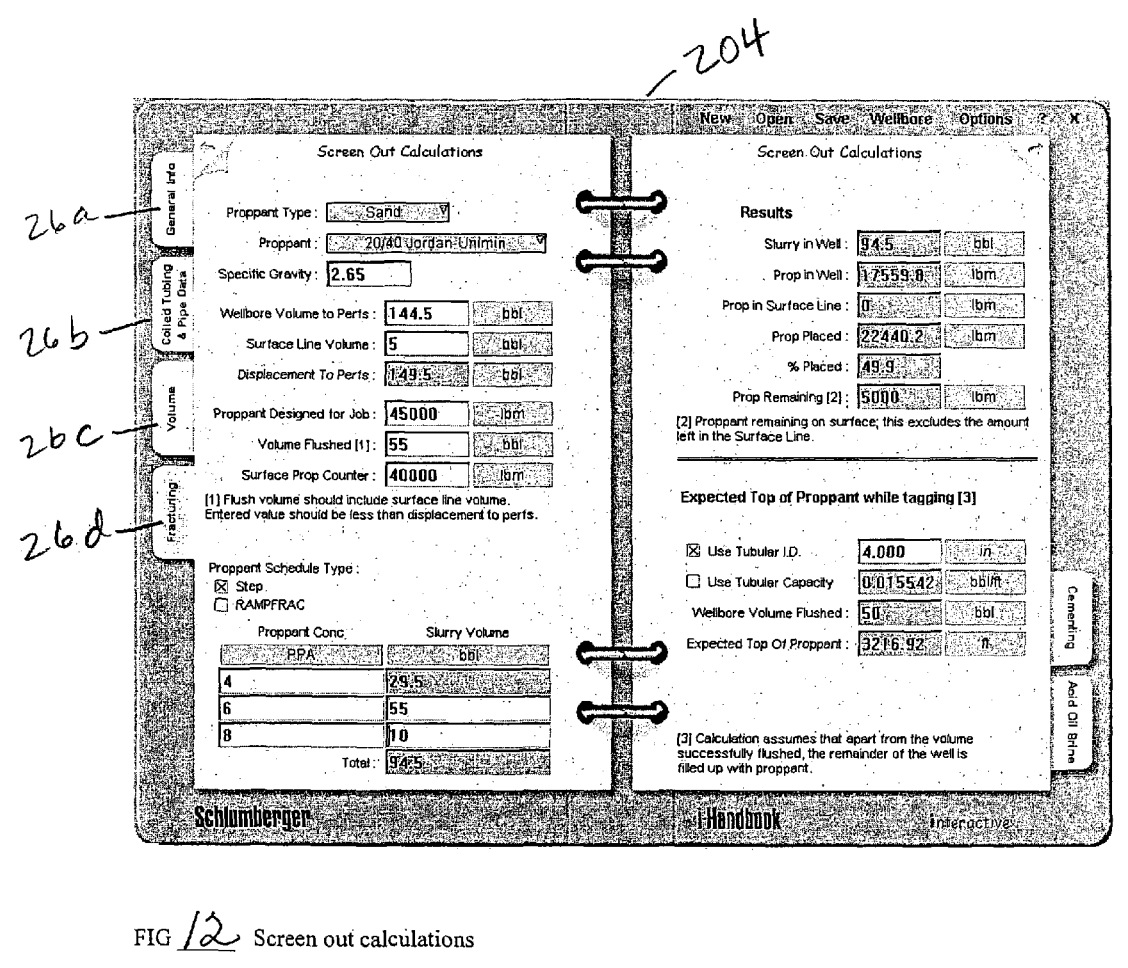

In FIG. 12, a third page ('Screen Out Calculations') associated with a fourth tab 26d (labeled 'Fracturing') in the 'i-Handbook' 26 of FIG. 1 is illustrated. In FIG. 12, screen out calculations will be discussed.

In FIG. 12, a 'screen out calculator' 204 is illustrated. On some occasions, it may not be possible to pump the fracturing treatments as designed and this may result in some left over proppant on the surface, or in the tubular, or in both places. This is called a 'screen out' and, for the purpose of logistics, it becomes important to compute the amount of proppant that was successfully placed in the formation and the amount of proppant that could not be pumped into the formation. In FIG. 12, the 'screen out calculator' 204 utilizes the properties of the proppant chosen by the user (which he can override by manually entering the specific gravity) and also 'input data' related to a particular wellbore configuration (such as: a displacement volume to the top of perforation, the volume of the surface line, the volume flushed; the amount of proppant pumped measured at surface, etc) to calculate the amount of proppant remaining in the tubular. Further, an advanced feature of this calculator 204, as seen on the right page of the calculator 204 in FIG. 12, includes a new data box entitled 'expected top of proppant' wherein data pertaining to the 'expected top of the proppant' is provided to a user in the event that a coiled tubing cleaning unit is used to bail out the solids. FIG. 12 provides an example of the above referenced 'screen out calculations'.

An Example problem is provided, as follows: How much sand was left in the tubular if, of the total 45,000 lbm designed, only 40,000 lbm was pumped, with a total of 29.5 bbl of 4 ppa, 55 bbl or 6 ppa and 10 bbl of 8 ppa 2.65 S.G. sand left in the pipe. Wellbore volume is 144.5 bbl, surface line volume is 5 bbls, and the job was successfully flushed by 55 bbls. Is there sand in the surface line? What was the percentage proppant placed in formation? Where will one expect the top of sand, if the casing has 4.0 inch ID? Based on the (CFR) equation set forth above in connection with the Gate Percentage Calculator 202 of FIG. 11, we must first calculate CFR and Proppant for all 3 stages as follows;

| PPA | S/out Volume, bbls | CFR | Prop, lbm |
|---|---|---|---|
| 4 | 29.5 | 0.846593 | 4195.72 |
| 6 | 55 | 0.786283 | 10897.88 |
| 8 | 10 | 0.733994 | 2466.22 |

Where the 'proppant amount' is computed as $$\text{Proppant Amount, lbm} = CFR \times 42 \frac{galUS}{bbl} \times$$
$$\text{Screen out Volume, bbl} \times$$
$$PPA \frac{lbm}{galUS}$$

$$\text{Example, Prop Amount} = 0.8466 \times 42 \frac{galUS}{bbl} \times 29.5 \text{ bbl} \times 4$$
$$= 4195.72 \text{ lbm}$$

Now, we compute the total amount of sand in the tubular, which is the answer to first question:

Total proppant in tubular, lbm=4195+10898+ 2466=∼17560 lbm

Since the total flush volume 55 bbls is more than the surface line volume 5 bbls, there is no sand in the surface line. To get the percentage placed, we do the following calculations:

$$\text{Proppant in formation, lbm} = \text{Proppant pumped} - \text{Proppant in Tubular}$$
$$40000 - 17560 \text{ lbm} = 22440 \text{ lbm}$$
$$\text{Percentage Placed, \%} = \frac{\text{Proppant in formation}}{\text{Proppant designed}} \times 100$$
$$= \frac{22440}{45000} \times 100 = 49.9\%$$

To calculate the 'expected top of proppant', we calculate the amount of flush in the wellbore and then compute the depth by using the capacity gradient of the tubular:

$$\text{Wellbore flush, bbl} = \text{Total flush} - \text{surface line volume}$$
$$= 55 - 5 \text{ bbls}$$
$$= 50 \text{ bbls}$$
$$\text{Tubular Capacity} = \frac{\pi}{4} \times 4^2 \text{ (in}^2) \times \frac{\text{ft}^2}{144 \text{ in}^2} \times 1 \text{ ft} \times \frac{\text{bbl}}{5.6146 \text{ ft}^3}$$
$$= 0.015542 \frac{\text{bbl}}{\text{ft}}$$
$$\text{Tagging Depth} = \text{Flush Volume} \div \text{Tubular Capacity}$$
$$= 50 \text{ bbl} \div 0.015542 \frac{\text{bbl}}{\text{ft}}$$
$$= 3216.92 \text{ ft}$$

Figure 13:
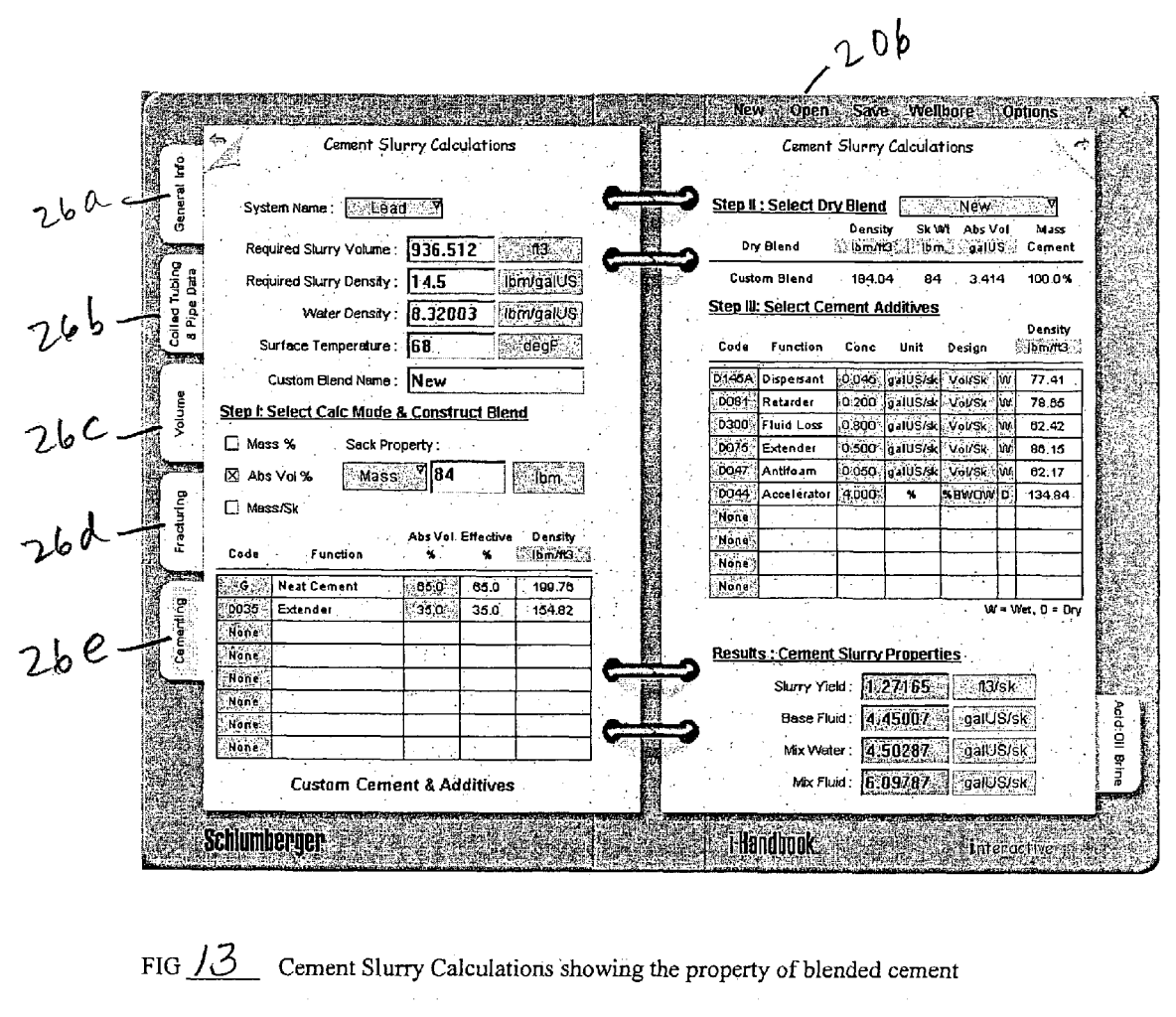

In FIGS. 13 and 14, a first page ('Cement Slurry Calculations') associated with a fifth tab 26e (labeled 'Cementing') in the 'i-Handbook' 26 of FIG. 1 is illustrated. In FIGS. 13 and 14, 'cement slurry calculations showing the property of a blended cement' and 'bulk plant loading guide generated based on user inputs' will be discussed.

In FIGS. 13 and 14, a 'cement slurry calculations' 206 are illustrated. Cementing is an important part of well services, and typically involves preparing and pumping cement slurries to provide a strong bond between the formation and casing or, in some cases, plugging the formation for abandonment procedures. Improperly cemented casings can create a real problem that may range from ground water contamination, to channeling, and commingling of formation fluids. The 'cement slurry calculations' 206 section of the 'i-Handbook' 26 provides details on the physical properties of several cement and cement additives that are used to provide strength and stability to cement, such details being provided in the form of hard coded information for the user. In addition, the 'cement slurry calculations' 206 section of the 'i-Handbook' 26 also allows the user to add new chemicals to the database (22 of FIG. 1) since new products may be continuously launched from the product development center. As noted in the preceding sections of this specification, several useful calculators utilize user input data provided via the 'input data' block 24 in FIG. 1, database information stored in the database 22c of FIG. 1, and several sets of equations and algorithms also stored as part of the 'i-Handbook software' 20 of FIG. 1.

In FIGS. 13 and 14, examples of Cement Slurry Calculations are illustrated. Prior to using the 'cement slurry calculator' 206 of FIGS. 13 and 14 which has three (3) basic steps, the user is required to enter the amount of cement wanted, the system name (e.g. Lead, Tail, etc), the density of desired cement, and the water temperature. Later, during Step 1, the user is asked to construct the cement blend, which typically involves constructing a blend of cementation material that is essentially dry in nature. Properties of the cement blend are defined by the density of the blend, the weight of the cement sack, and its absolute volume. In Step 2, the user is required to select, the proper blend that is used for calculations. The user may choose the blend that he just constructed or even neat cement. In Step III, additives are added to the blend that was constructed by the user. The results at the end of this step provide a full description of slurry by calculating slurry yield, mix water requirements, base fluid requirement, and mix fluid values. Later, based on the total cement volume desired, the calculator 206 also calculates the amount of neat cement, and other additives that would be required for the job. The results can be exported to any spreadsheet for easy use.

User inputs (such as required density, volume, percent (%) weight or volume of blend constituents, or percent (%) weight or concentration of cement additives) are combined with a-knowledge of cement and additive properties (such as absolute volume and density from the cement additive database) to arrive at the final results. If a particular additive does not exist in the database or if the properties are different, the user can also create his/her own material and append it to database. The calculations involved are very intense and, on some occasions, iterative schemes are used to compute the effects of dissolution of some salts in water. One simplified case is given as an example, as follows:

Example: Determine the basic properties of a dry cement blend of 65% Class G and 35% D035 Extender by Absolute Volume where the total mass of the sack is 84 lbm. Further, calculate how much cement and D035 would be needed to construct 166.8 bbls of 14.5 lbm/galUS density cement slurry.

From the additive database, we know that the absolute density of Class G cement is 199.76 lbm/ft3 and that of D035 is 154.82 lbm/ft3. Now, we find the absolute volume when both constituents are mixed in a blend as follows:

$$\text{Absolute Volume (gal)} = \left(7.48 \frac{\text{gal}}{\text{ft}^3} \times 100 \times Sk \text{ Mass, lbm}\right) \div \left\{\sum_{i=1}^{i=8} (\text{Abs. Vol. } \%_1 \rho_{B_1} + \text{Abs. Vol. } \%_2 \rho_{B_2} + \ldots + \text{Abs. Vol. } \%_8 \rho_{B_8}) \frac{\text{lbm}}{\text{ft}^3}\right\}$$

$$\text{Absolute Volume (gal)} = \left(7.48 \frac{\text{gal}}{\text{ft}^3} \times 84 \text{ lbm}\right) \div \{(0.65 \times 199.76) + (0.35 \times 154.82)\} \frac{\text{lbm}}{\text{ft}^3} = 3.414 \text{ gal}$$

The 'effective mixed volume blend density' is determined as follows:

$$\text{Blend Density } \frac{\text{lbm}}{\text{ft}^3} = \frac{\text{Sack Mass, lbm}}{\text{Eff. Mix. Vol, gal}} \times 7.48 \frac{\text{gal}}{\text{ft}^3}$$
$$= \frac{84 \text{ lbm}}{3.414 \text{ gal}} \times 7.48 \frac{\text{gal}}{\text{ft}^3}$$
$$= 184.04 \frac{\text{lbm}}{\text{ft}^3}$$

Thus, our answer to the first part of the question is 3.414 gal and 184.04 lbm/ft3. Since no additive is added to the blend, we will proceed to calculate the mix water requirements, as follows:

$$\text{Mix Water } \frac{\text{gal}}{\text{sack}} = \left\{\text{Total Mass, lbm} - \left(\text{Slurry Density } \frac{\text{lbm}}{\text{gal}} \times \right.\right.$$
$$\left.\left. \text{Total Vol, gal}\right)\right\} \div \left(\text{Slurry Density } \frac{\text{lbm}}{\text{gal}} - \right.$$
$$\left. \text{Water Density } \frac{\text{lbm}}{\text{gal}}\right)$$

$$\text{Mix Water } \frac{\text{gal}}{\text{sack}} = \left\{84 \text{ lbm} - \left(14.5 \frac{\text{lbm}}{\text{gal}} \times 3.414 \text{ gal}\right)\right\} \div$$
$$\left(14.5 \frac{\text{lbm}}{\text{gal}} - 8.32 \frac{\text{lbm}}{\text{gal}}\right) = 5.582 \frac{\text{gal}}{\text{sack}}$$

Yield of cement and total sacks required can be calculated as follows:

$$\text{Cement Yield } \frac{\text{ft}^3}{\text{sack}} = \left(\text{Total Volume, } \frac{\text{gal}}{\text{sack}} + \right.$$
$$\left. \text{Mix Water Volume, } \frac{\text{gal}}{\text{sack}}\right) \div 7.48 \frac{\text{gal}}{\text{ft}^3}$$

$$\text{Cement Yield } \frac{\text{ft}^3}{\text{sack}} = \left(3.414 \frac{\text{gal}}{\text{sack}} + 5.582 \frac{\text{gal}}{\text{sack}}\right) \div 7.48 \frac{\text{gal}}{\text{ft}^3}$$
$$= 1.2026 \frac{\text{ft}^3}{\text{sack}}$$

$$\text{Total Sacks needed} = \text{Total Cement Required, bbl} \times$$
$$\frac{5.6146 \text{ ft}^3}{\text{bbl}} \div \text{Cement Yield } \frac{\text{ft}^3}{\text{sack}}$$

$$\text{Total Sacks needed} = 166.8, \text{ bbl} \times \frac{5.6146 \text{ ft}^3}{\text{bbl}} \div 1.2026 \frac{\text{ft}^3}{\text{sack}}$$
$$= -779 \text{ sacks}$$

The amount of cement Class G and D035 needed for the operation can be calculated as follows:

$$\text{Material Weight, } \frac{\text{lbm}}{\text{sack}} = \left(\text{Absolute Volume \%} \times \text{Density of Material}\right.$$
$$\left. \frac{\text{lbm}}{\text{ft}^3} \times \text{Absolute Volume, } \frac{\text{gal}}{\text{sack}}\right) \div 7.48 \frac{\text{gal}}{\text{ft}^3}$$

$$\text{Class G Weight, } \frac{\text{lbm}}{\text{sack}} = \left(0.65 \times 199.76 \frac{\text{lbm}}{\text{ft}^3} \times 3.414 \frac{\text{gal}}{\text{sack}}\right) \div 7.48 \frac{\text{gal}}{\text{ft}^3}$$
$$= 59.26 \frac{\text{lbm}}{\text{sack}}$$

$$\text{D035 Weight, } \frac{\text{lbm}}{\text{sack}} = \left(0.35 \times 154.82 \frac{\text{lbm}}{\text{ft}^3} \times 3.414 \frac{\text{gal}}{\text{sack}}\right) \div 7.48 \frac{\text{gal}}{\text{ft}^3}$$
$$= 24.73 \frac{\text{lbm}}{\text{sack}}$$

$$\text{Total Class G, lbm} = \frac{\text{lbm}}{\text{sack}} \times \text{TotalSacks}$$
$$= 59.26 \frac{\text{lbm}}{\text{sack}} \times 779 \text{ sacks}$$
$$= 46163.5 \text{ lbm}$$

$$\text{Total D035, lbm} = \frac{\text{lbm}}{\text{sack}} \times \text{TotalSacks}$$
$$= 24.73 \frac{\text{lbm}}{\text{sack}} \times 779 \text{ sacks}$$
$$= 19264.7 \text{ lbm}$$

FIG. 13 illustrates Cement Slurry Calculations showing the property of blended cement. Note that, by clicking on the "Custom Cement & Additives" tab at the bottom of the left page in FIG. 13, one can generate and store custom additives in cement database.

FIG. 14 illustrates that a Bulk Plant loading guide is generated based on 'user input data' 24 of FIG. 1. This is the default example provided in the 'i-Handbook' 26 and differs from the example provided in the text, since additive calculations are more intense and lengthy.

Figure 15:
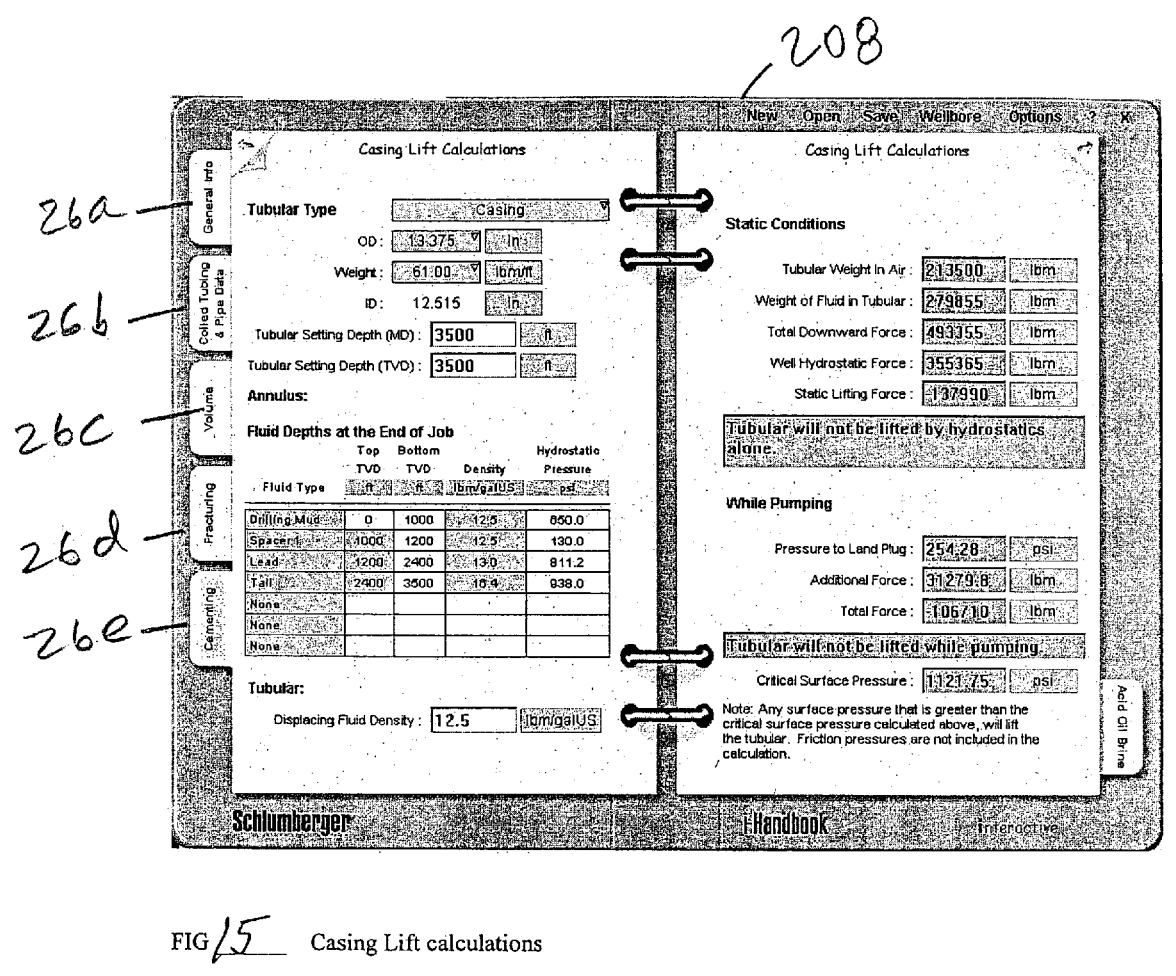

In FIG. 15, a second page ('Casing Lift Calculations') associated with a fifth tab 26e (labeled 'Cementing') in the 'i-Handbook' 26 of FIG. 1 is illustrated. In FIG. 15, casing lift calculations will be discussed.

In FIG. 15, an example of 'Casing Lift Calculations' 208 is illustrated. Among the other calculators that are provided in the cementing section of the 'i-Handbook' 26, the 'casing lift calculator' 208 has special significance because it is important for the user to know, during cement pumping operations: (1) whether the pumping pressure at the surface could cause the casing to unseat, and (2) the value of the critical surface pressure for this operation. The 'casing lift calculator' 208 is based on a knowledge of the casing diameter and its weight, which are obtained from the database 22c, and other 'input data' 24 pertaining to the depth of the casing, etc, which are provided as 'input data' via the display screen shown in FIG. 15.

In FIG. 15, example calculations for the problem presented on the display screen of FIG. 15 are set forth below, as follows: Casing OD of 13.375 inch, 61 lbm/ft, ID 12.515 inch, is set at 3500 feet measured depth in a vertical well. Displacing fluid density is 12.5 lbm/galUS and other details are as provided in the figure.

First, we calculate the weight of the casing in air and fluid, as follows:

$$W_{air}, \text{ lbm} = \text{Length of the Casing, ft} \times \text{Weight Gradient } \frac{\text{lbm}}{\text{ft}}$$
$$= 3500 \text{ ft} \times 61 \frac{\text{lbm}}{\text{ft}} = 213500 \text{ lbm}$$

$$W_{fluid}, \text{ lbm} = 0.052 \times \text{Length, ft} \times \text{Area, in}^2 \times \text{Fluid Density } \frac{\text{lbm}}{\text{galUS}}$$
$$= 0.052 \times 3500 \times 123.01 \times 12.5$$
$$= 279854.95 \text{ lbm}$$

Total Downward Force, lbm = $W_{air}$, lbm + $W_{fluid}$, lbm = 493354.9 lbm

Hydrostatic Pressure is calculated for each section length of the fluid and the results are totaled. As seen in FIG. 15, the sum of all of the individual hydrostatic pressures is 2529.3 lbm/in2. This value is used to compute well hydrostatic force as follows:

$$\text{Well Hydrostatic force, lbf} = \text{Hydrostatics, } \frac{\text{lbf}}{\text{in}^2} \times \text{Area, in}^2$$
$$= 2529.3 \frac{\text{lbf}}{\text{in}^2} \times 140.5 \text{ in}^2$$
$$= 355364.8 \text{ lbf}$$

Static lifting force shows the value of the resultant force under static conditions. If it is negative, the casing will not be lifted by hydrostatics alone and vice versa.

Lifting Force, lbf=Well Hydrostatic force, lbf−Total Downward force, lbf=355364.8−493354.9=− 137990.18 lbf The difference between hydrostatic pressures is now computed and this figure is used to determine added lifting forces. If negative, casing will not be lifted, else it will be lifted while pumping.

$$\text{Addtional force, lbf} = (2529.3 - 2275) \frac{\text{lbf}}{\text{in}^2} \times 123.01 \text{ in}^2$$
$$= 31279.8 \text{ lbf}$$
$$\text{Final Force, lbf} = \text{Lifting Force} + \text{Addtional Force}$$
$$= -137990.18 + 31279.8$$
$$= -10671039 \text{ lbf}$$
$$\text{Critical Surface Pressure, } \frac{\text{lbf}}{\text{in}^2} = -\left[\frac{\text{Static Lifting force, lbf}}{\text{Area, in}^2}\right]$$
$$= -\left[\frac{-137990.8 \text{ lbf}}{123.01}\right]$$
$$= 1121.8 \frac{\text{lbf}}{\text{in}^2}$$

In FIG. 15, Casing Lift calculations are shown in FIG. 15. User inputs are entered on the left page of the calculator 208 of FIG. 15, and the answers are displayed on the right page of the calculator 208 of FIG. 15.

In FIG. 16, a first page ('HCL dilution calculator and Table') associated with a sixth tab 26f (labeled 'Acid Oil Brine') in the 'i-Handbook' 26 of FIG. 1 is illustrated. In FIG. 16, calculations showing density and dilution for Hydrochloric acid will be discussed.

This is the last section of the 'i-Handbook' 26 and it includes acid dilution charts, oil gravity calculations, and Brine Density and Salt requirement calculators. A few of the most useful and frequently used calculators are discussed below with reference to FIGS. 16, 17, and 18 of the drawings.

In FIG. 16, an 'Acid density and dilution calculator and table' 210 is illustrated. The left page of FIG. 16 responds to 'input data' (24 in FIG. 1) provided by a user to compute Hydrochloric acid density and a table is generated using the standard "Table Control" module developed for the application. The scroll bar allows the user to scroll down and see the values associated with various concentrations of HCL. The details of the calculations are set forth below, as follows:

Density: HCL concentration is used in calculating specific gravity by the following algorithm:

$$\text{Specific Gravity} = 0.9998 + \frac{\text{HCl Conc}^{1.0070879}}{204.22}$$

For 28% HCl
$$\text{Specific Gravity} = 0.9998 + \frac{28^{1.0070879}}{204.22} = 1.14018$$

Degrees Baumme is computed as follows:

$$\text{Degrees Baumme} = 145 - \frac{145}{\text{HCl } S.G.} = 145 - \frac{145}{1.14018} = 17.827$$

For 28% HCl
$$\text{Specific Gravity} = 0.9998 + \frac{28^{1.0070879}}{204.22} = 1.14018$$

Density of Acid is computed as follows:

$$\text{Density } \frac{\text{lbm}}{\text{galUS}} = \text{Specific gravity} \times 8.33 \frac{\text{lbm}}{\text{galUS}}$$
$$= 1.14018 \times 8.33 \frac{\text{lbm}}{\text{galUS}}$$
$$= 9.49773 \frac{\text{lbm}}{\text{galUS}}$$

Dilution: Dilution calculation is based on the amount of acid that needs to be diluted to a final concentration from an initial given concentration. In this example, a final volume of 500 gals of 15% HCL must be diluted from 36% HCL. The Calculator 210 calculates the initial volume of 36% HCL and the water needed to dilute the HCL. First, the densities based on initial and final concentrations of HCL are computed using the method shown above. These densities are 9.83453 and 8.95203 lbm/galUS respectively. Calculations are as shown below, as follows:

For 36% HCl $$\text{Specific Gravity} = 0.9998 + \frac{36^{1.0070879}}{204.22} = 1.18062$$
$$\text{Density } \frac{\text{lbm}}{\text{galUS}} = \text{Specific gravity} \times 8.33 \frac{\text{lbm}}{\text{galUS}}$$
$$= 1.18062 \times 8.33 \frac{\text{lbm}}{\text{galUS}}$$
$$= 9.83453 \frac{\text{lbm}}{\text{galUS}}$$

For 15% HCl
$$\text{Specific Gravity} = 0.9998 + \frac{15^{1.0070879}}{204.22} = 1.07467$$
$$\text{Density } \frac{\text{lbm}}{\text{galUS}} = \text{Specific gravity} \times 8.33 \frac{\text{lbm}}{\text{galUS}}$$
$$= 1.07467 \times 8.33 \frac{\text{lbm}}{\text{galUS}}$$
$$= 8.95203 \frac{\text{lbm}}{\text{galUS}}$$

Next, the following equations are used to determine the volumes:

$$Vol_{stong}, \text{gal} = \frac{\text{Desired Conc. } \% \times \text{Desired Final Volume, gal} \times \text{Final HCl Density lbm/galUS}}{\text{Intial Conc. } \% \times \text{Initial HCl Density lbm/galUS}}$$

$$Vol_{stong}, \text{gal} = \frac{0.15 \times 500 \text{ gal} \times 8.95203 \text{ lbm/galUS}}{0.36 \times 9.83453 \text{ lbm/galUS}} = 189.639 \text{ galUS}$$

$$\text{Water Needed for Dilution} = (\text{Desired Final Volume} - Vol_{strong}) \text{ gal}$$
$$= (500 - 189.639) \text{ gal}$$
$$= 310.361 \text{ gals}$$

The calculator 210 of FIG. 16 also draws a table based on the inputs of maximum and minimum HCL concentrations for, different values of final volumes. The table is developed using the typical table control, which copy to cell based software and scrolling of data vertically and horizontally to view the desired data.

FIG. 16 illustrates calculations showing density and dilution for Hydrochloric acid. The red box on left page of the calculator 210 indicates the row where specific gravity, degrees Baumme, density, and hydrostatic gradient for 28% HCL is being displayed. The scroll bar had to be moved down to get to this position.

Referring to FIG. 17, a second page ('Oil Gravity & API Calculator') associated with a sixth tab 26f (labeled Acid Oil Brine?) in the 'i-Handbook' 26 of FIG. 1 is illustrated. In FIG. 17, computing API gravity from the specific gravity of oil, and vice versa, will be discussed.

In FIG. 17, an Oil Gravity and API calculator 212 is illustrated. The API Oil Gravity Calculator 212 of FIG. 17 shows a human interface adapted for calculating API (American Institute of Petroleum) oil gravity on the basis of specific gravity of oil, and vice versa, based on the equations displayed. Further, the table on right hand page is generated for quick reference, for example; for copying it to any cell based software. In FIG. 17, an example calculation is shown in FIG. 17, as follows: for 0.91 specific gravity oil (i.e., 0.91 is the value for 'specific gravity' in FIG. 17) results in 24 dAPI (degree API) oil (i.e., 24 is the value for 'API Gravity'). Calculations are not shown since the formula shown on the left page in FIG. 17 is self explanatory.

FIG. 17 illustrates the computation of 'API gravity' from the 'Specific gravity' of oil and vice versa. The table on the right page in FIG. 17 is generated by the two equations shown on the left page of FIG. 17 for various values of API Gravity.

Referring to FIG. 18, a third page ('Salt Requirement Calculator') associated with a sixth tab 26f (labeled 'Acid Oil Brine') in the 'i-Handbook' 26 of FIG. 1 is illustrated. In FIG. 18, a Salt Interpolation Table will be discussed.

In FIG. 18, a Salt Requirement Calculator 214 is illustrated. The 'i-Handbook' 26 provides tables that can be used to construct brine solutions by adding different amounts of salts to obtain different concentrations or weights of solutions. However, in some cases, the user may want to obtain salt requirements for a case which is not set forth in the table of FIG. 18 but can be obtained by interpolating between two values in the table of FIG. 18. For such cases, a salt interpolating calculator termed as the 'Salt Requirement Calculator' 214 of FIG. 18 is generated. This calculator 214 uses the data in the table to interpolate and provide answers for user's inputs, provided via the 'input data' block 24 in FIG. 1. An example is set forth below, as follows:

Example: Compute the amount of Calcium Chloride (Peladow) required for constructing a 100 bbls solution of 10.67 lbm/galUS density at 60 degF. To obtain the results, we interpolate between the values available for 10.6 and 10.8 lbm/galUS and obtain the results. A 'CaCl2' page is superimposed on the left page in, FIG. 18 for ease of viewing.

$$\text{Salt Required} = \frac{\text{Salt Required}_{10.8\,S.G.} - \text{Salt Required}_{10.6\,S.G}}{(10.8 - 10.6)} \times$$
$$(10.67 - 10.6) + \text{Salt Required}_{10.6\,S.G}$$
$$\text{Salt Required} = \frac{142 - 130}{(10.8 - 10.6)} \times (10.67 - 10.6) + 130$$
$$= \frac{12}{0.2} \times (0.07) + 130$$
$$= 134.2 \text{ lbm per bbl}$$
$$\therefore \text{ For 100 bbl Solution} = 100 \times 134.2 = 13420 \text{ lbm CaCl}_2$$

Other interpolations are carried out in the same fashion, and the results from those other interpolations are displayed in the grayed-out boxes on the right page of FIG. 18.

FIG. 18 illustrates how the 'Salt interpolating table' 214 uses interpolating techniques for computing results for values that are not present in the physical properties tables for various salts. Note that the Calcium Chloride page is superimposed on the left page for this example.

Referring to FIG. 19, a 'wellbore diagram feature' 216 of the 'i-Handbook' 26 of FIG. 1 is illustrated. In FIG. 19, the 'well bore diagram feature' 216 allows the user to draw pictures of a wellbore that represent a configuration of a well and to compute volumes in tubular or annular spaces of the wellbore.

Unlike any conventional handbook, the 'i-Handbook' 26 of the invention can also be used to prepare wellbore construction diagrams following different scenarios as shown below. At each step, the selected hardware is illustrated in a diagram. According to the invention, the wellbore construction may start with an open hole or with any casing type already in place. Eventually, the construction may start with a tubing or hanger, but a warning message is displayed since tubing and liners are typically inside casing. To be consistent, the wellbore diagram requires that all the hardware be selected in it is anchored somewhere or the other. No piece of hardware can hang free. The moment any piece of hardware is selected, the value of X, meaning minimum cement thickness required, is computed corresponding to the tubular based on following correlation $$X = 0.1045(\text{Tubular OD})^3 - 0.9732(\text{Tubular OD})^2 + 5.3004(\text{Tubular OD}) + 0.6776$$

In FIG. 19, a post-commercialization survey revealed that this is the most frequently used feature of 'i-Handbook' 26 mainly because of its ease of use and ability to offer quick error-free results. The 'wellbore diagram feature' 216 allows the user to draw pictures of a wellbore that represent a configuration of the well and also to compute volumes in tubular or annular spaces. This module utilizes the combination of tubular databases, user inputs, and inbuilt rules & algorithms in order to first allow the construction of diagram and then to compute the volumes. The 'well bore manager' allows the user to make annotations and notes on the diagram constructed by him/her and arranges multiple diagrams on same virtual note pad. GDI tools are used to help in drawing the pictures of the wellbore. Some of the features that make the 'wellbore diagram' an 'easy to use' feature and an 'efficient calculator' are mentioned below.

Drag & Drop

Well bore items like casing, tubing, coiled tubing and drill pipes can be selected from a drop down list of tubular and selected by clicking on the item; keeping the left mouse key pressed, the item can be brought over to the "virtual notepad" and dropped on the release of the mouse. If the user executes the sequence correctly and if the selection passes the rules, then the item "docks" itself on the notepad. Rules are provided to make the system more intelligent and prevent the user from making wrongful choices. For example, the rules prevent attaching a higher diameter casing inside a lower diameter tubing, or trying to squeeze in an open hole inside a casing, etc. However, it does allow docking different tubular beneath one another to account for "tapered" string configuration.

Tubular Database & Well Bore Hardware Buttons

This feature allows a selection between thousands of pipe sizes and also allows drawing a few typical well bore items/events, such as float collar, bridge plug, packer, perforation, plain-depth reference and open holes. Logic and rules are associated with each of the objects. As an example, in order for a packer to be "docked", an annular space is needed, open holes cannot have perforations, etc. Further, after dropping any one the tubular or hardware items, a window pops up for the user to enter his/her inputs. This is the part where 'user inputs' (block 24 in FIG. 1) are utilized for calculations. Inputs are usually the setting depth in most of the cases. In case of hangers, the top of the hanger may also be entered. The user is allowed to change the name of Well bore item.

Well Bore Volume Computations

After "drawing" the well bore diagram on the virtual notepad, the user can compute the 'volumes of interested area' by first clicking the button "Start Volume" and then highlighting all the segments of volumes they are interested in, and lastly ending the volume calculation by clicking on "End Volume" button. This action will sum up the individual volumes of all the sections and display the volume on the well bore diagram.

Denoting Volumes by Colors

After the well bore volumes are computed, the user can click on the barrel icon, which stands for 'volume calculations'. This action will open another window that will list all the various segments of volumes that were computed by the user. By clicking on the "Define Path Colors" object, the color of that particular fluid type, e.g. Lead, Tail, etc, can be changed. The changed color will now be reflected in the well bore diagram. The user can also change the units of measurements from the one given to any other in the drop down list.

Item Labels

All the well bore items and tubular have a label attached to them. This displays the item details and setting depth. These labels can be moved up or down along the well bore diagram and locked in a position that the user feels is the best suitable. Users can turn the labels off if they do not wish to see them, by choosing the "Hide" Option.

Automatic Scaling and Zoom Function

The virtual notepad automatically scales the diagram based on the length of the tubular attached and also on the basis of relative diameter. This may lead to a situation, especially in very deep wells, where the user may not be in a position to view the area of interest properly. To circumvent this problem, the view can be 'zoomed in' by dragging the top datum line to the place of interest or by right clicking on the 'zoom' button to enter the depths. Clicking on "restore" restores the original view.

Resize

Well bore diagrams may be resized by using the hot area at the bottom right of the virtual notepad. Resizing can be done in both the horizontal and the vertical direction.

Copy & Paste

Well bore diagrams may be copied by right clicking on the diagram and choosing option "Copy" and reproduced by pasting on applications like Excel, Word or Power Point presentations. This makes it easy when: preparing presentations, preparing job recommendations, or conducting a bidding process. The user may elect to "Ungroup" and edit the pasted picture.

FIG. 19 shows one example of the 'well bore diagram feature' 216.

The wellbore construction operates according to the following scenarios. Accordingly, a set of 'wellbore diagram rules' are set forth in the following paragraphs.

Wellbore Diagram Rules

Scenario 1:

If "Open Hole" is chosen first, without presence of any casing
- the default open hole diameter is 26 inch which corresponds to largest diameter bit available. Open hole snaps on to the surface or datum line. As soon as the open hole snaps in, the user is urged to enter the depth and diameter.
- In case the depth is not entered by the user, and if you have defaulted the length of any selected tubular to 1.0 feet, make sure that the default depth/length of the open hole is 1⅛ foot or any number marginally greater than unit length designated for casings.
- open hole should look like a container with its bottom closed by a "dashed line".

Scenario 2: Selection of Casing:

When selecting any casing, select first the OD, then the weight per foot, then the type—T & C or Extreme Line. The last selection will provide the tool joint or coupling OD. For the joints whose coupling or TJ OD is missing in the database, Pipe OD will be defaulted as TJ OD. Make the selection knob such that if "T&C" or "Extreme Line" does not exist for any particular type of casing OD and Weight selected, then it should blank it out. E.g. for 4.5 inch OD, 9.5 #/ft, casing, Extreme Line is not available. For such a case, the casing type should be "fixed" to T & C since it is the only type available. When First "Casing" is selected in presence of "Open Hole" then The casing can snap on only to the surface or datum line (which is obvious). Also since the open hole diameter is defaulted to 26 inches and none of the tubular in database is more than 26 inches, the casing Will always be "inside" the open hole as far as diameter is concerned.

Once the casing is put in, the open hole starts its intelligent behavior by i. Adjusting its diameter equal to X plus the outside diameter of the casing, if and only if, the user has not entered the diameter of open hole.

ii. The "wrong" scenario here is that the user has entered the diameter of open hole as say, 7 inches and selects a casing that is say 9⅝. Under this circumstances, as soon as the cursor is on the "active area" of wellbore sheet, warn him that casing OD cannot be more than open hole diameter. Then say, "Accept this casing and adjust the open hole diameter?—Give the option, Yes, or No. If he/she says yes, then accept the casing and increase the open hole diameter based on point (i) and if he/she selects No, then do not snap the selected casing but retain the open hole.

iii. Since this is the first casing and open hole combination, the open hole must close the bottom with a dashed line. As mentioned earlier, the open hole depth should be marginally more than the depth of the selected casing. Hence if the user has not entered the depth of the open hole, but has entered the depth of casing, the open hole should increase its depth on its own so as to "encompass" the casing.

iv. The "wrong" scenario that can be expected here is, the user has entered the depth of open hole already, say at 2000 ft. and when the casing snaps in, he enters casing's depth as 2050 ft. At this point, a warning message pops up and the entered value is not accepted since it is physically impossible.

Scenario 3: When Second "Open Hole" is selected in presence of existing "Open Hole" and/or Casing.

If second Open Hole is selected in presence of only an Open Hole before it, then, It can snap only at the bottom of previous Open Hole, and its diameter by default would be less than 0.25 inch less than the previous one.

When it snaps to the bottom of previous open hole, the previous hole will intersect it at right angles and now the new open hole will be the bottom of new container volume.

After the open hole snaps in, prompt for its depth. The bottom of this hole will be closed by a dashed line. If the user does not prompt the depth, it should be +⅛ of standard casing default depth.

If second Open Hole is selected in presence of only a casing. Such a case will be encountered if the user has started to construct the well bore without dropping a open hole.

However, in this case, the open hole will snap on to the bottom of the previously existing casing or engulf this casing by being outside it.

- Case I: When it snaps to the bottom, it assumes a diameter equal to previous casing drift diameter minus 0.125 inch. The bottom of this OH will be closed by a dashed line. Also, the moment this OH gets snapped, the previous casing will "develop" shoes, indicating, you can no longer extend previous casing.
- Case II: When the selected open hole snaps on to the surface then, it assumes a diameter equal to at least previous outside casing diameter plus X, where X has to be computed by Equation (1). When this hole snaps in to the surface, engulfing the previous casing, then it closes the bottom by a dashed line, with its default depth being more than previous casing depth by ⅛.

If second Open Hole is selected in presence of previous open hole and previous casing. Under this circumstance the open, hole will snap only at the bottom of the previous casing. It will assume a diameter equal to previous casing drift diameter minus 0.125 inch. The bottom of this OH will be closed by a dashed. Also, the moment this OH gets snapped, the previous casing will "develop" shoes, indicating, you can no longer extend previous casing. When prompted for depth, it should have depth greater than previous casing Shoe depth. If user enters a depth less than this, he should be prompted to correct the depth.

Scenario 4: When Second "Casing" is selected in presence of first selected "Open Hole" and existing casing but no open hole attached to first casing.

Here the well bore needs to get intelligent. Where the newly selected casing can be snapped will now depend on the properties of this and the previous casing in the well bore. The following rules will apply:

- If the Tool Joint OD of the selected casing is less than the drift diameter of the previous casing, then following checks will apply
  - i. Snapping inside previous casing from the surface: First, based on the OD of the selected casing, compute the value of X using Equation (1).
    - Case I. If the sum of OD of the newly selected casing and value X corresponding to this new OD, is less than or equal to previous casing ID minus 0.25 inch, then such a casing can be snapped inside previous casing without a forewarning, starting from surface. As soon as the casing is attached, indicate the end of previous casing by drawing a shoe (no casing can now be attached to previous casing), retain the first/previous open hole but show it to be intersecting with newly dropped casing, create a new open hole such that its diameter by default is ID of previous drift casing minus 0.125, and prompt for entering a depth of new casing, extend the open hole to contain the new casing.
    - Case II. If the sum of OD of the newly selected casing and value X corresponding to this, new OD, is more than previous casing ID minus 0.25, then issue a warning "May not get adequate cement thickness behind casing". Once the casing is attached, follow the same sequence of operations as mentioned at the end Case I above.
    - Case III. If above two rules are not satisfied, the newly selected casing cannot start from surface.
  - ii. Snapping Below Previous Casing: Minimum OD that will be allowed to snap on to the bottom of existing previous casing, will be previous casing Drift Diameter-0.125-X, with a small mention that the string is tapered. If the selected casing OD is below this, then it will be allowed to snap to the bottom with a warning "the string is highly tapered. Are you sure this is a casing or do you need to select a liner?" If he says "Select Anyway" then allow it to snap else if he says cancel, then do not snap it. When a casing snaps to bottom, prompt the user to enter new casing depths. At the same time extend the depth of the previous open hole to encompass this new "tapered" string.
- If the Tool Joint OD of the selected casing is equal to the drift diameter of the previous casing, then following will apply
  - i. Such a casing can only be snapped on to the bottom of previous casing if and only if the previous casing depth has not been finalized by the user and the casing has not "developed" shoes at its bottom.
  - ii. The moment such a casing snaps on to the bottom of the previous casing, which is incidentally the same OD size, then you need to pop a very important suggestion—"You need to increase the depth of the open hole since it is same sized casing. Enter new Open hole depth & Enter the casing depth!!". Since there is no exception to this rule, even if user does not enter a new depth and just cancels the warning, extend the open hole to close off the bottom of the new same-OD casing selected. For this, add the unit depth of the casing, to the previous casing depth and increase it by 1⅛ foot (or anything convenient) to close off the bottom.
- If the Tool Joint OD of the selected casing is greater that than the drift diameter of the previous casing, then following will apply
  - i. Snapping at Bottom of previous casing: The moment such a diameter casing is selected compute the least allowable diameter (taking cementing into consideration) by Equation (1) mentioned at the end of the text. Call this value as let us say X.
    - Case I. If the newly selected casing Tool Joint OD is less than previous open hole diameter. Before snapping however, advise the user, "Will need a cross over" and prompt him to enter the depth. Also if the previous open hole diameter minus the new selected casing OD is less than X, just warn the user "For good cementing, may need a larger hole". Once the casing snaps below the previous one, then automatically extend the previous open hole to the end of this new casing +⅛ and close, it with dashed line which is the convention.
    - Case II. If however, the Tool Joint OD of the newly selected casing is more than the previous open hole then, ask the user "Is the casing to be run in an under reamed hole?". If he says yes, then prompt him for new hole diameter to which the hole will have to be under-reamed. If the user enters a open hole diameter that is less the selected casing tool joint OD, then scream "OD needs to be at least TJ OD!!". If he enters 'a diameter greater than TJ OD but less than new casing OD+X corresponding to new casing, then scream "For good cement thickness behind casing, value' needs to be at least X inches, however Accept the Value?" If he says yes, accept it; else prompt him to enter new value. When the new casing finally snaps on, terminate the previous open hole to the depth of previous casing, and extend the new open hole to the depth of newly selected casing +⅛ and close the bottom with dashed line.

ii. Snapping on to the Surface: Such a casing whose tool joint diameter is larger than the drift diameter of previous casing, will be allowed to snap on to the surface based on following rules Case I. If the outer most piece of hardware is casing then the drift diameter of the newly selected casing should be more than the tool joint diameter of the outer most casing. If the casing is dropped here, then it has to automatically assume a depth equal to half the depth of the casing it has engulfed. Prompt to enter the depth and make sure it does not exceed the depth of casing after it. Also, make sure it "develops" shoes as soon as it is dropped.

Case II. If the outer most piece of hardware is an open hole then, the larger casing can be dropped outside the hole, if its drift diameter is larger than the diameter of the hole it is trying to engulf. After it snaps on the surface, the casing will automatically be defaulted to half the length of the open hole and the open hole will now snap on to the bottom of this new casing. Prompt to enter the depth and make sure it does not exceed the depth of casing after it. Also, make sure it "develops" shoes as soon as it is dropped.

Scenario 5: Subsequent Selection of Casings or Open Hole.

Any further selection of intermediate or production casing should be carried out using the rules laid down in previous sections. The open hole or casing needs to be checked only for their diameters before they can be allowed to snap to bottom or surface. Care should be taken that as soon as the casing snaps on to the datum line, the previous casing must develop "shoes" indicating that, that particular casing string is finalized and nothing can snap on it anymore.

Scenario 6: Selection of Liners.

Liners should be selected from Liner database. Liners essentially snap on to the insides of a casing and hang on with liner hanger. Liners will not hang in annuli or will not start from surface. Tie backs can be extended up to the surface Case I: If liner is selected in presence of an "Open Hole" alone, then a warning has to be issued stating that liner has to be inside a casing and not allow to, snap on surface or bottom of open hole alone.

Case II: If liner is selected in presence of "Tubing" alone, then a warning has to be issued stating that liner has to be inside a casing and that not allow to snap on surface or bottom of tubing alone.

Case III: If a liner is selected in presence of existing casing but without an open hole attached below the casing, then the it needs to snap at the bottom with a small overlap indicating liner hanger. However, following rules will apply.

(a) If the Tool Joint OD of liner is greater than or equal to the drift diameter of the casing where it is supposed to hang, then warn the user "Liner cannot be run through the casing—select lower diameter" and do not snap it on to the bottom.

(b) If the Tool Joint OD of the liner is less than the drift diameter of the casing string where it is supposed to hang, then do the following:

i. if the sum of selected liner OD+X is less than or equal to the OD of the casing inside which the liner will hang, then, liner can snap on to the bottom of this casing. As soon as such a liner is dropped, ask for its top measured depth, bottom measured depth. If the top measured depth is entered equal to 0, then do not accept it by warning that if the user means to show tie-back liner, then he should select plain casing. Prompt him to enter another top MD value. If he cancels, the warning, the liner will not snap. If the top measured depth is entered such that the overlap of liner and the casing inside which it is hanging is more than 100 ft, then check with user if he is entering the right value. If he says OK, accept the liner. Simultaneously, the previous casing should "develop" shoes and also the open attached to it will terminate by intersecting with the liner. Also with the acceptance of new liner, surround the same with open hole with diameter equal to at least, previous casing drift diameter. Close this open hole at bottom with a dashed line.

ii. if the sum of selected liner OD+X is more than the OD of casing inside which the liner will hang, then, warn the user that the "cement thickness behind the liner may be too less" and ask if wants to accept the value of liner. If he/she says yes, then accept the liner and snap it on inside the casing. After that follow the other instructions of asking for top and bottom measured depth as checks and warnings mention in point (1).

Case IV: If a liner is selected in presence of existing casing and also an open hole attached below the casing, then the it needs to snap at the bottom with a small overlap indicating liner. However, following rules will apply.

i. If the Tool Joint OD of the selected liner is more than the drift diameter of the casing where it is going to hang, then it will not snap and prompt the user to choose another liner hanger.

ii. If the Tool Joint OD of the selected liner is less than the drift diameter of the casing AND also less than the diameter of the hole below the casing, then the following will apply 1. if the sum of selected liner OD+X is less than or equal to the hole diameter inside which the liner will run, then accept the liner without any warning. After accepting it, prompt for top measured depth and bottom measured depth. Carryout checks and warnings similar to ones mentioned in Case III points (1) and (2).

2. if the sum of selected liner OD+X is more than the hole diameter inside which the liner will run, then, warn the user that the "cement thickness behind the liner may be too less" and ask if wants to accept the value of liner. If he/she says yes, then accept the liner and snap it on inside the casing. After that follow the other instructions of asking for top and bottom measured depth as checks and warnings mention in point (1).

Case V: If the user wishes to select second liner a liner in presence of existing liner, then it will snap inside the existing liner, with a the top depth limited to the top depth of previous liner. In this case, the previously existing liner will behave like the casing, and the new liner will snap inside it based on all the rules and scenarios presented in Cases III and IV.

Case VI: If the user wishes to select third liner, it will not accepted saying that selection of liner is limited to two.

Scenario 7:

Selection of Tubing. When selecting any Tubing, select first the OD, then the weight per foot, then the type—T & C or Extreme Line. The last selection will provide the tool joint or coupling OD. For the joints whose coupling or TJ OD is missing in the database, Pipe OD will be defaulted as TJ OD.

For tubing to be selected there should be at least a casing or open hole on the worksheet. User cannot start the well bore with tubing alone. If they do so bring up a dialog that they need to select at a casing or open hole. Tubing can run inside a open hole, casing and inside liners. Tubing can also stab through packers or may just hang without a packer. However, they will always be attached to the surface. Following scenarios may exist (a) Case I: If Tubing is selected in presence of only Open Hole, then tubing will run in the hole if and only if, tool joint OD of the tubing is less than hole diameter. When it snaps, it will be attached to the surface or datum line. Need to enter the depth, which should be less than the hole depth inside which it is placed.

(b) Case II: If Tubing is selected in presence of Casing or multiple casings, it will snap only inside the inside most casing, if and only if the tool joint of the selected tubing is less than the drift diameter of the casing inside which it is going to run. The maximum depth of the newly selected tubing, after it snaps in, should not be more than the total depth of the casing inside which it snaps.

(c) Case III: If the tubing is selected in presence of a liner, hanging inside a casing then two cases are possible.
  i. Tubing can run inside the casing and the liner both, in which case, its tool joint outside diameter should be less than the drift diameter of the liner at the bottom. Once it snaps in, its total depth should be less than the bottom-measured depth of the liner.
  ii. Tubing can run up to the top of the liner hanger, if its tool joint outside diameter is less than the drift diameter of casing but it is more than that of liner drift diameter. This situation is not very practical, yet possible. In this case, the maximum depth of the tubing should be less than the top measured depth of the liner.

Scenario 8: Liner or another drill pipe (if the existing drill pipe is already inside a casing).

The program does not allow the drill pipe to run in the Annulus between casings or open hole, though such a practice is known to have carried out in some specialty circulations, with lower diameter drill pipes in relatively larger annuli. It is also not allowed a drill pipe to be selected before with only an open hole in the worksheet. Drill Pipes will usually never snap to the bottom and will always start from the surface—in case of Liners, we have to allow tandem drill pipe string Selection of Drill Pipe: Drill Pipe can be selected only in presence of casing. When selecting Drill Pipe, Select Drill Pipe, OD, Drill Pipe Weight, and Drill Pipe Tool Joint OD. The selection of Approximate weight, Pipe Type (eg. E, X. G or S), or Connection type is bypassed to avoid user confusion.

i. When Selecting a Drill Pipe in presence of only a Casing:
  i. Case I: If the selected Drill Pipe Tool Joint OD is less than the drift diameter of previous casing inside which it is meant to run, then the drill pipe can snap inside the casing from the surface without any warning. As soon as it does so, ask for the depth of the drill pipe.
  ii. Case II: If the selected Drill Pipe Tool Joint OD is equal to or more than the drift diameter of the previous casing, then warn the user to select another pipe and if he does so such that the new selected pipe has lower TJ OD, then let it snap in. Else, say, it cannot be run inside the previous casing, since, the OD is too much.

(d) When Selecting a Drill Pipe in presence of a liner inside the casing:
  i. Case I: Snapping inside Liner but may not start from surface: If the TJ OD of the selected drill pipe is less than the drift diameter of the liner inside the casing through which it is going to run, then allow it to snap on inside the casing and liner both from surface. However, now ask for its bottom-measured depth.
  ii. Case II: If the TJ OD of the selected drill pipe is more than the drift diameter of the liner inside which it is intended to run, but less than or equal to the drift diameter of the casing inside which the liner is tied to, then such a drill pipe will snap inside the casing from surface and terminate at the liner hanger. When it snaps in, ask for its depth. Entry of depth is important here. If the user enters the depth as greater than the depth of the liner hanger top, then you ask him if he wishes to attach it to the top of the hanger so as the drill pipe becomes the running tool for liner cementation. If he says yes, do so and unit the drill pipe and liner top. If he says no, then warn him that the depth should be less than the liner hanger top and ask him to re-enter the depth. If he enters a depth less than the top of hanger, let the drill pipe hang open ended from the top.
  iii. Case III: If the TJ OD of the selected drill pipe is more than the drift diameter of the casing which has a liner running, inside it, such a drill pipe cannot run in the casing or liner both. Prompt the user to reduce the drill pipe TJ OD by selecting lower drill pipe diameter.
  iv. Case IV: Tapered String: If the user is faced with a situation of Case I, where he has entered, the top depth of the drill pipe inside the liner such that it does not start from the surface, then the top of such a drill pipe is a hot spot for another drill pipe. This point will keep blinking and will not permit volume calculations, unless it is anchored somewhere or if it is attached to preceding drill pipe. Now if the user, does want to attach a drill pipe on top of such a hot spot, then allow only such a drill pipe whose TJ OD is less than the drift diameter of the casing inside which it is going to run.
  v. Case V: Tapered String: If the user if faced with a situation of Case II, where the drill pipe he has selected, hangs from the surface and remains unconnected to the top of the liner hanger, then such a drill pipe can be extended by attaching another drill pipe at its bottom. If the intention is to attach a drill pipe to the bottom of this string, such that the newly selected drill pipe goes inside the liner, then the TJ OD of the newly selected drill pipe should be less than the drift diameter of the liner inside which it is going to run. When this condition is met, allow the snapping of drill pipe to the bottom of the preceding one, and ask for its final depth. If however, the TJ OD is equal to or more than the liner drift diameter, prompt the user to select a lower diameter drill pipe and snap it only it passes the test.

The 'i-Handbook' Software 20 of FIG. 1

The 'i-Handbook' software 20 was basically designed with 3 basic objectives in mind: (1) to avoid a typical "windows-application-like" look and retain the "book" format similar to the Field Data Handbook, (2) to present the data in an easy-to-use, lucid manner which would not require any additional training, and (3) to cater to the needs of an audience that can vary from personnel on any oilfield location to design and planning engineers who operate from offices.

The overall structure of 'i-Handbook' software 20 may be classified into four (4) major components that may be either in use simultaneously or in parts depending on the way the user elects to use the application. These components are listed below, as follows:

(1) Human Interfaces: These may be used for the purpose of navigation, data entry, calculations, animations, and to obtain other results.

(2) Databases: These are huge knowledge bases that are provided in order to facilitate viewing and computations. Users are allowed to update some of the databases.

(3) Calculators: These are meant to help the user in carrying out routine calculations in the field or in office.

(4) File Management: This feature enables the user to save the information for a possible re-use or even an exchange for information with another user.

Each of the above four major components which comprise the 'i-Handbook' software 20 of FIG. 1 will be discussed in the following paragraphs with reference to FIGS. 20, 21, and 22, as follows:

(1) Human Interface

This was the first step in the development of the 'i-Handbook' 26, whereby a prototype was first created with a view to presenting the field data handbook in a form that resembles the look of a book and has some of the features of the book. The controls were developed using Microsoft Foundation Classes and the codes were written in Visual C++. The following text describes separate features of the 'Human Interface':

Page Control: Data in the 'i-Handbook' 26 is presented in the form of a book and thus has virtual pages. 'Page Control' is a module that does the page management and decides on how the data needs to be presented. Apart from the area in the middle of the book where the left side of the page is reserved for a drawing and a binder, the remaining part of the page has hot and usable areas. Every page is associated with "bent page corners" on the top right and left, to signify a hot area, which can be clicked to flip the pages, like a typical book. When the page reaches the last page of a section, it jumps over to the Table of Contents page of the next section, if the user continues to click on the right top page corner to move forward. Right bottom of book cover has a hot area that can used to "resize" the book. Once the user does this, the page control, redesigns the book by reallocating the contents on the page. For example, when viewing a table, if the book is stretched and increased in size, a single page will include more data; in order to accomplish this, the page control will reconsider the amount of data being displayed in a single page by ascertaining the new "size" of the book. Individual pages in the book can be copied by taking the cursor to the bottom of the page and right clicking on the mouse. This action copies the page contents like a metafile to the system clipboard and can be reproduced by pasting it in any standard Microsoft application like Word, Excel and PowerPoint.

Figure 21:
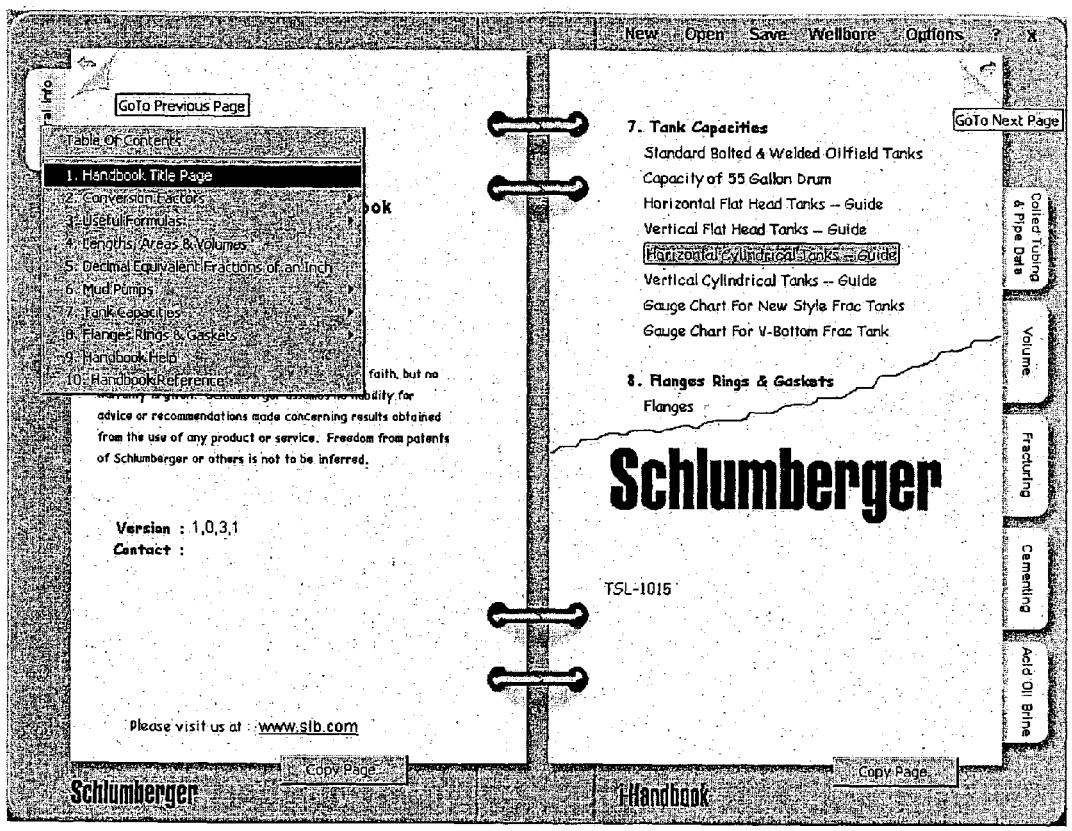
FIGS. 21 and 22 assist in illustrating a construction of the 'i-Handbook' software.

Refer now to FIG. 21. In FIG. 21, various features of the 'i-Handbook' 26 that pertain to the 'page control' module is illustrated.

Tabs, Sections & Navigation: Once a "template" page was defined by the page control, the rest of the data to be presented in the book was divided into six individual sections and section tabs were created. The tabs are system navigational tools like page flipping and take the user to the section, which is clicked. A memory is associated with the last page that was viewed in a section. If the user views a page in one section and jumps to another one for a while before returning to previous section, a click on the previous tab will reopen the last page in that section. However, one more click on the same tab will open the Table of Contents for the section, which lets the user get to the required part of the book by just clicking on the particular content of interest. This greatly enhances the speed at which the user can move between the pages. Pointing the mouse at any tab and right clicking also creates an array of cascading menus and makes the navigation even faster.

Table Control: This is another useful feature that is provided under the 'Human-Interface' which enables efficient and better viewing of tables and enables cell-based copy and paste. 'Table control.' was generated by writing codes to create a virtual table that includes several cells that may have properties similar to any cell-based software like Microsoft Excel. This enables the display of information with a better control and prevents all such information from being "hard coded". Some controls in the cell include: ability to change the decimal places to show accuracy, ability to center, right/left align the output, ability to show or hide separator lines, ability to draw border around the cells, and, more importantly, the ability to copy Individual cell values to another software so that the output remains editable.

Figure 22:
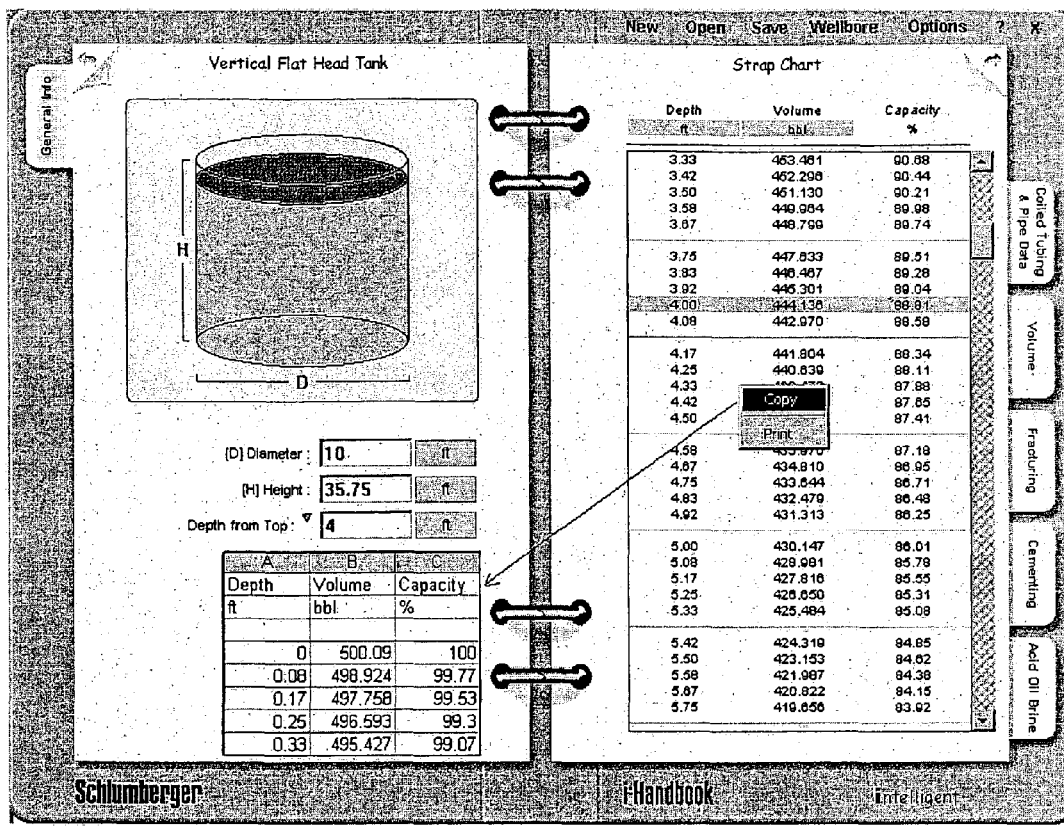

Refer to FIG. 22. In FIG. 22, the 'Table Control' feature allows for a proper display of output results and it also allows for an ability to copy data and paste the data in any cell-based software such that the value in individual cells remains editable.

(2) Databases

Databases are an important part of the 'i-Handbook' 26 because these are not only displayed by the user but the databases are also used on a number of occasions to carry out the calculations. Various databases in the application are briefly described in the section below.

Tubular Database: The 'Tubular Database' includes detailed information on various tubular, such as casing, tubing, drill pipe, drill collars and coiled tubing, that are used in the oilfield industry. Tubular databases are relational to a certain extent since the basic inputs that describe a pipe are outside diameter [OD, in], its weight per unit length [w, lbm/ft], wall thickness [t, in], drift diameter [d, in], and grade. There are other features that (such as make up loss, pin length, coupling outside diameter, coupling diameter for special clearance pipes, etc) that deal with the joints of the pipe. Most of the mechanical properties can be computed on basis of the basic information stated above. The relation nature of database requires intelligent storage of data, which was done very efficiently in this case. For example, for every unique OD, there is a unique wt. for which there is a unique t, for which there are unique grades. Other values (such as internal diameter, yield strength, collapse resistance, pipe-body yield strength, joint yield strengths, etc) can be computed using equations. Further, throughout the Handbook 26, the tubular data is used in different ways—sometimes all of it is used and, on other occasions, only a part of it is used. For example, in the Coiled Tubing and Pipe Data section, it is necessary to show all types of pipes, whereas, in the volume section, we drill down only to internal diameter since grades have no relation to pipe capacity or displacement. To be able to carry out these operations efficiently, without ever omitting the data, the information was parsed in carefully and relationships between various parameters were fully defined. Such relational databases were created for all the tubular types that are described above.

Material Databases: Two types of material databases, used extensively used in the 'i-Handbook' 26, are: a cement and cement additives database, and a database for proppant used in fracturing operations. The database on cementing materials holds key information, such as their physical properties, whereas the proppant database holds values for physical properties and pricing codes as well. The details on how these databases are used in the application can be found in the following specification with reference to FIGS. 10-15. An additional feature in cement database allows the user to append, edit or delete new entries in the database. This is due to the fact that new additives may be continuously launched in the market and the user may be required to update the database. As for the proppant database, provision is provided in various calculators to over ride the physical properties of the materials; this will change the calculation results and new values pertaining to changed inputs can be thus be obtained.

(3) Calculators

The 'i-Handbook' 26 features over 25 calculators, the details of which have already been discussed above with reference to FIGS. 2-19. Calculators have a well defined user interface that provides active cells for input, including the ability to change unit systems, and the outputs are distinctly displayed on a separate page in most some cases. In some cases, the output is in the form of results computed for a single point as well as for a whole range of inputs, and such an output is usually arranged in a tabular form. A table can be copied and reproduced elsewhere, whereas, any page of the application can be copied as a metafile. A few of the calculators also provide visual enhancements, such as tank level indication in a tank, stroke counter for pumps, gate percentage position on gates, annulus volume, well bore diagram, etc. With the exception of a few cases, most of the calculators dexterously combine all the three aspects including: an efficiently interactive and intuitive human interface, an extensive database, and a set of rules and equations and algorithms needed to compute the answers. Presenting the information in an easy-to-use lucid manner efficiently completes the loop; the "Copy Page" option permits the user to simply extract the output on paper if so desired.

(4) File Management

This feature is provided to further increase the usefulness of the application. Briefly stated, features such as 'new file' (restores default data), 'open' (opens any previously saved file), 'save file' (saves existing data in a file), and 'units management' (choose metric, oilfield or custom units) help to improve the ability of the application to address larger needs of a typical user that find such features essential for any software that deals with engineering calculations.

Figure 20:
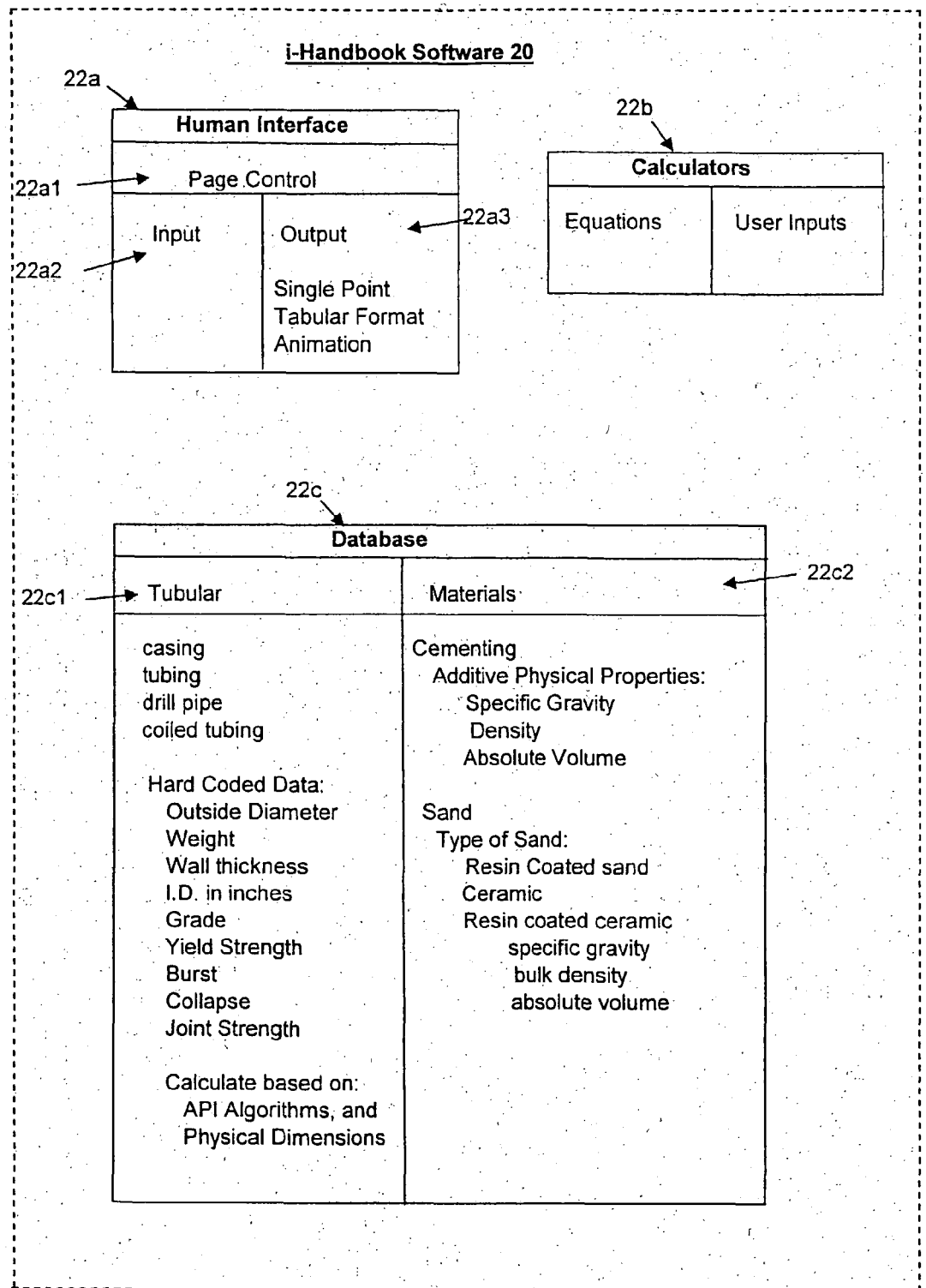
FIG. 20 illustrates a block diagram of the 'i-Handbook' software shown in FIG. 1.

Referring to FIG. 20, a block diagram illustrating the construction of the 'i-Handbook' software 20 of FIG. 1 is illustrated. In view of the above description of the 'i-Handbook' software 20, it is clear that the 'i-Handbook' software 20 includes: a human interface 22*a*, calculators 22*b*, and a database 22*c*. The human interface 22*a* portion of the 'i-Handbook software' 20 determines the appearance of the 'i-Handbook' 26, and, therefore, the human interface 22*a* in FIG. 20 includes a Page Control 22*a*1. The Page Control 22*a*1 includes input cells 22*a*2 and an output cells 22*a*3, where the output cells 22*a*3 can be single point, a tabular format, or animation. The database 22*c* portion of the 'i-Handbook' software 20 includes a tubular database 22*c*1 and a materials database; 22*c*2. The materials database 22*c*2 includes 'cementing' and 'sand'. The 'cementing' portion of the materials database 22*c*2 stores additive physical properties, such as specific gravity, density, and absolute volume which are used for the calculations performed by the calculators 22*b*. The 'sand' portion of the materials database 22*c*2 stores the types of sand, such as resin coated sand, ceramic sand, and resin coated ceramic sand. The 'properties' of such sand include specific gravity, bulk density, and absolute volume. The tubular database 22*c*1 stores data pertaining to tubing or casing that are placed in the wellbore. As a result, the tubular database 22*c*1 includes and stores: casing, tubing, drill pipe, and coiled tubing. The properties of the tubular database 22*c*1 include 'physical properties' which are 'hard coded', such as outside diameter, weight in pounds per foot, wall thickness, inner diameter (I.D.) in inches, grade (J, K, L, N, Q, P), yield strength, burst, collapse, and joint strength. These 'physical properties' are calculated based on API Algorithms, and physical dimensions. The calculators 22*b* portion of the 'i-Handbook' software 20 includes and stores 'equations' and 'user input data'.

DETAILED DESCRIPTION OF THE INVENTION

General Description of i-Handbook.

Figure 23:
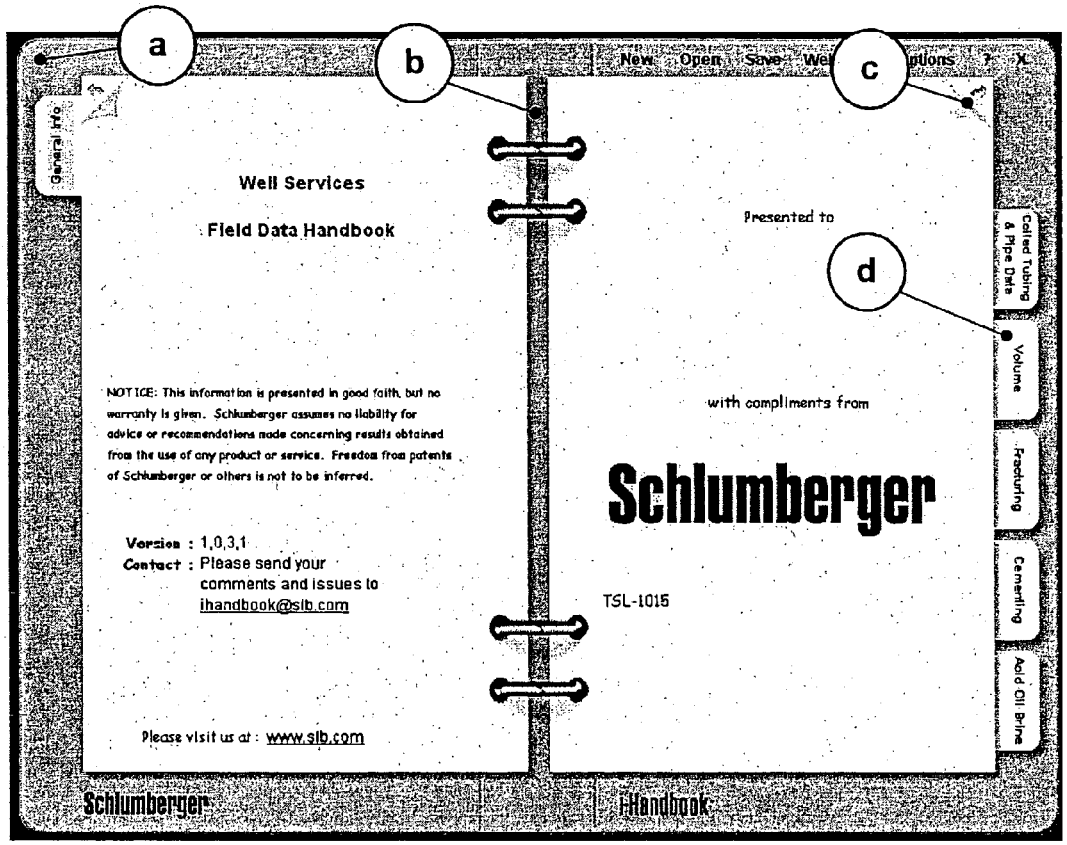
FIG. 23 illustrates the 'i-Handbook' application on Windows Desktop.

Referring to FIG. 23, the 'i-Handbook' 26 was designed to resemble the ring binder of the FIELD DATA HANDBOOK (TSL-1008). FIG. 23 shows the 'i-Handbook' 26 application as it appears on a system desktop. By design, the 'i-Handbook' 26 does not have the classical Windows application look. There is no application title bar, menu bar, tool bar, status bar, or main window border. In FIG. 23, element numeral (a), the main window border is shown having rounded corners and a 3-D effect to simulate the thickness of the binders cover. The blue border around the 'i-Handbook' 26 is the background color of the desktop and not part of the application. Element numeral (b) shows the ring binder clamps. Element numeral (c) points to a raised page corner indicating there are more pages. Element numeral (d) is a ring binder divider tab showing one of six available sections. Shadows under the ring binder clamps, pages and divider tabs give the 'i-Handbook' 26 a 3-D appearance. Two creases on either side of the binder spine give the appearance that the binder can be closed.

In FIG. 23, all of these subtleties were added to give the user the impression that they are working with a ring binder and not the typical Window application. This also helps to use the application since most users have a conceptual model of how the ring binder works in their head. For example, clicking on a divider tab takes the user to that section. Also, clicking on the raised page corner turns to the next or previous page.

Functionality Built On Top of the Basic Ring Binder Model.

Figure 24:
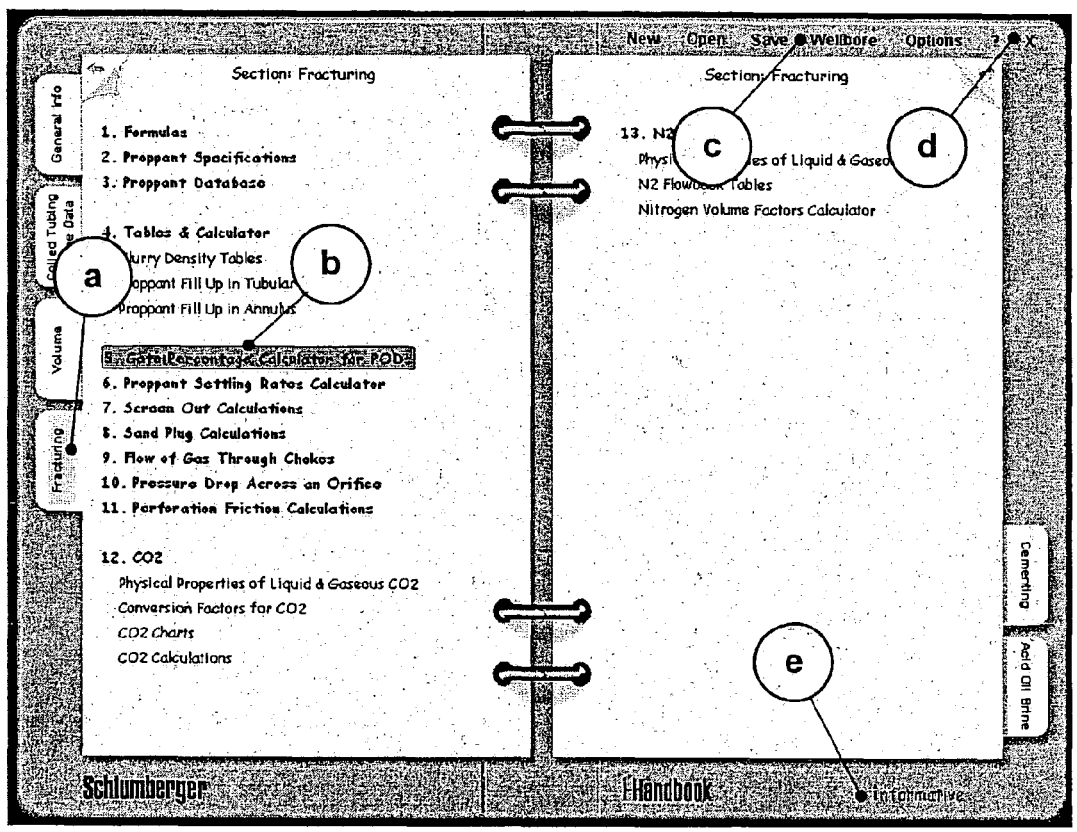
FIG. 24 illustrates extended functionality over a physical field data handbook.

Referring to FIG. 24, since 'i-Handbook' 26 is a computer application, it is possible to add more functionality than exists in the real Field Data Handbook. In FIG. 24, the user selected the Fracturing tab, element numeral (a), which opened the 'i-Handbook' 26 to the table of contents page of the section. The first two pages of each section contain a table of contents of sub-sections. Element numeral (b) points to a table of contents entry that is highlighted when passed over by the mouse. If the user selects this item, the 'i-Handbook' 26 jumps to the sub-section "Gate Percentage Calculator for PODs".

In FIG. 24, additional functionality is made available to the user through the buttons noted by element numeral (c). 'New', 'Open', and 'Save' allow the user to manage any information that they may have entered. This information is saved and recalled from a file. 'Wellbore' brings up a "wellbore sketch pad" that allows, the user to draw various wellbore configurations. The 'Options' button allows the user customize certain aspects of the 'i-Handbook' 26. The '?' and 'X' shown by element numeral (d) take the user to the 'i-Handbook' 'Help' sub-section and closes 'i-Handbook' 26. Note, closing merely takes the application off of the desktop. It does not Exit the application. To open the 'i-Handbook' 26 again, the user double clicks on the icon in the system tray. To officially Exit the application, the user right clicks on the icon in the system tray and selects 'Exit' from the pop-up menu.

Element numeral (e) highlights an annotation that varies depending on the type of page the user is viewing.

Organization

Figure 25:
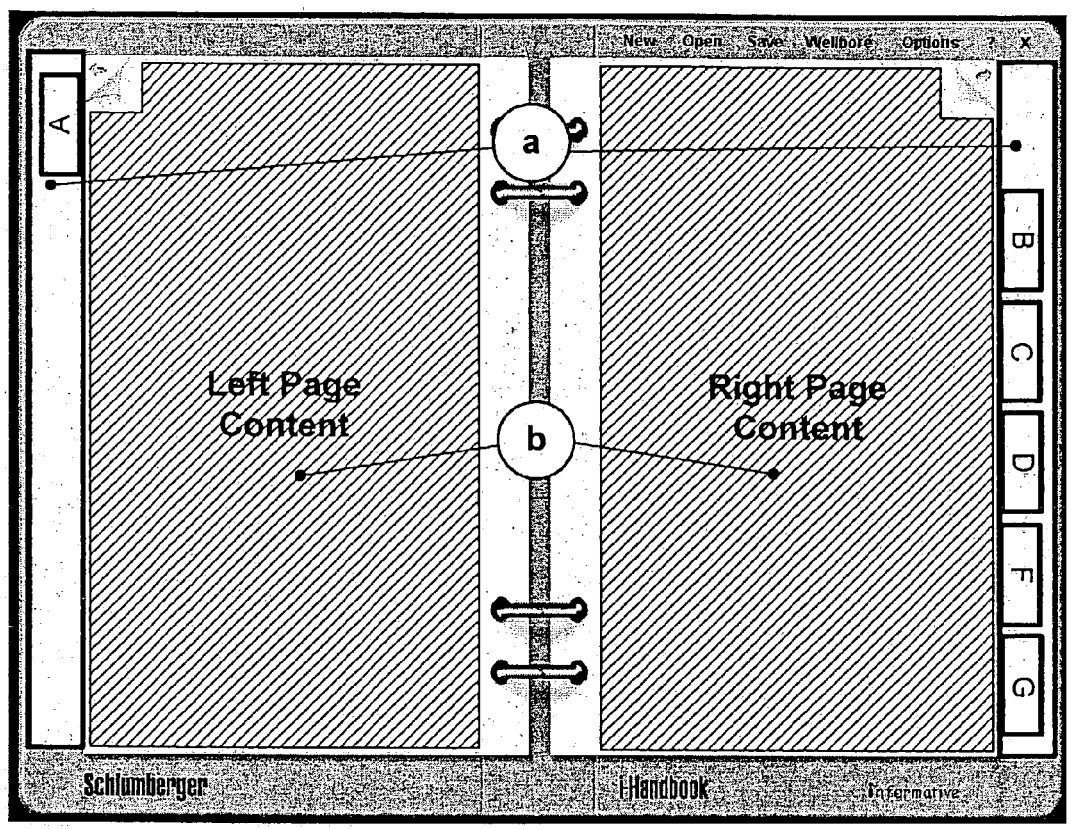
FIG. 25 illustrates the primary areas of the 'i-Handbook'.

Referring to FIG. 25, the only portions of the 'i-Handbook' 26 that update during use, are those annotated in FIG. 25. The remainder only grow and shrink as the application is resized. Element numeral (a) points to the Left and Right. Bar Tab Manager. Element numeral (b) notes the Left and Right Page Content. These items are at the core of the 'i-Handbook' 26 organization. One provides the main navigation and the other is the primary view for the 'i-Handbook' 26 content.

In FIG. 25, the Bar Tab Manager drives the activation of sections as the user selects a divider tab. As shown in FIG. 25, Section 'A' is the currently active section. All in-active section divider tabs are drawn in the Right Bar Tab Manager. If section 'D' divider tab where selected, then tabs 'B'-'D' would move to the Left Bar Tab Manager. The hashed areas, denoted as Left and Right Page Content, are updated as the user moves through the information in the 'i-Handbook' 26. These areas are redrawn as needed to reflect the current pages of the current sub-section in the current section. Unlike the real book, the number of possible pages are infinite. The number of pages can also vary depending how large the user sizes the 'i-Handbook' 26. Longer pages display more information requiring fewer pages. Therefore, pages numbers have no real bearing in the 'i-handbook' 26 since the number of pages is a function of the application's overall size.

Figure 26:
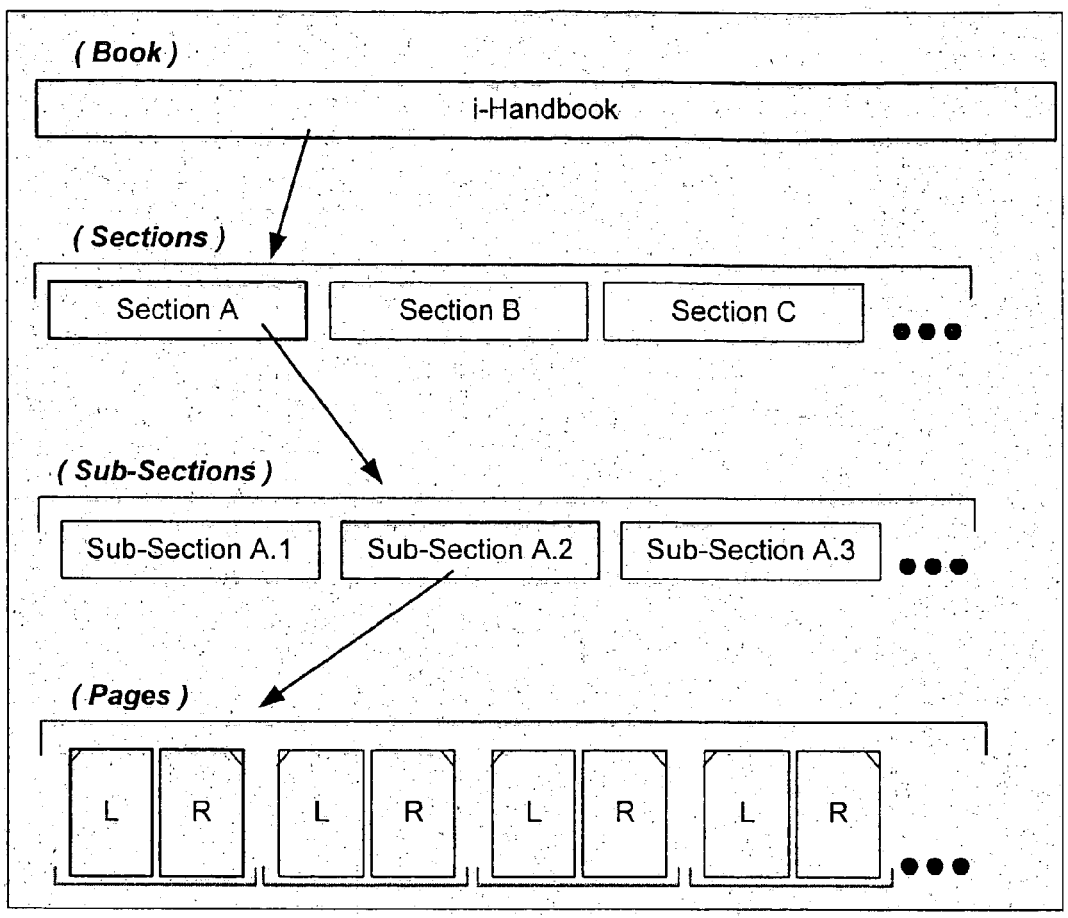
FIG. 26 illustrates the layers in the 'i-Handbook'.

Referring to FIG. 26, this Figure illustrates the layers of management within the 'i-Handbook' 26. The book contains Sections that in turn contain any number of sub-sections. Sub-sections contain page pairs. Each left page has a corresponding right page. FIG. 26 indicates that Section A is active and opened to Sub-Section A.2. The current pages being displayed in the Left and Right Page Contents are the first page pair. If the user selects the turn page on the upper right page, the next page pair would be displayed in the Left and Right Page Content areas.

Figure 27:
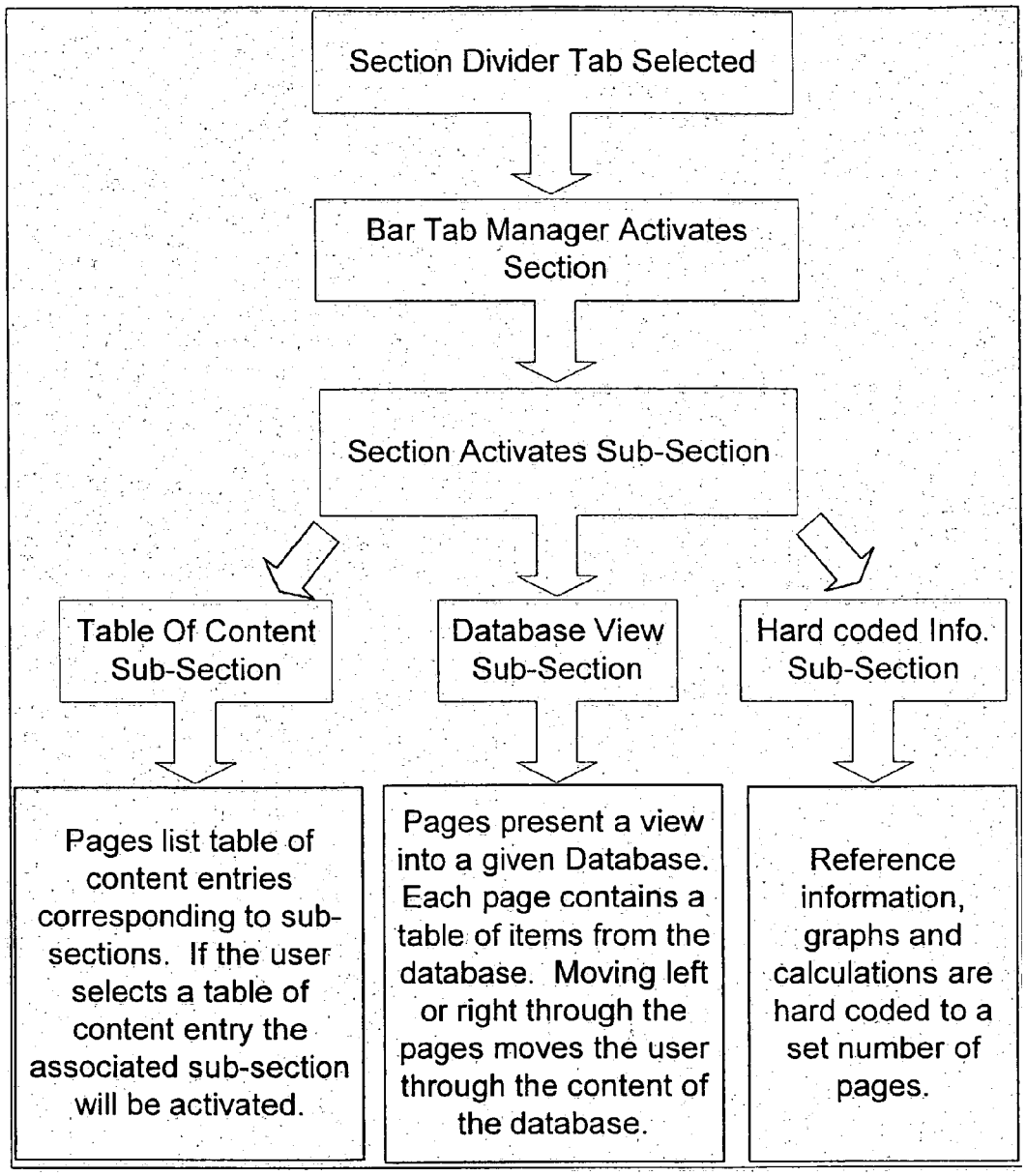
FIG. 27 illustrates a functional flow diagram of the 'i-Handbook' software.

Referring to FIG. 27, this figure illustrates the flow through the application when a give section divider tab is selected. This corresponds directly to the layers presented in FIG. 26. However, this diagram shows the three basic sub-section types, (1) Table of Content (this was shown in FIG. 24), (2) Database View, and (3) Hard coded information.

A Functional Specification of the 'i-Handbook' Software 20

The structure and function of the 'i-Handbook' software 20 of FIG. 1 is fully discussed in the following 'functional specification' which is set forth in the following paragraphs.

Requirements

Audience: The audience will be employees and clients involved in field operations.

Use and Platform 3.3.1 The handbook will be user friendly. Although user friendliness is subjective and not easily verifiable, some measurement will be performed. The method used to assess user friendliness will be defined during development. It may involve requiring key users and testers to provide feedback in form of a questionnaire.

3.3.2 The application can be launched independently using an icon located at the bottom of user's laptop screen.

3.3.3 The application will run on PC desktops and laptops, with windows 98, NT and 2000. Target platform is the typical field engineer Opspack latitude in the current configuration at application commercialization.

3.3.4 MS Office 2000 will be supported. Supporting MS office 97 and earlier versions is not required.

3.3.5 Running the application on pocket PC IPaq H3600 from Compaq has been considered. It is not a requirement for the first version of the application. However, future installation on Ipaq running windows CE will be taken into account during feasibility and development when technical decisions are being made.

Features

Introduction

1. All tables presented in following section list information to be provided by the e-handbook. They are for reference only, the final layout will be defined at a later date.
2. Individual vendors will be contacted to obtain non-API data. API data will be obtained from API bulletin.
3. All calculators and tables will support metric and oilfield units.
4. Some features are marked version 2. These will not be provided in this project but will be addressed in subsequent version.

Conversion Factors

A table on conversion factors is a standard in most of the field data handbooks. Conventionally, it still requires of the user to carry out calculations once the conversion factor is obtained. The module on conversion factor will include the following two strategies, 1. Table Format showing the conversion factors
2. Calculator with an ability to calculate or convert The Table Format would have the general form like the one shown below:

| Multiply | by | To Obtain |
|---|---|---|
| Acre | 43560 | Square Foot |

Similarly, the calculator would have an interface enabling the user to input the values and obtain the conversion he/she wishes. Reference: Dowell Handbook 100.002 to 100:004

Volume Related Useful Formulas & Calculator

Built-in Calculator

This calculator will display useful formulas related to the fieldwork and also include a calculator that will be able to calculate the following. Metric units will be supported, although only oilfield calculations are shown below.

General Format:

Volume Capacity of Pipes
1. Gallons per 1000 feet=$40.8 \times (ID \text{ in inches})^2$
2. Barrels per 1000 feet=$0.9714 \times (ID \text{ in inches})^2$
3. Cubic feet per 1000 feet=$5.454 \times (ID \text{ in inches})^2$
4. Gallons per mile=$215.4240 \times (ID \text{ in inches})$
5. Barrels per mile=$5.1291 \times (ID \text{ in inches})^2$
6. Cubic Meter/100 Meter=$0.0000785 \times (ID \text{ in mm})^2$ Volume of Hose
1. 2 inch hose=0.02 cubic feet per foot
2. 2½ inch hose=0.03 cubic feet per foot
3. 3 inch hose=0.04 cubic feet per foot
4. 4 inch hose=0.08 cubic feet per foot.

Velocity
1. Feet/min=$1029.42 \times (bbls/min) \div (ID \text{ in inches})^2$
2. Feet/sec=$17.17 \times (bbls/min) \div (ID \text{ in inches})^2$
3. Feet/sec=$0.4085 \times (gals/min) \div (ID \text{ in inches})^2$
4. Meters/sec=$76394400 \times (m^3/min) \div (ID \text{ in mm})^2$ Horsepower,
1. Hydraulic Horsepower=$0.000584 \times (gals/min) \times (pressure, psi)$ 2. 3 Hydraulic Horsepower=(gals/min)×(pressure, psi)÷1713.6
3. 3 Hydraulic Horsepower=0.02448×(bbls/min)×(pressure, psi)
4. 3 Hydraulic Horsepower=(bbls/min)×(pressure, psi)÷40.8
5. Hydraulic Horsepower=Brake Horsepower×Efficiency of power train to pump×Pump Efficiency
6. KW=0.01667 kPa×m$^3$/min Tank Volumes
1. Bbl/ft in round tank=(Diameter in feet)$^2$÷7.14 (or 7 for approx)
2. Bbl/inch in round tank=(Diameter in inch)$^2$·85.7 (or 86 for approx)
3. Bbl/inch in square tank=0.0143×(Length in feet)×(Width in feet)
4. Cu ft./inch in square tank=0.0833×(Length in feet)×(Width in feet)
5. m$^3$/meter in round tank=0.7854×(Diameter in meters)$^2$
6. m$^3$/cm in round tank=0.007854×(Diameter in meters)$^2$
7. m$^3$/cm in square tank=Length (m)×Width (m)×0.01

Mud pit calculation
1. 0.0833×length in feet×width in feet=cubic feet/inches of depth
2. 0.0148×length in feet×width in feet=barrels/inches of depth
3. 0.00058×length in inch×width in inches=cubic ft/inches of depth
4. m$^3$/cm of depth=length in meter×width in meter×0.01
5. m$^3$/m of length=length in meter×width in meter Metal displacement
1. 0.002×wt of pipe per foot (with coupling)×depth in ft=disp in bbls
2. 0.000367×wt. of pipe/foot (with coupling)×depth in ft=disp in bbls
3. 0.000124×wt. of pipe in kg/m with coupling×depth in m=disp in m$^3$ Temperature
1. Temperature Centigrade=5/9 (Temperature °F.−32)
2. Temperature Fahrenheit=9/5 (Temperature °C.)
3. Temperature Absolute C=Temperature % C.+273
4. Temperature Absolute F=Temperature % F.+460

Areas and volumes of several geometric figures refer formulae and figures on page 100.006

Inch to millimeter conversions
This will comprise of a Table and a Calculator.

TABLE I

| Fraction | Decimal Equiv. inches | Millimeters |
|---|---|---|
| 1/64 | 0.015625 | 0.397 |

TABLE 2

| Inches | Decimal Equiv. Feet | Millimeters |
|---|---|---|
| 1 | 0.0833 | 25.4 |

Calculator
1. Decimal Equivalent=0.015625×Numerator of 64$^{th}$ Denominator
2. Inches to millimeters=Inches×25.4.
3. Millimeters to Inches=Millimeters÷25.4
Details for this section can be obtained from 100.007

Tank Capacities
This is important to gauge on-location total fluids/chemicals.

Standard Bolted Tanks & Welded Tanks

| Table for Standard Bolted Oil Field Tanks (Vertical Cylindrical) | | | | | |
|---|---|---|---|---|---|
| Nom Size Barrels | Dimension D × Ht. (ft) | Bbls/foot | Nom Size M$^3$ | Dimension D × Ht. (m) | m$^3$/m |
| 250 | 15' 4⅝" × 8' ½" | 33.11 | 39.75 | 4.69 × 2.45 | 17.27 |

| Table for Standard Welded Oil Field Tanks (Vertical Cylindrical) | | | | | |
|---|---|---|---|---|---|
| Nom Size Barrels | Dimension D × Ht. (ft) | Bbls/foot | Nom Size M$^3$ | Dimension D × Ht. (m) | m$^3$/m |
| 100 | 8' × 10' | 8.95 | 15.9 | 2.44 × 3.05 | 4.67 |

The above Tables can be obtained from section 100.011

Capacity of Horizontal Flat Head Tanks
This is a helpful tool for making strap charts for tanks of above-mentioned geometry.

TABLE

| Depth ÷ ID (mm) or (in./in.) | % Of Total Capacity |
|---|---|
| 0.001 | 0.0053 |

Tables are provided on page 100.011.
Vertical and Horizontal Cylindrical Tanks
General Format will include a Table and Calculator
Horizontal cylindrical tanks

| Table for 500 Barrel Capacity | | | |
|---|---|---|---|
| Inches | Barrels | Meters | m$^3$ |
| 1 | 0.5 | 0.025 | 0.08 |

Values can be calculated using the equations mentioned below.
There will be a calculator incorporated to carry out the calculations
Refer now to FIG. 28.
Equations:

$$\theta = \cos^{-1}\left(\frac{r-i}{r}\right)$$

$$a = \sqrt{2 \cdot r \cdot i - i^2}$$

-continued
$$\text{Volume} = \left\{\frac{\pi\theta r^2}{180} - a(r-i)\right\} \times l$$

Here 1 is the length of the tank, r is the radius of the tank and i is the intended point of depth for which the volume needs to be measured. For results in bbls, use r and i in inches, and 1 in feet. Now multiply the results by 1.2367665 E-03. For simplicity, take only one numeral after decimal.

Vertical Cylindrical Tanks

| Inside Diameter | | Capacity | Inside Dia | Capacity |
|---|---|---|---|---|
| Feet | Inches | Bbls/ft | Meters | m³/m |
| 2 | 0 | 0.56 | 0.610 | 0.292 |
|  | 1 | 0.607 | 0.635 | 0.317 |

Equation:

Capacity in bbl/ft=(ID in inches)²÷1029.42 (round off to 3 decimals)

Capacity of Drums

For drum height 33.25 inches, capacity 57.325 gal., dia=22.49 inch

TABLE

For Horizontal and Vertical Drums

| Drum Horizontal | | Measured Depth | | Drum Vertical | |
|---|---|---|---|---|---|
| Gallons | m³ | Inches | Mm | Gallons | m³ |
| 0.9 | 0.003 | 1 | 25 | 1.72 | 0.007 |

Figure 28:
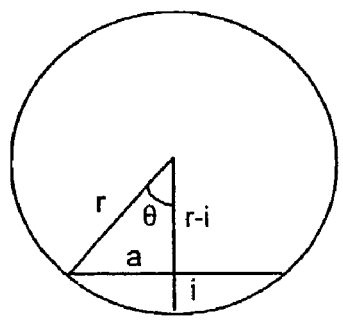
FIGS. 28 and 29 illustrate diagrams used in calculations in the Detailed Description.

Refer to FIG. 28.
Equations
Vertical
Volume in gals=1.72406×inches full (without rounding off)
Horizontal $$\theta = \cos^{-1}\left(\frac{r-i}{r}\right)$$
$$a = \sqrt{2 \cdot r \cdot i - i^2}$$
$$\text{Volume} = \left\{\frac{\pi\theta r^2}{180} - a(r-i)\right\} \times l$$

The above equations bear usual notations. Refer Section 100.015

Gauge Charts for New Style Frac Tanks
This information will be helpful to strap on location Frac Tanks
Information will be provided in the form of Table shown below:

| Depth (Ft-inch) | Barrels | Depth (Meters) | m³ |
|---|---|---|---|
| 0-1 | 3.5 | 0.025 | 0.55 |
| 0-2 | 7 | 0.051 | 1.11 |

Information regarding this is available in Section 100.024-100.027

Mud Pumps
This section is important for field engineers to determine the displacement of drilling rig mud pumps. On some occasions, the cementing slurry may have to be displaced by the mud pumps.

Duplex and Triplex Mud Pumps Displacement
Information can be provided in the form of a Table and also a calculator
Table is shown in 100.034
Formula For Double Acting Pumps Duplex or Triplex $$\text{Displacement} = 2N_L \times \frac{S}{12} \times \frac{ID_L^2}{1029.42} \times \eta \text{ bbls}$$

For Double Acting Pumps Duplex or Triplex with rods deducted $$\text{Displacement} = \left[\left(2N_L \times \frac{S}{12} \times \frac{ID_L^2}{1029.42}\right) - \left(N_L \times \frac{S}{12} \times \frac{OD_R^2}{1029.42}\right)\right] \times \eta \text{ bbls}$$

Here $N_L$ is the number of liners (2 for duplex or 3 for triplex), S is the length of the stroke in inches, $ID_L$ is in the internal diameter of the liner, $OD_R$ is the outside diameter of the rod in inches, and $\eta$ is the efficiency.

Tubular Goods—Mechanical Properties
This will be one of the most exhaustive sections of the handbook as it will consist of mechanical properties of Drill pipe, Tubing, Casing, and Coil Tubing.
Each of this section will bear a short introduction to API Requirements pertaining to the Tubular type—DP, Tbg. Or Csg.

Tubing
API
Interchangeability of 10RD Integral Joint Tubing

| Dimensional Data and Mechanical Properties | | | | | | | | | | | | | | | | | |
|---|---|---|---|---|---|---|---|---|---|---|---|---|---|---|---|---|---|
| | | | | | | | Threaded & Coupled | | | | | | | | | | |
| | Nominal Wt | | | | | | Coupling OD | | | Int Jt | | | | | | | |
| OD (in) (mm) | T&C Non UP Lb/ft | T&C UP Lb/ | Int Jt. Lb/t | Wall Thic Inch mm | ID (in) (mm) | Drift Diam (in) (mm) | NUp (in) (mm) | Up Reg (in) (mm) | Up Spe (in) (mm) | Drift Dia (in) (mm) | Bo OD (in) (mm) | GRADE | COLLAP | BURST | Jt Yield 1 | 2 | 3 |

Non-API

| Dimensional Data | | | | | | | | | | | | |
|---|---|---|---|---|---|---|---|---|---|---|---|---|
| | | Tubular | | | | | Joint | | | | | |
| OD | Weight lb/ft | Wall | ID | Drift | Type | | | | | | | |
| (in) | Plain | | (in) | (in) | (in) | Of | ID | ID | ID | ID | ID | ID | Inter |
| (mm) | End | Nom. | (mm) | (mm) | (mm) | Joint | (in) | (mm) | (in) | (mm) | (in) | (mm) | Change |

| Dimensional Data | | | | | | | |
|---|---|---|---|---|---|---|---|
| OD | | Weight (lb/ft) | | | Collapse | Internal Yield | Tensile |
| (in) | Wall | Plain | Nominal Jt | | (psi) | (psi) | Strength |
| (mm) | Thickness | End | Dependent | Grade | kg/cm² | kg/cm² | Lb or kg |

Casing
  API
    Tubing API Requirements

| Dimensional Data and Mechanical Properties | | | | | | | | | |
|---|---|---|---|---|---|---|---|---|---|
| | | | | | | Coupling/Joint OD | | | |
| | | Wall | | Drift | Round/ | | Bored | | Collapse |
| OD | Weight | Thickne | ID | Dia | Buttress | Other | Pin ID | | Resis- |
| (in) | W/cplg | (in) | (in) | (in) | (in) | (in) | (in) | | Tance |
| (mm) | Lb/ft | (mm) | (mm) | (mm) | (mm) | (mm) | (mm) | Grade | (psi) |

Non-API

| Dimensional Data | | | | |
|---|---|---|---|---|
| Size | Weight (ft-lbs) | | Inside | Drift |
| O.D. | Nominal | Plain | Diameter | Diameter |
| (in) | T&C | End | (in) | (in) |

Drill Pipe
Drill Pipe API Requirements

| Drill Pipe Tool Joints | | | | | | | | | | | | | |
|---|---|---|---|---|---|---|---|---|---|---|---|---|---|
| DRILL PIPE DATA | | | | | TOOL JOINT DATA | | | | | | | D/P Data | |
| | WEIGHT | | | | CONNECTION | | | | STRENGTH | | REC | Strength | |
| | (lbs/ft) | | | UPSET | | | | Drift | Tens | Torsi | Mak | Tens | Tors |
| OD (in) | Nom Wt | Appr Wt. | Type | OD (in) | Type | O.D. (in.) | I.D. (in.) | I.D. (in.) | Yield (lbs) | Yield ft-lb | Up Ft-lb | Yield lbs | Yield Ft-lb |

| Drill Pipe: | | | | | | | | | |
|---|---|---|---|---|---|---|---|---|---|
| | Weight lb/ft | | | Wall | Sect. | | Torsi | Tensil | Collapse | Burst |
| OD (in.) | Plain T&C | I.D. End | (in.) | Thickn (in.) | Area In2 | Grade | Yield Ft-lb | Yield Lbs | Pressur Psi | Pressu Psi |

Coil Tubing

| Technical Data | | | | | | | | | | | | | | |
|---|---|---|---|---|---|---|---|---|---|---|---|---|---|---|
| Tube Dimensions | | | | Tube Area | | | Load Capacity | | Pressure Capacity | | | | Torque | |
| | Wall Nom | Wall Min | I.D Nom | Wall Nom | I.D Nom | Wt Nom | Yield Min | Ultim Min | Yi Min | Tst 80% | Bur Min | Colla Min | Yiel Nom. | Ulti Nom. |
| OD (in) | (in) | (in) | (in) | In2 | In2 | Lb/ft | lbs | lbs | Psi | psi | Psi | Psi | Lb-ft | Lb-ft |

Tubular Goods—Dimensions & Capacities 45

This will be an extensive section covering the volumes related to tubular goods like Drill Pipe, Tubing, Casing, and Coil Tubing. Calculator to compute various volumes will be provided in a separate section.

| Tubing | | | | | | | | | | | |
|---|---|---|---|---|---|---|---|---|---|---|---|
| Dimensions and Capacity (page 300.014 to 300.17) | | | | | | | | | | | |
| | | | | | Gal Per Lin | Lin Ft Per | Ft3 Per Lin | Lin Ft Per | Bbls Per Lin | Lin Ft Per | |
| OD (in) | | Weight (lb/ft) | ID (in) | Wall (in) | Lin | Per | Lin | Per | Lin | Per | Litres Per |
| (mm) | NU | EUE | U | (mm) | (mm) | Ft | Gal | Ft | Gal | Ft | Bbls | Meter |

Casing:

| Casing: Dimensions and Capacity (page 300.020300.029) ||||||||||
|---|---|---|---|---|---|---|---|---|---|
| | | | Capacity |||| | | | |
| OD (in) | Weight (lb/ft) | I.D. (in) | Gal Per Lin Ft | Ft3 Per Lin Ft | Bbls Per Lin Ft | Lin Ft Per Bbls | Liters Per Meter | Weight (kg/m) | ID (mm) | Wall Thick (mm) | OD (mm) |

Drill Pipe:

| Drill Pipe: Dimensions and Capacity (page 300.018) ||||||||
|---|---|---|---|---|---|---|---|
| | Weight (lb/ft) | | | Capacity |||| |
| OD (in) | IU | IU & EU | I.D. (in) | Gallons Per Lin Ft | Cubic Feet per Lin Ft | Bbls Per Lin Ft | Lin Ft Per Bbl | Liters Per Meter |

Coil Tubing:

| Coil Tubing: Dimensions and Capacity |||||||||||
|---|---|---|---|---|---|---|---|---|---|---|
| Tube Dimensions ||| Tube Area || | Internal Capacity |||| |
| | | | | | | | Cubic | | Lin | |
| OD (in) | Wall Nom (in) | Wall Min (in) | I.D Nom (in) | Wall Nom In2 | I.D Nom In2 | Wt Nom Lb/ft | Gallons Per Lin Ft | Feet per Lin Ft | Bbls Per Lin Ft | Ft Per Bbl | Liters Per Meter |

Open Hole:

| Open Hole: Capacities (page 300.002 to 300.012) ||||||||||
|---|---|---|---|---|---|---|---|---|---|
| | | | | | Capacity ||||| |
| O.D. (in) (mm) | Ft3 Per Ft | Ft Per Ft3 | Bbl Per Ft | Feet Per BBl | Gal Per Ft | Feet Per Gal | M3 Per M | M Per M3 | Liter Per Meter | Meter Per Liter |

Tubular Goods—Annular Volumes

This section will cover the annular volume for different scenarios. Information will be presented in the form of Tables and as mentioned above, calculator will be provided in a separate section.

Tubing - Casing/Open Hole: Annular Volume (page 400.001 to 400.126)

| Casing | | | Capacity | | | | Casing | | |
|---|---|---|---|---|---|---|---|---|---|
| | | | | Ft3 | | | | | |
| | | | Gallons | Per | Bbls | Lin ft | Liters | | |
| OD (in) | Weight (lb/ft) | ID (in) | Per Lin Ft | Lin Ft | Per Lin Ft | Per Bbl | Per Meter | Weight (kg/m) | Wall (mm) | OD (mm) |

Above tables will have to be constructed for all tubing-casing/OH scenarios.

Casing - Casing/Open Hole: Annular Volume (page 500.001 to 500.181)

| Casing | | | Capacity | | | | Casing | | |
|---|---|---|---|---|---|---|---|---|---|
| | | | | Ft3 | | | | | |
| | | | Gallons | Per | Bbls | Lin ft | Liters | | |
| OD (in) | Weight (lb/ft) | ID (in) | Per Lin Ft | Lin Ft | Per Lin Ft | Per Bbl | Per Meter | Weight (kg/m) | Wall (mm) | OD (mm) |

Above tables will have to be constructed for all casing-casing/OH scenarios.

Drill Pipe - Casing/Open Hole:

| Casing | | | Capacity | | | | Casing | | |
|---|---|---|---|---|---|---|---|---|---|
| | | | | Ft3 | | | | | |
| | | | Gallons | Per | Bbls | Lin ft | Liters | | |
| OD (in) | Weight (lb/ft) | ID (in) | Per Lin Ft | Lin Ft | Per Lin Ft | Per Bbl | Per Meter | Weight (kg/m) | Wall (mm) | OD (mm) |

Above tables will have to be constructed for all DP-casing/OH scenarios.

Coil Tubing - Casing/Open Hole:

| Casing | | | Capacity | | | | Casing | | |
|---|---|---|---|---|---|---|---|---|---|
| | | | | Ft3 | | | | | |
| | | | Gallons | Per | Bbls | Lin ft | Liters | | |
| OD (in) | Weight (lb/ft) | ID (in) | Per Lin Ft | Lin Ft | Per Lin Ft | Per Bbl | Per Meter | Weight (kg/m) | Wall (mm) | OD (mm) |

Above tables will have to be constructed for all DP-casing/OH scenarios.

Tubular Goods—Displacement (Open Ended & Plugged)

This section will show the displacement volumes of the tubular that are run in open ended or plugged at one end using float, etc. No allowance for tools joints or couplings is made here. However, displacement of API D/P per pair of upsets is provided.

Tubing & Drill Pipe:

| Metal Displacement Table for Open Ended (page 300.030 to 300.033) | | | | |
|---|---|---|---|---|
| O.D. Inches Tubing/Drill Pipe | Pipe Weight (lb/ft) | Ft3 per Lin Ft | Capacity Bbl per Lin Ft | Gal per Lin Ft |

| Total Displacement Table for Plugged End (page 300.006) | | | | | |
|---|---|---|---|---|---|
| | Capacity | | | Capacity | |
| O.D. (inches) | Ft3 per Lin Ft | Bbl per Lin Ft | Gal per Lin Ft | O.D. (mm) | M3 oer Lin meter | Lin meter Per M3 |

Drill Pipe Couplings:

| Displacement per pair of upsets and couplings (page 300.034 to 300.035) | | | | | | | | |
|---|---|---|---|---|---|---|---|---|
| | Drill Pipe Weight (lb/ft) | Displacement of Internal Upsets | | | | Displacement of Couplings | | |
| O.D. Inches | | Pair of Upset Per G | Gals Per Pair | Pair Up per Ft3 | Ft3 Per U pair | Couplings Per Gal | Gal Per Couplings | Couplings Per Ft3 | Ft3 Per Coupling |

Tubular Goods—Volume Calculator

This section will involve a series of calculators that will aid in computing volumes presented in section 3.3.8. If possible, instead of having one individual section on calculator alone, it may be incorporated in the previous section itself. The formulas that will be used to calculate will also be presented in form of a Table. List of all the formulas are provided below. Unit conversions will also be made possible.

There is also a plan to include a dynamic calculator so that the various volumes can be obtained by simply increasing or decreasing the values of depth using the cursor rather than inputting the numbers every time. The Figure provided in the text should explain this concept better. The exact way in how the schematic will be used has not been decided yet. However, it will permit the user to vary the depths and tubular dimensions to obtain the desired information.

Figure 29:
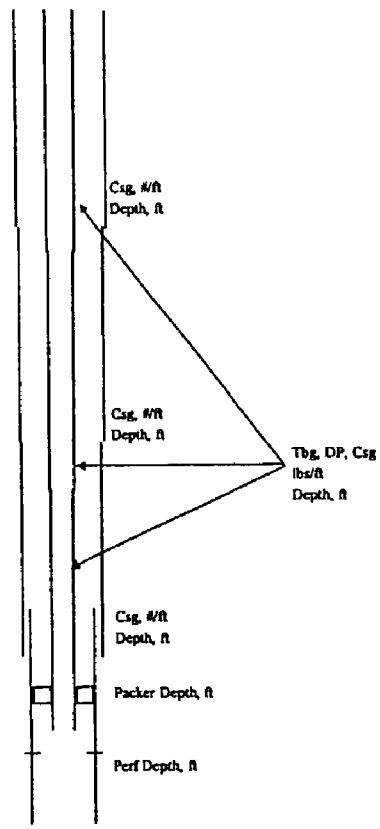

Refer now to FIG. 29.

Equation—Tubular Volume (internal)

$$\text{Capacity} = \frac{(\text{Hole Diameter, inches})^2}{1029.42} \text{ bbl/ft}$$

-continued $$\text{Capacity} = \frac{\pi(\text{Hole Diameter, mm})^2}{4 \times 10^{-6}} \text{ m}^3/\text{m}$$

To obtain inverse of these values simply use reciprocals. Once the values of volumes per units length, are obtained, the total volumes can be obtained by multiplying the values by the actual depth. Further, the calculator will also be able to sum up all the volumes corresponding to different sections together to present the final tubular or annular volume.

Equation—Annular Volume $$\text{Annular Volume} = \frac{(\text{OH } dia \text{ or } Csg \text{ } ID, \text{ inches})^2 - (\text{Tubing } OD, \text{ inches})^2}{1029.42} \text{ bbl/ft}$$

$$\text{Annular Volume} = \frac{\pi\{(\text{OH } dia \text{ or } Csg \text{ } ID, \text{ mm})^2 - (\text{Tubing } OD, \text{ mm}^2)\}}{4 \times 10^{-6}} \text{ m}^3/\text{m}$$

Can be converted to ft³/Lin. ft or gal/Lin. ft. Also metric.

Equation—Metal Displacement $$\text{Displacement} = \frac{(OD \text{ inches}^2 - ID \text{ inches})^2}{1029.42} \text{ bbl/Linear ft}$$

Can be converted to ft³/Lin. ft or gal/Lin. ft. Also metric.
Equation—Total Displacement (Plugged End)

$$Capacity = \frac{(OD \text{ inches}^2)}{1029.42} \text{ bbl/Linear ft}$$

Tubular Goods—Free Point Locator/Stretch Formulas Calc+Tables

There appears to a popular demand for some kind of a free point locator and tubular stretch determination Tables. These calculations are useful when drill pipe or coil tubing may get stuck.

| | | | | Stretch Constant | |
|---|---|---|---|---|---|
| O.D. (in) | Weight Lb/ft | ID (in) | Wall Area 9 sq. in0 | In/1000 lbs/ 1000 ft) | Free Point Constant |

Stretch Tables (page 4-6 to 4-10)

These tables are available for tubing, casing and drill pipes. Calculator to compute the constants and Free point will also be provided.

Buoyancy Factors

This is required to determine the weight of the tubular that are being run in the well with different fluid densities. Table based on the following formula will be consisting of buoyancy factors corresponding to different fluid weights. Tubular material is steel.

$$\text{Bouyancy Factor} = \frac{\rho_s - \rho_f}{\rho_s}$$

$\rho_s$ is the density of steel used in tubular and $\rho_f$ is the density of fluid in which the metal is suspended.

Acid, Oils & Brine

This section will be made in lines similar to the ones seen in the current form of handbook. As in other sections, this section will comprise of charts and equations.

Hydrochloric Acid

Table showing HCl specific gravity and hydrostatic gradient (page 600.002)

| | | | Density | | Psi per |
|---|---|---|---|---|---|
| Per Cent HCl | Specific Gravity | Degrees Baum | Lbs per Gallons | Lbs. Per Ft³ | Ft Depth |

Equation $$^*Baume = 145 - \frac{145}{Sp. \ Gr.}$$

$$Sp. \ Gr. = \frac{145}{145 - {}^*Baume}$$

-continued $$\text{Specific Gravity} = 1 + \frac{(HCl \ conc)^{1.007087}}{204.22}$$

Table showing the solubility of Acid

| | Solubility | |
|---|---|---|
| Percentage HCl | Lbs CaCO3 Dissolved/Gal | Kg CaCO3 Dissolved/m3 |

Acid Dilution Table (page 600.006)

| Volume 2% HCl Desired Equiv. | | | | % HCl Equivalent Units of Concentrations HCl % | | | | | | |
|---|---|---|---|---|---|---|---|---|---|---|
| Units | 15 | 20 | 22 | 24 | 26 | 28 | 30 | 32 | 34 | 36 |

Formulas can be developed for the above table.
Formulae for Transposing Acid Strength (page 600.013)

$$\text{Volume of Strong} = \frac{\text{Volume of Dilute} \times Sp. \ Gr. \text{ of Dilute} \times \% \text{ Dilute}}{Sp. \ Gr. \text{ of Strong} \times \% \text{ Dilute}}$$

Some other factors provided in this section can be used if needed.

Oils:

Conversion Table for Various Gravity Oils (page 600.014)

| API Gravity | Specific Gravity | Density | | Pressure/ | Kg/Cubic | Kpa/ Meter |
|---|---|---|---|---|---|---|
| | | Lbs/Gal | Lbs/Ft3 | Ft. of Depth | Meter | Depth |

Formula for the above table will be provided for calculations.

Conversion Table for Various Weight Muds (page 600.015 to 600.017)

| Density | | Specific | Pressure/ | Kg/Cubic | Kpa/ |
|---|---|---|---|---|---|
| Lbs/Gal | Lbs/Ft3 | Gravity | Ft. of Depth | Meter | Meter Depth |

Formula for the above table will be provided for calculations.

Brine:

Physical Properties of KCl Solution (page 600.018 to 600.019)

| Solution Weight | | | Materials to prepare One Barrel of Solution | | | | |
|---|---|---|---|---|---|---|---|
| Sp. Gr. At 60 deg F. | Lbs. Per Gal at 60° F. | Lbs. Per Ft3 at 60° F. | KCl Lbs | Fresh Water Gals | Freezing Point, °F. | PSI Per Ft. Depth | Approxima % KCl |

PPM = % KCl × 10000

Above Table is also provided for metric system of units.

Physical Properties of NH$_4$Cl Solution (page 600.020 to 600.021)

| Solution Weight | | | Materials to prepare One Barrel of Solution | | | | |
|---|---|---|---|---|---|---|---|
| Sp. Gr. At 60 deg F. | Lbs. Per Gal at 60° F. | Lbs. Per Ft3 at 60° F. | NH4Cl @ 100% Purity Lbs. | Fresh Water Gals | Freezing Point, °F. | PSI Per Ft. Depth | Approxima % KCl |

PPM = % NH4Cl × 10000

Above Table is also provided for metric system of units.

Physical Properties of CaCl2 Solution (page 600.022 to 600.023)

| Solution Weight | | Materials to Prepare One Barrel of Solution | | | | | | |
|---|---|---|---|---|---|---|---|---|
| | | Using Peladow (94-97% CaCl2) | | Using Peladow (77-80% CaCl2) | | | | |
| S. Gr. At 60° F. | Lbs. Per Gal. At 60° F. | Lbs. Per Ft$^3$ At 60° F. | Peladow (lbs) | Fresh H2O Gal | Dowflake (lbs) | Fresh H2O Gal | Freezing Point, °F. | PSI Per Ft. Depth | % Anhyd Calcium Chloride |

PPM = % CaCl2 × 10000

Above Table is also provided for metric system of units.

Physical Properties of NaCl Solution (page 600.024 to 600.025)

| Solution Weight | | | Materials to prepare One Barrel of Solution | | | | |
|---|---|---|---|---|---|---|---|
| Sp. Gr. At 60 deg F. | Lbs. Per Gal at 60° F. | Lbs. Per Ft3 at 60° F. | Salt (NaCl) Lbs. | Fresh Water Gals | Freezing Point, °F. | PSI Per Ft. Depth | Approxima % NaCl |

PPM = % NaCl × 10000

Above Table is also provided for metric system of units.

Further, the information provided from page 600.026 to 600.030 will also be included.

A Brine Calculator, calculating the amount of salt needed to mix the solution of required percentage, ppm or specific gravity will also be provided. Volumetric equations are all provided on page 600.030 and will be used.

Cementing

Physical Properties of Cementing Materials

This section, will provide critical information pertaining to all currently available cementing materials. Information will be available in form of tables shown below. Refer to page 700.003 to 700.006 in Hand book

| Schlumberger Material | Specific Gravity | Bulk Density (lb/sk) | Bulk Density (lb/ft3) | Bulk Volume (Ft3/sk) | Absolute Volume (Gal/lb) | Absolute Volume Ft3/lb |
|---|---|---|---|---|---|---|
| | | | | | | |

The current table needs to be updated to include the latest additives and materials.

As per the consultations, the information provided from pages 700.006 to 700.068 needs to be included also. Apart from the above, following also needs to be done.
1. Additive calculator; e.g. Pozzlan—want to be flexible in loading amount (version 2 only)
2. Need tables and formula as far as table for yield is concerned (version 2 only).
3. Need API sec 10B temperature correlation that is capable of predicting down hole temperatures under circulation conditions—will help them decide on retarder conc (version 2).
4. Any obsolete section in the cementing pages will be gotten rid of.

Cementing Calculations

Slurry Weight—A SAMPLE CALCULATION

Find weight and amount of H2O in 4% gel—Class A Cement. A.P.I. recommended water is 46% (by weight) of cement and 5.3% water (by weight) for each 1% gel when used with Class A Cement.

$$\text{Gals. H}_2\text{O/Sack} = \frac{46 + (5.3 \times 4)}{100} \times 94 \div 8.32 \text{ lbs/gal.}$$

Solving one obtains 7.59 gals, H₂O/Sack 4% Gel Cement

| Weight Contribution: | | |
|---|---|---|
| | Weight | Volume |
| Cement | 94 | 3.59 gals. |
| 4% Gel (0.04 × 94) | 3.76 | 0.17 gals. |
| | (3.76 × 0.0453) | |
| Water (7.59 × 8.32) | 63.10 | 7.59 gals. |
| | 160.86 | 11.35 gals. |

$$\text{Slurry weight per gal.} = \frac{160.86}{11.35} = 14.2 \text{ lbs/gal}$$

$$\text{Slurry Yield} = \frac{11.35}{7.48 \text{ gal/ft}^3} = 1.52 \text{ ft}^3/\text{sack}$$

Plug Balance Formula $$H = \frac{V}{A + C_t}$$

V=Volume of cement slurry used in ft³
H=Height of balanced cement column in ft.
A=Annular volume between tubing or drill pipe, and open hole Or casing in ft³ linear foot.
$C_t$=Capacity of tubing, drill pipe or casing in ft³ per linear foot.
Determine the height $h_s$, the spacer (usually water) will occupy in the annulus. Amount of water flush to balance the amount of spacer pumped ahead of cement in the annulus will be the product of $h_s$ and tubular capacity through with the cement is being pumped. The amount of mud to pump balance plug in the well is
Depth of top plug—(H+$h_s$) ft of mud.
In terms of volume, this is equal to the results obtained from above equation multiplied by the tubular capacity.

Fracturing

Formulae

Formulae for calculating hydraulic horsepower, hydrostatic, bottom hole pressure, perforation friction, frac length, frac width, and general leak off formulae will be displayed. These are generally very useful in answering client questions.

$$P_F = P_W + P_h - P_{tf} - P_{pf}$$

$$ISIP = P_F - P_h = P_{FG}D - P_h$$

$$P_W = P_F + P_{tf} + P_{pf} - P_h$$

$$HHP = 0.0245 P_W Q$$

$$\text{Kilowatts} = Q \times PW \times 0.01667$$

$$\text{Fracture Area} = \frac{Q_i W}{4\pi C^2}\left[e^{x^2}\text{erfc}(x) + \frac{2x}{\sqrt{\pi}} - 1\right]$$

$$C_v = 0.0469\left(\frac{K_E \Delta P_F \phi_E}{\mu f}\right) \text{ Frac Fluid Coeff. Viscosity}$$

$$C_c = 0.0374 \Delta P_F \left(\frac{K_E \phi_E c_r}{\mu r}\right)^{\frac{1}{2}} \text{ Frac Fluid Coeff. Compressibility}$$

$$C_{vc} = \frac{C_v C_c}{C_c + C_v} \text{ Frac Fluid Coeff. Combined Visc. \& Compress.}$$

$$C_W = 0.0328 m/2a \text{ Frac Fluid Coeff. Combined Visc. \& Compress}$$

$\Delta P_F = P_F - P_R$ Differential pressure during frac

Nomenclature will be provided
Frac Sand Specifications
Table I, Table II and Table II corresponding to Section 800.005
Deals with US mesh sizes and other specifications
Density and Yield Table for Prop Added to Frac Fluid
Table 1A
Although the table is made for sand of one specific gravity type, Using the following equations, one can make charts for any type of sand.

$$\text{Clean Fluid Ratio } (CFR) = \frac{1}{1 + \frac{ppa}{\text{fluid } sp.\ gr. \times \text{sand } sp.\ gr}}$$

$$\text{Yield} = \frac{1}{\text{Clean Fluid Ratio}}$$

Slurry Density=$CFR$(ppa+fluid sp.gr.)

lbm prop per gal of slurry=ppa×$CFR$

Can be converted to metric units using standard conversions

Tables from 800.007 to 800.18 can be produced likewise

Sand Charts

Sand in the Tubular

Use following Equations to program $$Csg.\ \text{Capacity} = \frac{(Csg.\ ID,\ \text{inches})^2}{1029.42}\ \text{bbl/ft}$$

$$\text{Sand Fill-up } \frac{\text{lbm}}{\text{ft}} = Csg.\ \text{Capacity } \frac{\text{bbl}}{\text{ft}} \times 5.615\ \frac{\text{ft}^3}{\text{bbl}} \times \text{Sand Density } \frac{\text{lbm}}{\text{ft}^3}$$

Inverse of this gives linear feet per lbm of sand.

In this case Casing database with casing ID may be needed.

Section 800.020 shows charts for 20-40-mesh sand with bulk density

Of 14.3 lbm/gal—s.g. 1.72.

Can be converted to metric system using standard conversions

Similar calculations are shown in 800.022 under Table 4 for tubing

This will require tubing database also.

Sand in the annulus of tubular and casing/open hole

Use following equations:

$$\text{Annular Cap} = \frac{(\text{Hole } dia,\ \text{inches})^2 - (Tbg.\ OD,\ \text{inches})^2}{1029.42}\ \text{bbl/ft}$$

$$\text{Sand Fill-up}\frac{\text{lbm}}{\text{ft}} = Ann.\ Cap\ \frac{\text{bbl}}{\text{ft}} \times 5.615\ \frac{\text{ft}^3}{\text{bbl}} \times \text{Sand Density } \frac{\text{lbm}}{\text{ft}^3}$$

Inverse of this gives linear feet per lbm of sand.

Single Particle Settling Rates in Different Fluid Types

Table from 800.034. Shows calculated values and not experimentally

Observed values.

$$V_s = \frac{(2n'+1)d_p}{108 n'}\left[\frac{(\rho_p - \rho_f)d_p}{72K'}\right]^{\frac{1}{n'}}$$

Source for the above equation is Fracturing engineering manual.

Ball Sealer Settling Rates

This will be a new section. Ball terminal velocity calculator will be provided.

POD Phase II Gate Percentage Calculator Control

This is very useful if electronic gate controller is failed is lost.

Use the following sequence for programming $$\text{Clean Fluid Ratio } (CFR) = \frac{1}{1 + \frac{ppa}{\text{fluid } sp.\ gr. \times \text{sand } sp.\ gr}}$$

$$\text{prop rate} = Q\ \frac{\text{bbl}}{\text{min}} \times 42\ \frac{\text{gal}}{\text{bbl}} \times CFR \times ppa\frac{\text{lbm}}{\text{gal}}\ \text{lbm/min}$$

$$PR^* = \frac{prop\ s.g.}{2.65} \times \text{prop rate lbm/min}$$

Now there are three ranges

For PR*<1812

$$\text{gate \%} = -0.8 + \sqrt{\frac{PR^*}{2}}$$

For 1812<PR*<5144

$$\text{gate \%} = \frac{PR^* + 1059}{98}$$

For 5144<PR*

$$\text{gate \%} = 99.5 - \sqrt{9900 - \frac{20196 + PR^*}{2.95}}$$

Round the numbers to nearest whole number.

Additive Rate Calculator

For both cases first calculate clean fluid ratio $$\text{Clean Fluid Ratio}(CFR) = \frac{1}{1 + \frac{ppa}{\text{fluid } sp.gr. \times \text{sand } sp.gr}}$$

Liquid Additives $$\text{add rate } \frac{\text{gal}}{\text{min}} = Q\ \frac{\text{bbl}}{\text{min}} \times 42\ \frac{\text{gal}}{\text{bbl}} \times \text{add } conc.\ \frac{\text{gal}}{1000\ \text{gal}} \times \frac{1}{1000}$$

Solid Additives $$\text{add rate } \frac{\text{lbm}}{\text{min}} = Q\ \frac{\text{bbl}}{\text{min}} \times 42\ \frac{\text{gal}}{\text{bbl}} \times \text{add } conc.\ \frac{\text{lbm}}{1000\ \text{gal}} \times \frac{1}{1000}$$

Q is always dirty rate in bpm

Will be provided in version 2.

Screen Out Calculations
    To carry out these calculations one should the following
        a. Last ppa that was being pumped,
        b. Displacement to top of the perforations, $V_D$
        c. Volume flushed with clean fluid, $V_F$ (could be 0 or more)
    Use the following sequence in programming $$\text{Clean Fluid Ratio } (CFR) = \frac{1}{1 + \frac{\text{Last pumped } ppa}{\text{fluid } sp.gr. \times \text{sand } sp.gr}}$$

$$\text{Sand in tubular, lbm} = (V_D - V_F) \text{ bbls} \times CFR \times 42 \frac{\text{gal}}{\text{bbl}} \times \text{Last } ppa \frac{\text{lbm}}{\text{gal}}$$

Sand in formation, lbm=Total sand pumped−Sand in tubular

There will be a calculator that will take care of calculations.

Pressure Drop Across Orifice

| Pressure Drop Across a Single Nozzle (Orifice) | | | | | | | |
|---|---|---|---|---|---|---|---|
| Volume Flow Rate | PRESSURE DROP IN PSI ACROSS NOZZLES OF DIAMETERS SHOWN BELOW (inches) | | | | | | |
| GPM | 1/8 | 9/64 | 5/32 | 11/16 | 3/16 | 13/64 | 7/32 | 15/64 |

Table for other sizes will also be provided. Following Formula will be used $$\Delta P = \frac{(GPM)^2 D}{12,031 A^2 C^2}$$

Results can also be obtained for bbl/min.

Fracturing Equipment Specifications
    As per Curtis, should have a section devoted to rating and capacity of fracturing equipment like:
        1. POD
        2. PCM
        3. Pumper POD
        4. Stuart & Stevenson Blender
        5. Fracturing Pumps—Pr. Ratings Different Fluid Ends, K factors etc
        6. Backside pump—L406
        7. Cement pumps—DC8, DCS
        8. $N_2$ Pumps Flanges
    There is currently a proposal to create Electronic Flange Slide Rule.
    This will appear similar to the Slide Rules that give the flange specifications. Apart from this Flange sizes, API ratings and dimensions will have to be entered in the form of tables.
    Will be provided in version 2.

$CO_2$ and $N_2$ charts
    Physical Properties.
        Refer to page 900.002 to 900.009 of the Hand Book. Properties include symbol, M.W. Boiling Point, Critical Temperature, Critical Pressure, Density of Saturated vapor, density of liquid nitrogen at normal boiling point, etc.
        Also includes a table providing the Volume Factors at various temperatures and pressure. These values can either be computed by equations or interpolated from the tables.
        Version 2 only.
    Flow Back Charts
        Page 900.026 to 900.034. These tables provide rate of energized fluid flow back based on depth and the bottom hole producing pressure. There may be equations for these in the literature. Version 2 only.
    Useful Physical Constants
        Refer to Page 900.035 of Hand book. Version 2 only.
    $N_2$ and $CO_2$ Hydrostatic Calculator based on Foam Quality
        Charts are currently available. Results can be obtained by deriving simple linear relation ships. Currently have some of those equations also. Version 2 only.
    Orifice Gas Flow Equations
        Version 2 only.
    Day Timer and Worldwide Location List
        As per the feedback obtained from the personnel a day timer may also be incorporated in the software. Besides this, a list of worldwide Schlumberger locations along with important phone numbers may also be included.
        Version 2 only.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:
1. A method of determining data, comprising the steps of:
(a) displaying a handbook on a computer display screen, said handbook including a left page, a right page, and at least one binder ring interconnecting the left page to the right page;
(b) locating a page in said handbook being displayed on said computer display screen; and
(c) determining said data from said page in said handbook and displayed on said computer display screen, said data determined during the determining step (c) being displayed on said computer display screen, wherein the determining said data comprises obtaining and/or calculating data;
wherein the determining step (c) for determining said data from said page in said handbook being displayed on said computer display screen comprises the steps of:
selecting from said page in said handbook a desired amount of salt from a particular weight of solution on said page in said handbook on the condition that said particular weight of solution is located on said page in said handbook;
locating on said page in said handbook a first weight of solution associated with a first amount of salt and a second weight of solution associated with a second amount of salt, where said first weight of solution is greater than said particular weight of solution and said second weight of solution is less than said particular weight of solution;
interpolating between the first and second different weights of solution to determine said desired amount of said salt having a value which lies between the first and second amounts of salt on the condition that said particular weight of solution is not located on said page in said handbook; and displaying said desired amount of said salt on said computer display screen.

2. The method of claim 1, wherein the determining step (c) for determining said data from said page in said handbook being displayed on said computer display screen comprises the steps of:
entering a first unit in a first databox on said page in said handbook being displayed on said computer display screen; and converting said first unit to a second unit; said second unit being displayed in a second databox on said page in said handbook being displayed on said computer display screen.

3. The method of claim 1, wherein the determining step (c) for determining said data from said page in said handbook being displayed on said computer display screen comprises the steps of:
entering one or more pump parameters in one or more databoxes on said page in said handbook being displayed on said computer display screen; and
calculating pump related data in response to said pump parameters, said pump related data being displayed in one or more additional databoxes on said page in said handbook being displayed on said computer display screen.

4. The method of claim 1, wherein the determining step (c) for determining said data from said page in said handbook being displayed on said computer display screen comprises the steps of:
entering one or more tank dimensions in one or more databoxes on said page in said handbook being displayed on said computer display screen; and
calculating tank related data in response to said tank dimensions, said tank related data being displayed in one or more additional databoxes on said page in said handbook being displayed on said computer display screen.

5. The method of claim 1, wherein the determining step (c) for determining said data from said page in said handbook being displayed on said computer display screen comprises the steps of:
enabling a search window on said computer display screen;
entering search parameters in said search window; and
displaying said data in response to the step of entering said search parameters.

6. The method of claim 5, wherein said data comprises a plurality of suppliers and a corresponding plurality of brand names associated with tubular goods adapted to be disposed in a wellbore.

7. The method of claim 1, wherein the determining step (c) for determining said data from said page in said handbook being displayed on said computer display screen comprises the steps of:
entering into said page in said handbook data pertaining to one of a length of pipe or an effective stretch of said pipe in one or more databoxes being displayed on said computer display screen; and
calculating data pertaining to an alternative of said length of pipe or said effective stretch of said pipe, said alternative of said length of pipe or said effective stretch of said pipe being displayed in one or more additional databoxes on said page in said handbook being displayed on said computer display screen.

8. The method of claim 1, wherein the determining step (c) for determining said data from said page in said handbook being displayed on said computer display screen comprises the steps of:
locating an outer diameter and a weight and an inner diameter of a tubing on said page in said handbook being displayed on said computer display screen; and
determining a capacity and a displacement of said tubing on said page in said handbook being displayed on said computer display screen.

9. The method of claim 1, wherein the determining step (c) for determining said data from said page in said handbook being displayed on said computer display screen comprises the steps of:
entering into said page in said handbook a set of dimensions associated with an inner tubing and an outer tubing or casing in a wellbore; and
calculating said data in response to said set of dimensions, said data including one or more of a volume for a unit length, a metal displacement of the outer tubing or casing, a metal displacement of the inner tubing, a volume for a given depth, and a depth for a given volume, said data being displayed on said computer display screen.

10. The method of claim 1, wherein the determining step (c) for determining said data from said page in said handbook being displayed on said computer display screen comprises the steps of:
entering into said page in said handbook a proppant concentration and water density value into said computer;
obtaining into said page in said handbook a specific gravity of said proppant from a database of said computer; and
calculating a density of a resultant slurry in response to said proppant concentration and water density value and said specific gravity of said proppant, said density of said resultant slurry being displayed on said computer display screen.

11. The method of claim 1, wherein the determining step (c) for determining said data from said page in said handbook being displayed on said computer display screen comprises the steps of:
entering into said page in said handbook a proppant type and a pump schedule into said computer;
determining a set of properties of said proppant from a database in said computer; and
calculating a gate percentage opening in response to the set of properties of said proppant and said pump schedule, said gate percentage opening being displayed on said computer display screen.

12. The method of claim 1, wherein the determining step (c) for determining said data from said page in said handbook being displayed on said computer display screen comprises the steps of:
entering into said page in said handbook properties of a proppant into said computer;
entering into said page in said handbook a configuration of a wellbore; and
calculating an amount of said proppant remaining in a tubular in said wellbore, said amount of said proppant remaining in a tubular being displayed on said computer display screen.

13. The method of claim 1, wherein the determining step (c) for determining said data from said page in said handbook being displayed on said computer display screen comprises the steps of:
(a) entering into said page in said handbook data relating to a construction of a cement blend;

(b) selecting a proper blend used during the calculating step (e), the selecting step (b) including selecting said cement blend of step (a) or selecting a neat cement;
(c) selecting additives to be added to the blend; and
(d) determining a description of slurry, the step of determining said description of said slurry including,
(e) calculating one or more of slurry yield, mix water requirements, base fluid requirements, and mix fluid values, said description of said slurry being displayed on said computer display screen.

14. The method of claim 1, wherein the determining step (c) for determining said data from said page in said handbook being displayed on said computer display screen comprises the steps of:
entering into said page in said handbook values relating to a casing diameter associated with a casing in a wellbore, a weight of said casing, and a depth of said casing; and
determining, in response to the entering step, if a pumping pressure at a surface of said wellbore will cause said casing to unseat and further determining a critical surface pressure above which said casing will unseat, said critical surface pressure being displayed on said computer display screen.

15. The method of claim 1, wherein the determining step (c) for determining said data from said page in said handbook being displayed on said computer display screen comprises the steps of:
entering into said page in said handbook a Hydrochloric Acid (HCL) concentration, and determining, from said HCL concentration, a specific gravity of said HCL and a density of said HCL, said specific gravity and said density being displayed on said computer display screen.

16. The method of claim 1, wherein the determining step (c) for determining said data from said page in said handbook being displayed on said computer display screen comprises the steps of:
entering into said page in said handbook one of an American Petroleum Institute oil gravity value and a specific gravity of oil value, and calculating the other of said American Petroleum Institute oil gravity value and said specific gravity of oil value, said other of said American Petroleum Institute oil gravity value and said specific gravity of oil value being displayed on said computer display screen.

17. A program storage device readable by a machine tangibly embodying a program of instructions executable by the machine to perform method steps for determining data, said method steps comprising:
(a) displaying a handbook on a display screen of said machine, said handbook including a left page, a right page, and at least one binder ring interconnecting the left page to the right page;
(b) displaying a page in said handbook on said display screen of said machine in response to an input instruction; and
(c) determining said data from said page in said handbook being displayed on said display screen of said machine in response to a set of input data and a further set of data stored in a database, said data determined during the determining step (c) being displayed on said display screen of said machine;
wherein the determining step (c), for determining said data from said page in said handbook being displayed on said display screen of said machine, further comprises:
determining from said page in said handbook a desired amount of salt from a particular weight of solution on said page in said handbook on the condition that said particular weight of solution is located on said page in said handbook;
determining on said page in said handbook a first weight of solution associated with a first amount of salt and a second weight of solution associated with a second amount of salt, where said first weight of solution is greater than said particular weight of solution and said second weight of solution is less than said particular weight of solution;
interpolating between the first and second different weights of solution to determine said desired amount of said salt having a value which lies between the first and second amounts of salt on the condition that said particular weight of solution is not located on said page in said handbook; and
displaying said desired amount of said salt on said computer display screen.

18. The program storage device of claim 17, wherein the determining step (c), for determining said data from said page in said handbook being displayed on said display screen of said machine, further comprises:
receiving a first unit in a first databox on said page in said handbook being displayed on said computer display screen; and
converting said first unit to a second unit, said second unit being displayed in a second databox on said page in said handbook being displayed on said computer display screen.

19. The program storage device of claim 17, wherein the determining step (c), for determining said data from said page in said handbook being displayed on said display screen of said machine, further comprises:
receiving one or more pump parameters in one or more databoxes on said page in said handbook being displayed on said computer display screen; and
calculating pump related data in response to said pump parameters, said pump related data being displayed in one or more additional databoxes on said page in said handbook being displayed on said computer display screen.

20. The program storage device of claim 17, wherein the determining step (c), for determining said data from said page in said handbook being displayed on said display screen of said machine, further comprises:
receiving one or more tank dimensions in one or more databoxes on said page in said handbook being displayed on said computer display screen; and
calculating tank related data in response to said tank dimensions, said tank related data being displayed in one or more additional databoxes on said page in said handbook being displayed on said computer display screen.

21. The program storage device of claim 17, wherein the determining step (c), for determining said data from said page in said handbook being displayed on said display screen of said machine, further comprises:
enabling a search window on said computer display screen;
receiving search parameters in said search window; and
displaying said data in response to the step of entering said search parameters.

22. The program storage device of claim 21, wherein said data comprises a plurality of suppliers and a corresponding plurality of brand names associated with tubular goods adapted to be disposed in a wellbore.

23. The program storage device of claim 17, wherein the determining step (c), for determining said data from said page in said handbook being displayed on said display screen of said machine, further comprises:

receiving into said page in said handbook data pertaining to one of a length of pipe or an effective stretch of said pipe in one or more databoxes being displayed on said computer display screen; and calculating data pertaining to an alternative of said length of pipe or said effective stretch of said pipe, said alternative of said length of pipe or said effective stretch of said pipe being displayed in one or more additional databoxes on said page in said handbook being displayed on said computer display screen.

24. The program storage device of claim 17, wherein the determining step (c), for determining said data from said page in said handbook being displayed on said display screen of said machine, further comprises:

locating an outer diameter and a weight and an inner diameter of a tubing on said page in said handbook being displayed on said computer display screen; and determining a capacity and a displacement of said tubing on said page in said handbook being displayed on said computer display screen.

25. The program storage device of claim 17, wherein the determining step (c), for determining said data from said page in said handbook being displayed on said display screen of said machine, further comprises:

receiving into said page in said handbook a set of dimensions associated with an inner tubing and an outer tubing or casing in a wellbore; and calculating said data in response to said set of dimensions, said data including one or more of a volume for a unit length, a metal displacement of the outer tubing or casing, a metal displacement of the inner tubing, a volume for a given depth, and a depth for a given volume, said data being displayed on said computer display screen.

26. The program storage device of claim 17, wherein the determining step (c), for determining said data from said page in said handbook being displayed on said display screen of said machine, further comprises:

receiving into said page in said handbook a proppant concentration and water density value into said computer;

obtaining a specific gravity of said proppant from a database of said computer; and calculating a density of a resultant slurry in response to said proppant concentration and water density value and said specific gravity of said proppant, said density of said resultant slurry being displayed on said computer display screen.

27. The program storage device of claim 17, wherein the determining step (c) for determining said data from said page in said handbook being displayed on said display screen of said machine, further comprises:

receiving into said page in said handbook a proppant type and a pump schedule into said computer;

determining a set of properties of said proppant from a database in said computer; and calculating a gate percentage opening in response to the set of properties of said proppant and said pump schedule, said gate percentage opening being displayed on said computer display screen.

28. The program storage device of claim 17, wherein the determining step (c), for determining said data from said page in said handbook being displayed on said display screen of said machine, further comprises:

receiving into said page in said handbook properties of a proppant into said computer;

receiving into said page in said handbook a configuration of a wellbore; and calculating an amount of said proppant remaining in a tubular in said wellbore, said amount of said proppant remaining in a tubular being displayed on said computer display screen.

29. The program storage device of claim 17, wherein the determining step (c), for determining said data from said page in said handbook being displayed on said display screen of said machine, further comprises:

(a) receiving into said page in said handbook data relating to a construction of a cement blend;

(b) determining a proper blend, the determining step (b) including determining said cement blend of step (a) or determining a neat cement;

(c) selecting additives to be added to the blend; and (d) determining a description of slurry, the step of determining said description of said slurry including, (e) calculating one or more of slurry yield, mix water requirements, base fluid requirements, and mix fluid values, said description of said slurry being displayed on said computer display screen.

30. The program storage device of claim 17, wherein the determining step (c), for determining said data from said page in said handbook being displayed on said display screen of said machine, further comprises:

receiving into said page in said handbook values relating to a casing diameter associated with a casing in a wellbore, a weight of said casing, and a depth of said casing; and determining, in response to the receiving step, if a pumping pressure at a surface of said wellbore will cause said casing to unseat and further determining a critical surface pressure above which said casing will unseat, said critical surface pressure being displayed on said computer display screen.

31. The program storage device of claim 17, wherein the determining step (c), for determining said data from said page in said handbook being displayed on said display screen of said machine, further comprises:

receiving into said page in said handbook a Hydrochloric Acid (HCL) concentration, and determining, from said HCL concentration, a specific gravity of said HCL and a density of said HCL, said specific gravity and said density being displayed on said computer display screen.

32. The program storage device of claim 17, wherein the determining step (c), for determining said data from said page in said handbook being displayed on said display screen of said machine, further comprises:

receiving into said page in said handbook one of an American Petroleum Institute oil gravity value and a specific gravity of oil value, and calculating the other of said American Petroleum Institute oil gravity value and said specific gravity of oil value, said other of said American Petroleum Institute oil gravity value and said specific gravity of oil value being displayed on said computer display screen.

33. A system adapted for determining data, comprising:

apparatus comprising a personal computer adapted for displaying a handbook on a computer display screen, said handbook including a left page, a right page, and at least one binder ring interconnecting the left page to the right page;

apparatus adapted for locating a page in said handbook being displayed on said computer display screen; and apparatus adapted for determining said data from said page in said handbook being displayed on said computer display screen, said data being displayed on said computer display screen;

wherein said apparatus adapted for determining said data from said page in said handbook being displayed on said computer display screen comprises:

apparatus adapted for selecting from said page in said handbook a desired amount of salt from a particular weight of solution on said page in said handbook on the condition that said particular weight of solution is located on said page in said handbook;

apparatus adapted for locating on said page in said handbook a first weight of solution associated with a first amount of salt and a second weight of solution associated with a second amount of salt, where said first weight of solution is greater than said particular weight of solution and said second weight of solution is less than said particular weight of solution;

apparatus adapted for interpolating between the first and second different weights of solution to determine said desired amount of said salt having a value which lies between the first and second amounts of salt on the condition that said particular weight of solution is not located on said Page in said handbook; and apparatus adapted for displaying said desired amount of said salt on said computer display screen.

34. The system of claim 33, wherein said apparatus adapted for determining said data from said page in said handbook being displayed on said computer display screen comprises:

apparatus adapted for receiving a first unit in a first databox on said page in said handbook being displayed on said computer display screen; and apparatus adapted for converting said first unit to a second unit, said second unit being displayed in a second databox on said page in said handbook being displayed on said computer display screen.

35. The system of claim 33, wherein said apparatus adapted for determining said data from said page in said handbook being displayed on said computer display screen comprises:

apparatus adapted for receiving one or more pump parameters in one or more databoxes on said page in said handbook being displayed on said computer display screen; and apparatus adapted for calculating pump related data in response to said pump parameters, said pump related data being displayed in one or more additional databoxes on said page in said handbook being displayed on said computer display screen.

36. The system of claim 33, wherein said apparatus adapted for determining said data from said page in said handbook being displayed on said computer display screen comprises:

apparatus adapted for receiving one or more tank dimensions in one or more databoxes on said page in said handbook being displayed on said computer display screen; and apparatus adapted for calculating tank related data in response to said tank dimensions, said tank related data being displayed in one or more additional databoxes on said page in said handbook being displayed on said computer display screen.

37. The system of claim 33, wherein said apparatus adapted for determining said data from said page in said handbook being displayed on said computer display screen comprises:

apparatus adapted for enabling a search window on said computer display screen;

apparatus adapted for receiving search parameters in said search window; and apparatus adapted for displaying said data in response to the receipt of said search parameters.

38. The system of claim 37, wherein said data comprises a plurality of suppliers and a corresponding plurality of brand names associated with tubular goods adapted to be disposed in a wellbore.

39. The system of claim 33, wherein said apparatus adapted for determining said data from said page in said handbook being displayed on said computer display screen comprises:

apparatus adapted for receiving into said page in said handbook data pertaining to one of a length of pipe or an effective stretch of said pipe in one or more databoxes being displayed on said computer display screen; and apparatus adapted for calculating data pertaining to an alternative of said length of pipe or said effective stretch of said pipe, said alternative of said length of pipe or said effective stretch of said pipe being displayed in one or more additional databoxes on said page in said handbook being displayed on said computer display screen.

40. The system of claim 33, wherein said apparatus adapted for determining said data from said page in said handbook being displayed on said computer display screen comprises:

apparatus adapted for locating an outer diameter and a weight and an inner diameter of a tubing on said page in said handbook being displayed on said computer display screen; and apparatus adapted for determining a capacity and a displacement of said tubing on said page in said handbook being displayed on said computer display screen.

41. The system of claim 33, wherein said apparatus adapted for determining said data from said page in said handbook being displayed on said computer display screen comprises:

apparatus adapted for receiving into said page in said handbook a set of dimensions associated with an inner tubing and an outer tubing or casing in a wellbore; and apparatus adapted for calculating said data in response to said set of dimensions, said data including one or more of a volume for a unit length, a metal displacement of the outer tubing or casing, a metal displacement of the inner tubing, a volume for a given depth, and a depth for a given volume, said data being displayed on said computer display screen.

42. The system of claim 33, wherein said apparatus adapted for determining said data from said page in said handbook being displayed on said computer display screen comprises:

apparatus adapted for receiving into said page in said handbook a proppant concentration and water density value into said computer; apparatus adapted for obtaining into said page in said handbook a specific gravity of said proppant from a database of said computer; and apparatus adapted for calculating a density of a resultant slurry in response to said proppant concentration and water density value and said specific gravity of said proppant, said density of said resultant slurry being displayed on said computer display screen.

43. The system of claim 33, wherein said apparatus adapted for determining said data from said page in said handbook being displayed on said computer display screen comprises:

apparatus adapted for receiving into said page in said handbook a proppant type and a pump schedule into said computer;

apparatus adapted for determining a set of properties of said proppant from a database in said computer; and apparatus adapted for calculating a gate percentage opening in response to the set of properties of said proppant and said pump schedule, said gate percentage opening being displayed on said computer display screen.

44. The system of claim 33, wherein said apparatus adapted for determining said data from said page in said handbook being displayed on said computer display screen comprises:
apparatus adapted for receiving into said page in said handbook properties of a proppant;
apparatus adapted for receiving into said page in said handbook a configuration of a wellbore; and
apparatus adapted for calculating an amount of said proppant remaining in a tubular in said wellbore, said amount of said proppant remaining in a tubular being displayed on said computer display screen.

45. The system of claim 33, wherein said apparatus adapted for determining said data from said page in said handbook being displayed on said computer display screen comprises:
apparatus adapted for receiving into said page in said handbook data relating to a construction of a cement blend;
apparatus adapted for selecting a proper blend including selecting said cement blend or a neat cement;
apparatus adapted for selecting additives to be added to the proper blend; and
apparatus adapted for determining a description of slurry including, apparatus adapted for calculating one or more of a slurry yield, mix water requirements, base fluid requirements, and mix fluid values, said description of said slurry being displayed on said computer display screen.

46. The system of claim 33, wherein said apparatus adapted for determining said data from said page in said handbook being displayed on said computer display screen comprises:
apparatus adapted for receiving into said page in said handbook values relating to a casing diameter associated with a casing in a wellbore, a weight of said casing, and a depth of said casing; and
apparatus adapted for determining whether a pumping pressure at a surface of said wellbore will cause said casing to unseat and for determining a threshold surface pressure above which said casing will unseat, said threshold surface pressure being displayed on said computer display screen.

47. The system of claim 33, wherein said apparatus adapted for determining said data from said page in said handbook being displayed on said computer display screen comprises:
apparatus adapted for entering into said page in said handbook a Hydrochloric Acid (HCL) concentration, and apparatus adapted for determining, from said HCL concentration, a specific gravity of said HCL and a density of said HCL, said specific gravity and said density being displayed on said computer display screen.

48. The system of claim 33, wherein said apparatus adapted for determining said data from said page in said handbook being displayed on said computer display screen comprises: apparatus adapted for receiving into said page in said handbook one of an American Petroleum Institute oil gravity value and a specific gravity of oil value, and apparatus adapted for calculating the other of said American Petroleum Institute oil gravity value and said specific gravity of oil value, said other of said American Petroleum Institute oil gravity value and said specific gravity of oil value being displayed on said computer display screen.

\* \* \* \* \*